(12) United States Patent
Field

(10) Patent No.: US 6,545,500 B1
(45) Date of Patent: Apr. 8, 2003

(54) USE OF LOCALIZED TEMPERATURE CHANGE IN DETERMINING THE LOCATION AND CHARACTER OF DEFECTS IN FLAT-PANEL DISPLAYS

(76) Inventor: John E. Field, P.O. Box 4076, Camp Connell, CA (US) 95223

( * ) Notice: Subject to any disclaimer, the term of this patent is extended or adjusted under 35 U.S.C. 154(b) by 0 days.

(21) Appl. No.: 09/456,605

(22) Filed: Dec. 8, 1999

(51) Int. Cl.[7] .............................................. G01R 31/28
(52) U.S. Cl. ..................................................... 324/770
(58) Field of Search ................................ 324/770, 752, 324/658, 753, 754, 501, 537

(56) References Cited

U.S. PATENT DOCUMENTS

| | | | |
|---|---|---|---|
| 4,819,038 A | | 4/1989 | Alt ................................. 357/4 |
| 5,170,127 A | | 12/1992 | Henley ......................... 324/658 |
| 5,223,961 A | * | 6/1993 | Ukai et al. ..................... 349/55 |
| 5,280,374 A | * | 1/1994 | Nakai et al. .................... 359/67 |
| 5,309,108 A | * | 5/1994 | Maeda et al. ................. 324/501 |
| 5,334,540 A | | 8/1994 | Ishii ................................. 437/7 |
| 5,365,034 A | | 11/1994 | Kawamura et al. ..... 219/121.83 |
| 5,406,213 A | * | 4/1995 | Henlay ......................... 324/753 |
| 5,430,305 A | | 7/1995 | Cole, Jr. et al. ......... 250/559.07 |
| 5,465,052 A | | 11/1995 | Henley ......................... 324/770 |
| 5,614,839 A | | 3/1997 | Bosacchi ...................... 324/770 |
| 5,615,039 A | | 3/1997 | Henley ......................... 359/257 |
| 5,638,199 A | * | 6/1997 | Tsubota et al. .............. 349/110 |
| 5,804,980 A | | 9/1998 | Nikawa ........................ 324/752 |
| 5,831,392 A | | 11/1998 | Hansen et al. ............ 315/169.1 |
| 5,846,852 A | * | 12/1998 | Limper-Brenner et al. 29/25.01 |
| 5,859,502 A | | 1/1999 | Spindt et al. ............. 315/169.3 |
| 5,910,792 A | * | 6/1999 | Hansen et al. ............... 315/167 |
| 5,982,190 A | * | 11/1999 | Lira ............................. 324/770 |
| 5,999,012 A | * | 12/1999 | Listwan ....................... 324/753 |

FOREIGN PATENT DOCUMENTS

| | | | |
|---|---|---|---|
| WO | WO 98/02899 | 1/1998 | ............ H01J/19/42 |
| WO | WO 98/19501 | 5/1998 | ........... H05B/37/00 |
| WO | WO 99/06844 | 2/1999 | |
| WO | WO 99/36935 | 7/1999 | ............ H01J/19/42 |

OTHER PUBLICATIONS

Thermal Expansion of Solids and Liquids, pp. 513–514. Physics for Scientists and Engineers, Third Edition.*

* cited by examiner

Primary Examiner—N. Le
Assistant Examiner—Vincent Q. Nguyen

(57) ABSTRACT

Inspection method and tool for flat panel displays for localizing short-circuit and open-circuit type defects for optional repair involves inducing a localized temperature change in the display and observing any electrical effect on the network formed by the rows and columns. In one embodiment, a laser is used to heat the rows and columns individually and the resulting time-dependent resistance changes or thermoelectric potentials result in electrical signals on the row and column shorting busses. The method can be used to identify crossings of conductors, which contain defects and may be further used to localize the defects within the crossing. Methods for enhancing the sensitivity of the method are also disclosed.

56 Claims, 52 Drawing Sheets

USE OF LOCALIZED TEMPERATURE CHANGE IN DETERMINING THE LOCATION AND CHARACTER OF DEFECTS IN FLAT-PANEL DISPLAYS

BACKGROUND

1. Field of the Invention

This invention relates to the use of temperature change in determining the location and character of conducting point defects in or on flat-panel displays such as, but not limited to, those as used in laptop computers.

2. References

The following documents are incorporated by reference herein:

U.S. Pat. Nos. 5,804,980; 4,819,038; 5,334,540; 5,365,034; 5,430,305; 5,465,052; 5,615,039; 5,170,127; 5,831,392; 5,859,502.

PCT Publication Nos. WO99/36935; WO98/02899; WO99/06844; WO98/19501.

William C. O'Mara, "Liquid Crystal Flat Panel Displays Manufacturing Science & Technology" (1993).

Richard M. Bozorth, "Ferromagnetism", IEEE Press, Copyright 1951 D. Van Nostrand Company, Inc.

Neil Ashcroft and N. David Mermin, Solid State Physics, Copyright 1976, Holt, Rinehart, and Winston.

Alexander Fetter and John Dirk Walecka, Theoretical Mechanics of Particles and Continua, McGraw Hill, Copyright 1980.

Robert M. Gray and Lee D. Davisson, Random Processes, Prentice Hall, 1986.

3. Description of Related Art

A wide variety of electronic circuits are formed as a collection of interconnections between electrical or electronic elements. On any structure which is predominantly planar, locally or globally, it is often necessary for these interconnections to overlap each other. In some cases, the overlaps can be electronic components themselves, as in capacitors, diodes, etc. During the fabrication or operation of the device, it is possible that at the overlapping points or points of near contact unintended conductive or non-conductive paths can be formed. The presence of these paths can prevent the device from operating properly. From a manufacturing or repair point of view, it is a very difficult matter to identify the location of these unintended paths. Various techniques have been employed such as direct optical examination of the surface and electrical test using contact probes and electro-optical techniques (See, for example Henley U.S. Pat. No. 5,465,052). It can be very difficult or impossible to make direct contact near a potential defect, so usually external connections are used which may make it impossible to identify the exact location of the defect. In many cases, the defect does not have an optical signature of any form on the device. On the other hand, if it were possible to identify the location of these unintended paths, many different methods exist for their repair in situ. Therefore the rapid identification of the defect locations is highly desirable.

In the case of flat-panel displays, there is typically a regular array or grid of rows and columns on the display. As used herein, a flat-panel display is a visual information display device for which the dimensions of the active display plane are much greater than the thickness in a direction perpendicular to the display plane. Examples of such devices include liquid crystal displays(LCD) and field emission displays(FED). To fabricate the array on a flat panel display, there must be many, many crossover points over a large area. Therefore, the opportunity for defects to arise is very high. It is now a common practice in the liquid-crystal display manufacturing business to find and repair defects before final assembly of the display. Unfortunately, no entirely satisfactory means of locating these defects has yet been employed.

In the case of liquid-crystal displays (LCD), there is usually a regular array of interconnections and electronics which is capable of producing an electric field. Adjacent to this array there is a molecular substance which has the property of affecting optical polarization and/or transmission in relation to the applied electric field. With an appropriate collection of optical filters, glass, and electronics, this arrangement can be used essentially as a switchable "light-valve" which then leads to its utility as a flat-panel display.

In the case of a field-emission display (FED), there is typically a regular array of electron-emitting devices and light emitting devices situated opposite each other. Associated with this regular array is an array of interconnections and possibly electronics which resembles that of the LCD. By applying carefully selected voltages to the rows and columns of this structure, electrons may be emitted and strike the light emitting devices thereby leading to its utility as a flat-panel display. In the case of FED displays, the invention applies to the part of the display known as the cathode from which the electrons emanate into a vacuum region.

In the case of other types of flat-panel displays, regardless of the exact nature of the light switching or generation mechanism, there is typically also a regular array of interconnections and electronics. Appropriate voltages or currents are applied to affect the optical properties of the device which then leads to utility as a flat-panel display.

In all of the above described flat panel display devices, there is a need for rapid localization of defect points during or immediately after manufacture without making repeated or microscopic contact with the device. It is desirable that this localization can be performed both during and after the fabrication of the device. It is desirable that the localization not require an optical signature of the defect and that the method be reducible to an algorithm that a computerized machine can perform without operator intervention. It is desirable that the method would allow for repair of the device on the same machine on which the localization takes place.

Because of the very large size of modern flat-panel displays, the test machines built for this purpose tend to be very large and expensive. They must operate at a very high reliability level and with an extremely high level of cleanliness. Clean room space is also very expensive in and of itself. Often, if an operator is required for the operation, especially a repair operation, the operator is stationed on a different machine entirely and the devices under test are transported from the test machine to the machine with the operator entailing great logistical and material handling costs as well as creating cleanliness problems. It may be that the required cleanliness makes a special enclosed mini-environment for the tool a necessity or practicality. Within this mini-environment, the air is typically continuously filtered and other cleanliness measures are often employed.

Most modern flat-panel manufacturing operations are actively involved in process development as well. Therefore, it would represent a significant advance if it were possible to implement a test operation on a relatively small and inexpensive apparatus even if not applicable for volume manufacturing so as to facilitate failure analysis operations on the devices under manufacture.

The present invention can be implemented with hardware much simpler and less expensive than that of most test equipment used for similar purposes. The hardware required can be made extremely reliable and may have a minimum of moving parts. The overall throughput which can be achieved is extremely high. It is possible to build simple versions of the apparatus for failure Be analysis very economically. No contact to the active area of the flat-panel display is required. The present invention also allows for localization of defective points to exceedingly high resolutions without the need for operator guidance. In light of all this, it will be appreciated that the present invention constitutes of substantial improvement over prior art.

SUMMARY OF THE INVENTION

The present invention furnishes a group of analytical techniques and systems in which localized change in temperature is employed in determining the location and nature of defects in flat-panel devices. The nature of the defects includes the electrical properties, resistance or capacitance.

In the field of semiconductor integrated circuit manufacturing, techniques exist which are often referred to as OBIC (Optical Beam Induced Current) or LIVA (Light Induced Voltage Alteration). Several apparatus have been built for semiconductor integrated circuits using laser beam, electron beam, or ion beam scanning. No application of this art has been made to the flat-panel display field, and as the physical scale, materials and processes used, and the embodiments are all different, the present invention cannot be considered an obvious extension of art in the different field of semiconductor integrated circuit fabrication.

It is well known that when dissimilar materials meet in an electrical junction, there is produced a temperature dependent electromotive force. This effect is known as the thermoelectric effect. The general name for devices based on this effect is the thermocouple. As used herein, the term "thermocouple" shall be understood to mean the junction formed by the close proximity or meeting of dissimilar materials without regard for whether that junction was deliberately created or the consequence of a defect or the absence of a defect in the device. The effect is material dependent, sometimes very sensitively. It is also dependent on characteristics of the material such as the alloy structure or magnetic phase of the material. When the potential is measured around an electrical circuit with dissimilar materials as described, the thermoelectric effect gives rise to a thermoelectric potential which is related to the difference in temperature at the each junction of dissimilar materials. Typically, the thermoelectric potential is on the order of 0.001 Volt for temperature differences of 100 degrees Centigrade. In general, the value of this potential is size independent down to dimensions on the scale of the electron mean free path in the material (which for metals may be on the order of 100 Angstroms or less). Considering the above description of the thermoelectric effect, it is apparent that a conducting junction is not necessarily required to observe the thermoelectric effect. For example, a capacitor formed with two different metal plates and an air gap will generate a thermoelectric electromotive force in an electrical circuit until the stored charge in the capacitor exactly counteracts the thermoelectric electromotive force.

It is also well known that the resistance of materials changes with the temperature of the material. Depending on the exact nature of the material, this change may be quite linear with temperature, or, as in the case of semiconductors, be quite rapid and exponentially dependent on the temperature. In essentially all cases, however, if a constant current flows through a material, there will be an electric field generated in the material whose magnitude will be temperature dependent. This electric field, when summed over the length of the current path, gives rise to a temperature dependent voltage drop across the material which may be measured by an external device. This principle has been used for decades for a type of optical detector known as a "bolometer." In this case, an insulating junction will not flow any current and therefore the effect cannot be observed. Nothing is a perfect insulator, however, and it is to be understood that highly resistive materials such as might be found in a defect are part of the class of materials in which this effect may be used. It is also the case that capacitive currents can be significant in the presence of time varying fields and that the change in resistance may be used even if a continuous circuit is not made.

It is also well known that a material undergoing a phase transition may undergo a change in resistivity. Typically, phase transitions occur at a particular temperature and environmental condition such as pressure, applied magnetic field, or other external field in the physics sense of the word. By controlling the temperature or other environmental conditions, a phase transition may be induced in a particular material. The Curie point is an example of a ferromagnetic phase transition occurring at a temperature referred to as the Curie point or Curie temperature. For example, heating of a Nickel metal above its magnetic Curie point at about 358 degrees Centigrade causes it to undergo a phase transition to a paramagnetic state. Additions of small amounts of impurities to Nickel alloys can cause the Curie temperature to change significantly, especially toward lower temperature. As this transition occurs, the electrical resistance of the material changes abruptly.

Other examples of temperature-induced phase transitions include alloy phase transitions, or transitions between crystalline and non-crystalline forms. It should be appreciated that a phase transition can occur very rapidly and is often reversible as the temperature and environmental path to the phase transition is retraced.

Thermal energy flows through solids according to well established principles of heat diffusion in solids. In this theory, heat flows substantially according to Fick's law of diffusion which can be stated as:

$$\dot{Q} = k(T)\nabla T$$

$$c_p(T)\frac{dT}{dt} = k(T)\Delta^2 T$$

where $\dot{Q}$ is the vector flow of heat k(T) is the thermal conductivity of the material in question at its temperature $c_p(T)$ is the heat capacity of the material in question at its temperature T is the temperature at a given point.

Small modifications to this law do occur, but under most circumstances these effects can be neglected or they can be incorporated into the largely phenomenological constants $c_p(T)$ and k(T). Fick's law permits the calculation of the characteristic durations which are required for heat to diffuse from a point, area, or volume source in or on a solid, such as a flat-panel display. Typically, for glasses used for flat-panel display manufacturing, the thermal conductivity k(T) is approximately 1 W/(m deg C) and the heat capacity is approximately $2\times10^6$ J/(m$^{3\circ}$ C.). In the event that flat-panel displays are manufactured on other substrates, such as quartz or ceramics, substantially different values may be obtained. It is a straightforward matter to show that the radius which heat will substantially diffuse in a given time in glass of this sort is on the order of $$r=0.0014 \text{ sqrt}(t) \text{ meters,}$$

where t is in seconds. Therefore, the characteristic time for 10 micron diffusion is about 50 microseconds. Similarly, for 100 micron diffusion, the time is about 100 times longer or about 5 milliseconds. These times are very convenient for testing flat-panel displays because they provide for many thousands of independent testing events per second at the size scales present on flat-panel displays without undue thermal diffusion which would increase the required thermal energy input as well as reduce the spatial resolution of the invention. For any given situation, a calculation of the thermal diffusion characteristics in both space and time has to be done to determine an efficient temporal and spatial profile of thermal energy excitation of the device under test.

In accordance with one aspect of the invention, a change in the temperature within a first region of a display panel or grid results, if certain electrical conduction paths exist, in a voltage and/or current change in a signal which may be electrically measured locally by direct contact or by contact to external electrical connections on the device. In some embodiments the voltage and/or current change (referred to collectively herein as a power change) occurs only if the subject conduction paths exist within the region of the temperature change, and in other embodiments the subject conduction path does not need to be within the region of temperature change in order for the power change to appear. Also, in some embodiments the presence of the subject conduction paths indicates a defect (e.g. a short), wherein in other embodiments the absence of a current path indicates a defect (e.g. an open-circuit type defect).

The power change measured will be characteristic of the temperature change, the temperature of the device, the electrical properties of the device, the electrical measuring apparatus, and the duration and temporal history of the temperature change. Because of the potentially complicated electrical properties of the device and the diffusion of heat within the device, a processor is normally attached to the electrical measuring apparatus to make the determination of the existence or non-existence of a subject current path and its location. It will be understood that the location and magnitude of the temperature change may change with respect to the device in time and in position with respect to the wafer. It will also be understood that the application of thermal energy is meant to be thermal energy delivered to or removed from the device under test and not the form of the energy delivered from the external apparatus. In many cases, the form of the energy delivered will not be thermal, as in the case of a laser with electromagnetic light energy. Nevertheless, the energy will be deposited in the device in the form of thermal energy.

In accordance with a further aspect of the invention, thermal energy is transferred to or from the device by external apparatus to effect the necessary temperature change. In one embodiment, a laser is focused on the surface of the device for the purpose of transferring thermal energy. It is to be understood that there are many methods of transferring thermal energy such as inductive coupling, infra-red radiation, and others, all of which are referred to herein as ways of inducing a temperature change within the device under test.

In accordance with a further aspect of the invention, the device under test itself may be designed so as to change the electrically observed effect. In particular, the device may be designed to provide increased power effects or reduced noise in the observed electrical signal, thereby increasing system sensitivity. These design changes may include, but are not limited to, changes in the geometry of the interconnections and electronic components of the device, changes in the composition or preparation of some or all or parts of the interconnections and electronic components of the device.

In accordance with a further aspect of the invention, the application of thermal energy may be by an optical beam or a laser. In this case, the beam may be moved across the device, or the device may be moved with respect to the beam or both.

In accordance with a further aspect of the invention, the application of thermal energy may be by the application of hot or cold gas or fluid, such as air, nitrogen, helium, argon, freon, alcohol, etc. to a localized region of the device. For example, an air knife is a frequently used device for cleaning the surface of flat panels. Such a device if combined with a heater would be capable of raising the temperature of the device in a local region which would permit the localization of defects. It is possible to construct a similar hot gas source which would be effective over a very restricted area, thereby imparting high spatial resolution to the defect location.

In accordance with a further aspect of the invention, when the application of thermal energy is by an optical beam or a laser, the intensity on target may be increased with a multi-pass or resonant structure thereby allowing for increased absorption of laser energy. It is typically the case that metal films have high reflectances, of the order of 85 percent. As a result, most of the optical energy applied to the device under test will be reflected and not useful for heating the device. By re-reflecting the reflected beam so as to impinge on the target twice or more, it is possible to greatly increase the amount of optical energy absorbed, or conversely, to greatly reduce the amount of optical energy required. It will be appreciated that this can result in a significant practical benefit.

In accordance with a further aspect of the invention, the application of thermal energy at one position on the device may result in a change of the measured current or voltage indicative of a defect at the same or a different position on the device. For example, if an anomalous current flows in the device due to a defect, the position or magnitude of the anomalous current could signify the location of a defect different from where the current flows or does not flow, as the case may be.

In accordance with a further aspect of the invention, the absence of a voltage or a current could be used for the purpose of detecting the presence of or location of defects. For example, it is commonly the case that open circuit defects are produced in the manufacture of LCD displays. In this case, the absence of a voltage when a voltage would be expected for a functional device could indicate the presence of an open-circuit-type defect.

In accordance with a further aspect of the invention, the localization of the defects may take place by doing an exhaustive search of the entire device or substantially all of the device. An exhaustive search is one in which thermal energy is applied to every point of the device in sequence and therefore every point on the device is tested for the presence or non-presence of a defect.

In accordance with a further aspect of the invention, the localization of the defects may be accomplished by using a binary search technique. By inducing a temperature in successively reduced areas of the device, it is possible to localize the defect to an area whose size decreases exponentially with the time spent localizing. For example, one half of the device could be tested in accordance with the invention. At this point the presence of a defect in this half would necessitate the test of one half of the already tested half By repeating this process within the tested half and then repeating on the other half, always terminating when the absence of a defect is found within the tested area, a search with exponential resolution may be realized. It will be appreciated that practical factors may preclude a strictly binary search, but other search algorithms which may include a progressive narrowing component, are intended to be within the spirit of the invention.

In accordance with a further aspect of the invention, the localization of the defects may take place by using a coarse search followed by a fine search or any combination of the above methods with a coarse and fine search. A coarse and fine search is often the preferred embodiment for large panels. In this case, a search of all rows and all columns is made to determine those rows and columns likely to contain defects. A list is formed of likely rows and columns based on the probability of occurrence of a defect at a particular row and column and the areas so described are inspected in an order chosen by a suitable algorithm. The points are inspected by the above described techniques and search methods, or by conventional methods, until either a repair action can be attempted, no defect is found, or the device is determined to be unrepairable.

In accordance with a further aspect of the invention, the localization of the defect may occur within a very small region of the device under test. For example, another method may be utilized for determining a rough location of a defect and the present invention can be used to localize the defect to a smaller area.

In accordance with a further aspect of the invention, the energy transferred to the device can be controlled by measuring the energy emanating from the device. For example, if a laser were used to apply the thermal energy, the energy in the reflected laser light could be measured for the purpose of controlling the temperature change at the device. Similarly, with appropriate filters, infra-red radiation from the surface could be used to measure the temperature change at the device even in the presence of a strong laser beam.

In accordance with a further aspect of the invention, the points to be probed for defects need not be visible from either the front or back surface of the device. Similarly, the thermal energy may be applied from any direction. In particular, in the case of a laser used to apply the thermal energy, the laser may be applied from the back surface of the device. It is not necessary that the actual defect point be visible as thermal energy will diffuse into the device in a predictable and repeatable fashion.

In accordance with a further aspect of the invention, it is possible to measure either the voltage or the current or a combination of both depending on the electrical network to which the device is attached. The practical implementation will often determine which or what combination of these measurements is most efficacious. In the case of pure current measurement, it is desirable to apply a fixed or substantially fixed voltage bias to the device under test while the current measurement is performed. In the case of pure voltage measurement, it is desirable to apply a fixed or substantially fixed current bias to the device under test while the voltage measurement is performed. In the case of a combination measurement, the choice of combination of applied voltage and current bias can be made according to the well established principles of electrical circuit theory. It will be appreciated that for certain embodiments, such as those relying on a thermoelectric effect, no bias at all may be required.

In accordance with a further aspect of the invention, the applied voltages, currents or thermal energy to the device under test may be varied in time. Variation of the thermal energy application in time can take the form of varying the magnitude of the energy application, the position of the energy application with respect to the device under test, or a combination of both variations. The variation of the applied voltages, currents, or thermal energy to the device under test can in many situations be utilized to increase output signal, reduce noise, or increase the rate at which the test and localization can be performed.

In accordance with a further aspect of the invention, test apparatus for implementing the present invention can be designed so that it attaches to or is aligned with another already present apparatus such as a microscope or other flat-panel inspection or repair device (inspection device). The test apparatus can be designed so that an internal thermal energy source, such as a laser, can be directed to the device under test by the inspection device. Provision for electrical connections to the device under test are made. Internal to the test apparatus the thermal energy source may be directed to selected locations within the field of view of the inspection device, or the inspection device can be directed to move the device so as to move the location of the thermal energy source relative to the device, or an operator can manually achieve this relative motion either independently or at the direction of a processor within the apparatus. In this manner, the defect points on a flat-panel display may be rapidly localized with an easy to construct and very low cost addition to a pre-existing inspection device. This aspect of the invention may be used in conjunction with any combination of the above described aspects of the invention.

The present techniques for localizing and measuring characteristics of defects are quite simple. The components of the invention are commercially available and compatible with the conditions under which the devices described above are manufactured and assembled. The test process can be implemented in an entirely automated approach and can be extremely rapid. The technique does not require physical contact except to external connections on the device where contact presumably would be made eventually anyway. There are many ways that the thermal energy may be applied to the device. Consequently, the invention provides a large advance over the prior art.

BRIEF DESCRIPTION OF THE DRAWINGS

The invention will be described with respect to particular embodiments thereof, and reference will be made to the drawings, in which like numerals represent like members, and in which:

FIG. 1b is an enlargement of a portion of the FED of FIG. 1a.

FIG. 2b is an enlargement of the row and column crossing of FIG. 1a.

FIGS. 3b, 3c and 3d are symbolic diagrams of alternative sensors of FIG. 3a.

FIG. 9b is a schematic diagram of the LCD cell shown in FIG. 9a.

FIG. 17b is a block diagram of the apparatus 1701 in FIG. 17a.

DETAILED DESCRIPTION

Figure 1A:
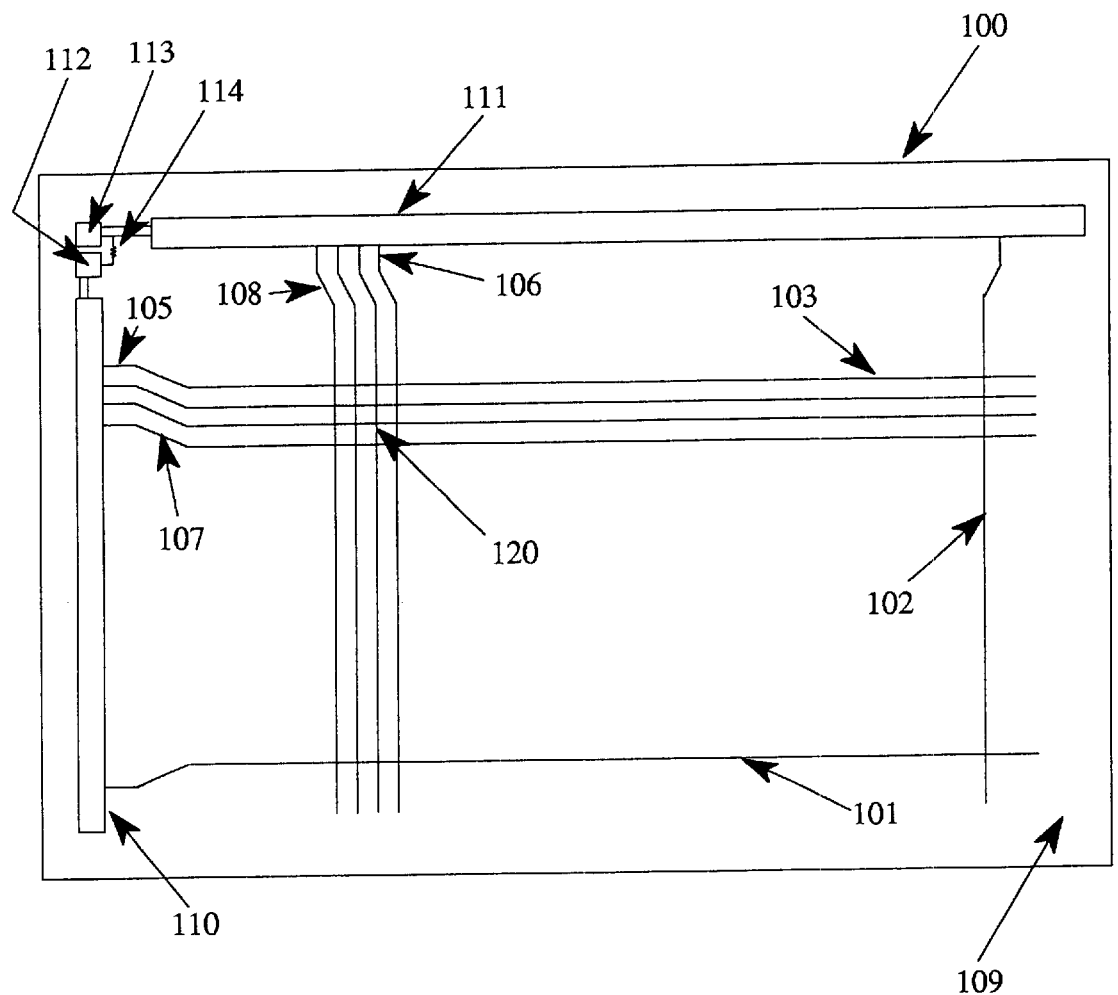
FIG. 1a is a stylized diagram of a field emission display backplane.

Temperature dependent electrical measurements are used in the present invention to facilitate the detection and/or localization of defects produced in the manufacture of products such as flat-panel displays. These displays can serve as a flat-panel television or a flat-panel video monitor for a personal computer, a lap-top computer, or a workstation.

For all of the following preferred embodiments, reference will be made to specific structures and patterns on the devices under test. It must be understood that the exact form of these structures and patterns will vary depending on the device, and the names commonly used to refer to the structures and patterns will vary depending on the situation and the device. Nevertheless, the preponderance of flat-panel displays will have essentially equivalent structures and patterns and therefore it is the structures and patterns that fall within the spirit of the invention, not the nomenclature for same. For example, throughout the present text, referral is made to "rows" and "columns." In a LCD flat-panel display, the rows and columns are often referred to as the "gate" and "drain," or "common" traces. In general, there is no significance to the pairing of "gate" to "row" or to "column," or any other trace to any other name. In fact, depending on the orientation of the device, rows could be called columns and vice versa. Similarly, the terms "horizontal" and "vertical" are also used interchangeably herein (except, of course, when they are used as against each other). For the purposes of the present description, it is merely significant that there is an array of overlapping traces which are used to convey electrical signals from control electronics to the interior of the device. The traces need not be perpendicular, nor need they be oriented along any particular coordinate frame with respect to the device.

Throughout the text, reference will be made to the electrical contact to row and column busses 110 and 111 and to contact patches 112 and 113. It will be appreciated that electrical contact to either the contact patches or the driver areas is electrically substantially equivalent, and for the purposes of the present description is therefore equivalent. It would, of course, be possible to construct a device without such features, but with some other manner of making electrical contact, or perhaps to the individual traces in the driver area. It would also be possible to construct a device in which contact would not be electrically equivalent between the driver areas 110 and 111 and the contact patches 112 and 113. In any event, the meaning of "electrical contact to the busses" is that an electrical current may flow to an area of the flat-panel display through the contact. This is to be distinguished from "electrical contact to a trace or column or row" which refers to a contact chosen so as to allow a current to flow to a particular trace, column, or row. It is possible, depending on the bussing arrangement for an electrical contact to be of both types. It is also possible for an electrical contact to supply a current to a particular trace with a lower resistance than to a electrical bus or vice versa. For example, a single probe pin on a single driver trace on the device 100 may deliver current to that single trace as well as to the entire electrical bus, but the resistance to the single trace may be substantially less than to the bus, and therefore a "preferred" contact has been established to the single trace with respect to the rest of the electrical bus. Occasionally, the electrical busses are divided up into many column or many row busses or both. In this case, the fractional area of the display to which a current may flow from a single bus may be relatively small, and yet it is clear that the electrical function of the busses remains that of providing a single source of electrical current for a number of traces.

Figure 23:
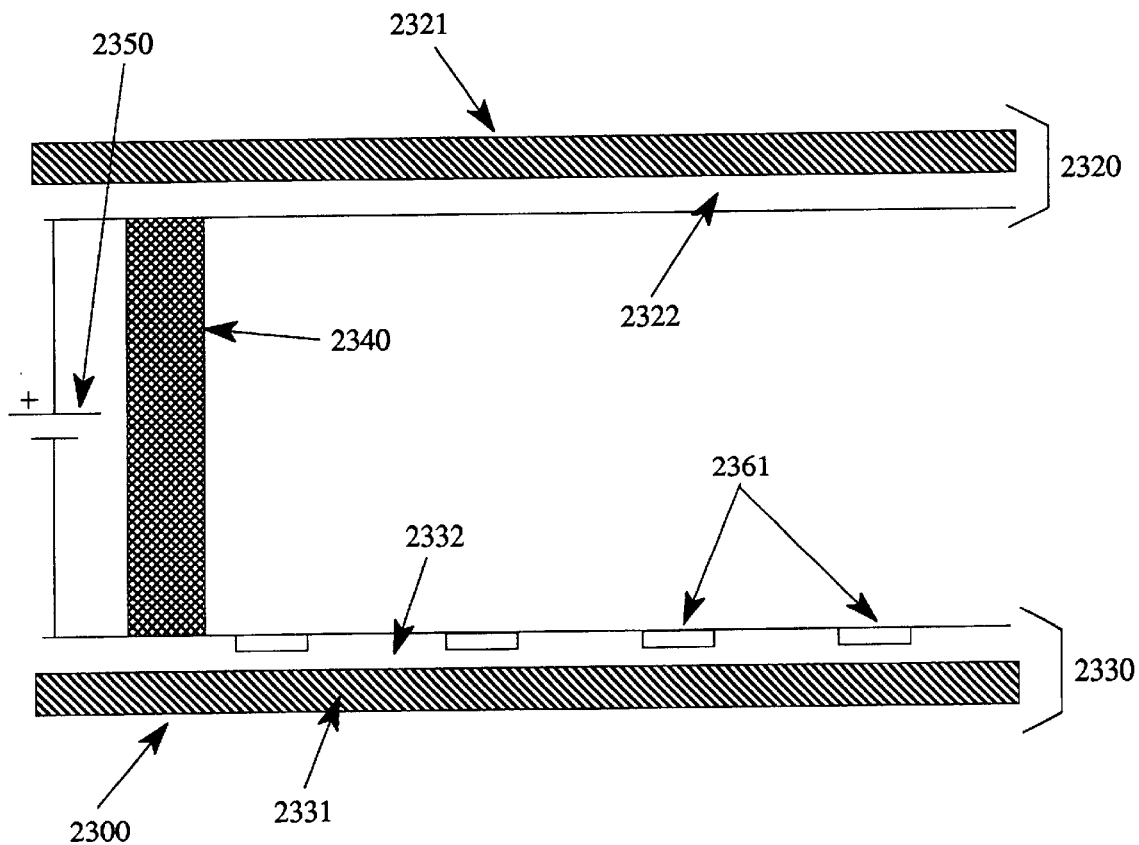
FIG. 23 is a simplified edge view of a portion of a field emission display.

Conventional field emitting displays (FEDs) typically include a faceplate structure and a backplate structure which are joined by connecting walls around the periphery of the, faceplate and backplate structures. As used herein, the term FED includes what is sometimes referred to as a surface-emission device (SED). FIG. 23 is a cross sectional and schematic view of a portion of an FED 2300. It includes a faceplate structure 2320, backplate structure 2330, spacer 2340 and high voltage supply 2350. Although only one spacer 2340 is shown in FIG. 23, it is understood that FED 2300 includes similar additional spacers which are not shown.

Faceplate structure 2320 includes an insulating faceplate 2321 (typically glass) and a light emitting structure 2322 formed on an interior surface of the faceplate 2321. Light emitting structure 2322 typically includes light emissive materials, such as phosphors, which define the active region of the display 2300. Light emitting structure 2322 also includes an anode (not shown) which is connected to the positive (high voltage) side of voltage supply 2350.

Backplate structure 2330 includes an insulating backplate 2331 and an electron emitting structure 2332 located on an interior surface of backplate 2331. Electron emitting structure 2332 includes a plurality of electron-emitting elements 2361 which are selectively excited to release electrons. Electron emitting structure 2332 is connected to the low voltage side of voltage supply 2350. Because light emitting structure 2322 is held at a relatively high positive voltage (e.g., 5 kV) with respect to electron emitting structure 2332, the electrons released by the electron-emitting elements 2361 are accelerated toward corresponding light emissive elements on the light emitting structure 2322, thereby causing the light emissive elements to emit light which is seen by a viewer at the exterior surface of the faceplate 2321 (the "viewing surface"). Other aspects of FED structure can be found in the above-incorporated PCT Publication No. WO 98/02899, as well as the other references incorporated above.

When an FED is manufactured, typically the faceplate and the backplate are made separately and brought together for subsequent joining. They are typically made in large wafers, for example carrying an array of 6–9 individual face plates or backplates, which are cut into individual face plates or backplate before joining. It will be appreciated that aspects of the techniques described herein can be used either on an entire backplate wafer, or on an individual backplate after cutting. As used herein, the term "display component" refers to an unfinished or finished product in the manufacture of a display, but not including any integrated circuit chips that might be fabricated separately and then bonded to a part of the display. For purposes of FEDs, includes cut and uncut backplates.

In addition, a "wafer", as used herein, refers to the substrate on which conductive traces are formed. In the FED example of FIG. 23, the glass 2331 constitutes a wafer. In other technologies a wafer can be glass, polymer, quartz, ceramic, and so on. A "flat panel display wafer", as the term is used herein, refers to a substrate on which conductive traces are formed for creating a flat panel display. The term includes glass, polymer, quartz and ceramic materials, but specifically excludes single-crystal materials such as those that might be used to manufacture integrated circuits. Single-crystal materials would be hugely expensive to make in the sizes required for flat panel displays, and quite unnecessary for that purpose as well.

Figure 24:
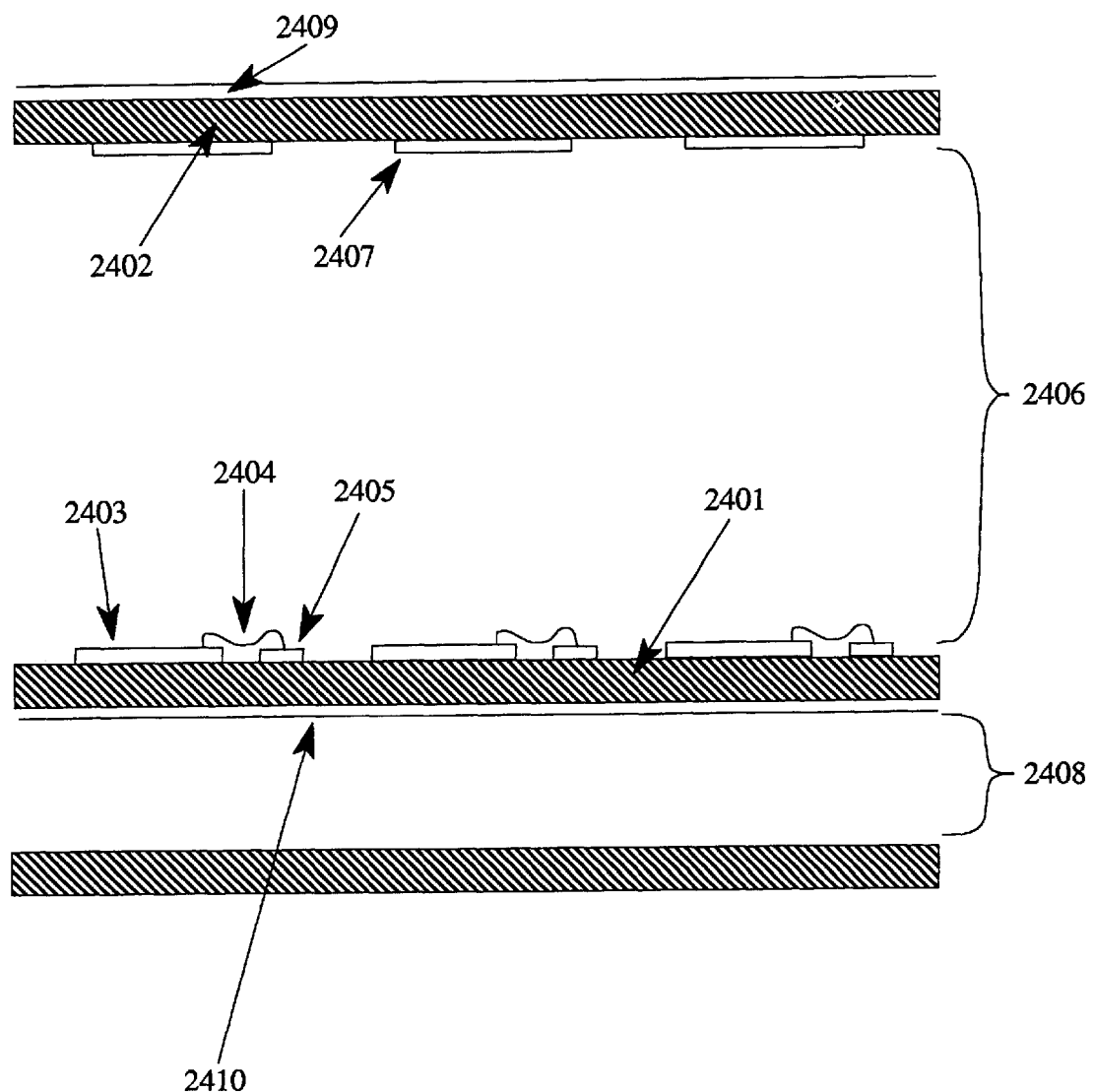
FIG. 24 is a stylized and simplified edge view of a portion of a liquid crystal display.

FIG. 24 shows the side view of the typical construction of a LCD-type flat panel display. The backplate 2401 and the frontplate 2402 each typically have a respective polarizing filter 2409 and 2410 attached to them or fabricated on or within them. The backplate 2401 is aligned and affixed to the frontplate 2402 complete with color filters 2407 to give the pixels the characteristic red-green-blue color. An electric field is applied by Indium-Tin-Oxide(ITO) regions 2403 into the region between the frontplate 2402 and the backplate 2401. This region is typically filled with a liquid crystal molecular substance 2406. The ITO regions 2403 typically include a storage capacitor(not shown) and are charged and discharged through transistors 2404 neighboring drain lines 2405 which typically run in a direction as rows or columns on the display. The transistors are typically controlled by gate lines(not shown) running perpendicular to the drain lines. Behind the backplate 2401 is mounted a backlight 2408 which is normally a flourescent-type plasma light source which is carefully designed to transmit light through backplate-frontplate assembly. It will be appreciated that this arrangement provides for an externally electrically controllable electric field in a localized region of the liquid crystal substance 2406. This field results in a rotation of the polarization of the light from the backlight 2408 which in turn changes the transmission through the two polarizing filters 2409 and 2410. Normally some arrangement is used to provide for a constant gap between the frontplate 2401 and backplate 2401 such as plastic or glass spacer balls of size in the range of 5 to 50 microns. (not shown).

Figure 1B:
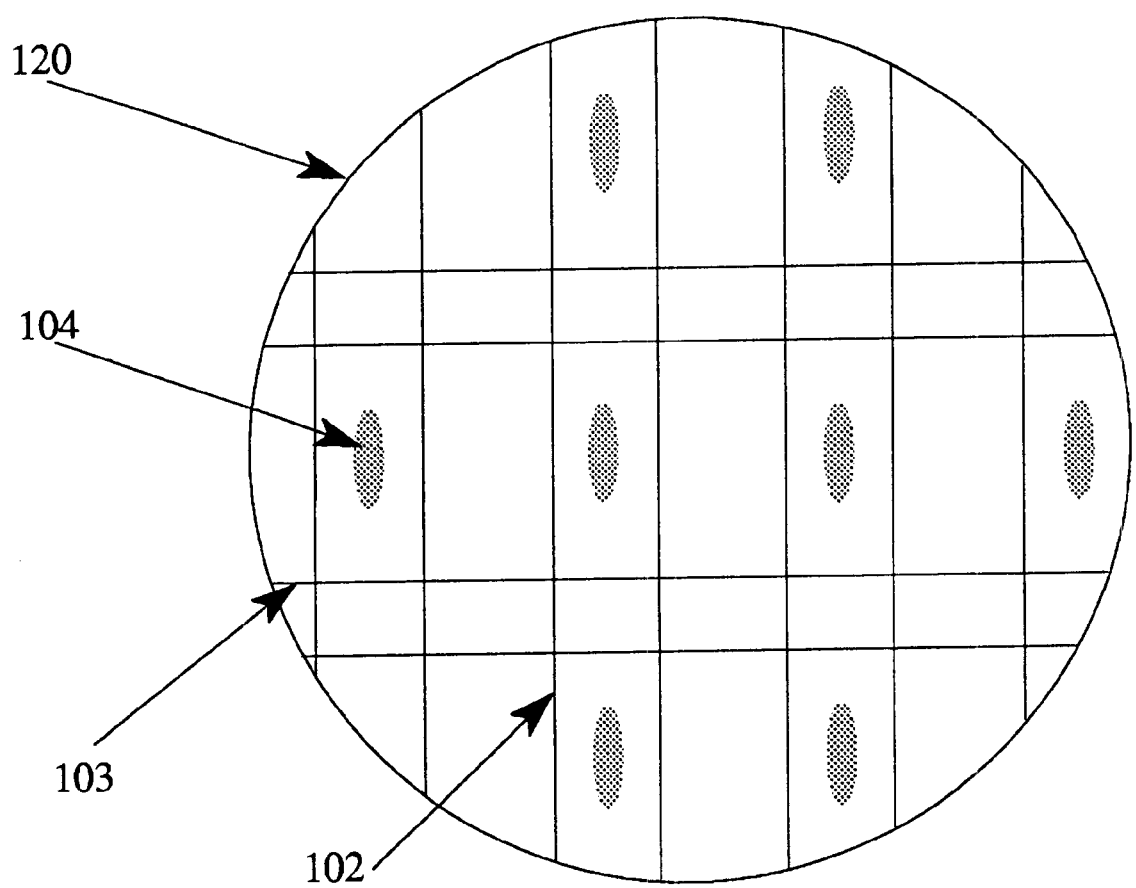

FIGS. 1a–1b (collectively "FIG. 1") illustrate how the electron emissive part (cathode) of an FED is constructed on a backplate such as 2330 (FIG. 23). FIG. 1a is a top view of an FED backplate, and FIG. 1b is an enlargement of the region 120 of FIG. 1a. The FED includes a collection of row electrodes 101 and column electrodes 102 which overlap at row/column crossings to form electron emission sites 103 for each pixel of the display. As row and column metal overlap at electron emission sites 103, there is a possibility of short circuit defects at these locations. The actual region of electron emission 104 is typically somewhat smaller and possibly of different shape than the overlap region. Short circuits may also occur within the region of electron emission 104. The rows and columns typically but not necessarily form a regular array of pixels spaced at the pitch, or approximately the pitch, of the pixels of the display. The rows end in a row driver area 105 for the connection of driving electronics. Similarly, the columns end in a column driver area 106 for the connection of column driving electronics. Typically, the layout of the conductors in the driver areas is of a standardized shape for the mating of special electronic devices. Normally, this spacing is in the range of 40 microns to about 200 microns and the width is from 1 to 4 millimeters. The rows 101 and columns 102 are typically at a different spacing than that of the driver areas 105 and 106. In order to match the spacing of the rows with the row driver area, there is typically a matching region often referred to as a row fanout region 107. Similarly, there is a column fanout region 108 for the columns. The entire cathode is typically fabricated on a plate of glass 109, as previously mentioned, and an insulating layer, not shown, between the rows and the columns is normally provided. For the purposes of electrostatic discharge protection during manufacture and for process reasons, all the rows and all the columns are typically electrically connected together by row shorting bus 110 and column shorting bus 111 respectively, as shown. Usually, but not always, the shorting busses lead out to the edge of the wafer where a prescribed row contact patch 112 and a column contact patch 113 are provided. Sometimes there is a resistor 114 provided between the row and column busses also for electrostatic discharge protection. Typically, the resistor 114 has a resistance large enough that the application of an electrical voltage or current to the device under test is still possible. The bus bars 110 and 111 are typically severed from the row and column conductors 101, 102 during a subsequent stage of manufacture. LCDs, too, are typically manufactured with row and column shorting bus bars which are severed from the row and column conductors at a subsequent stage of manufacture.

Figure 2A:
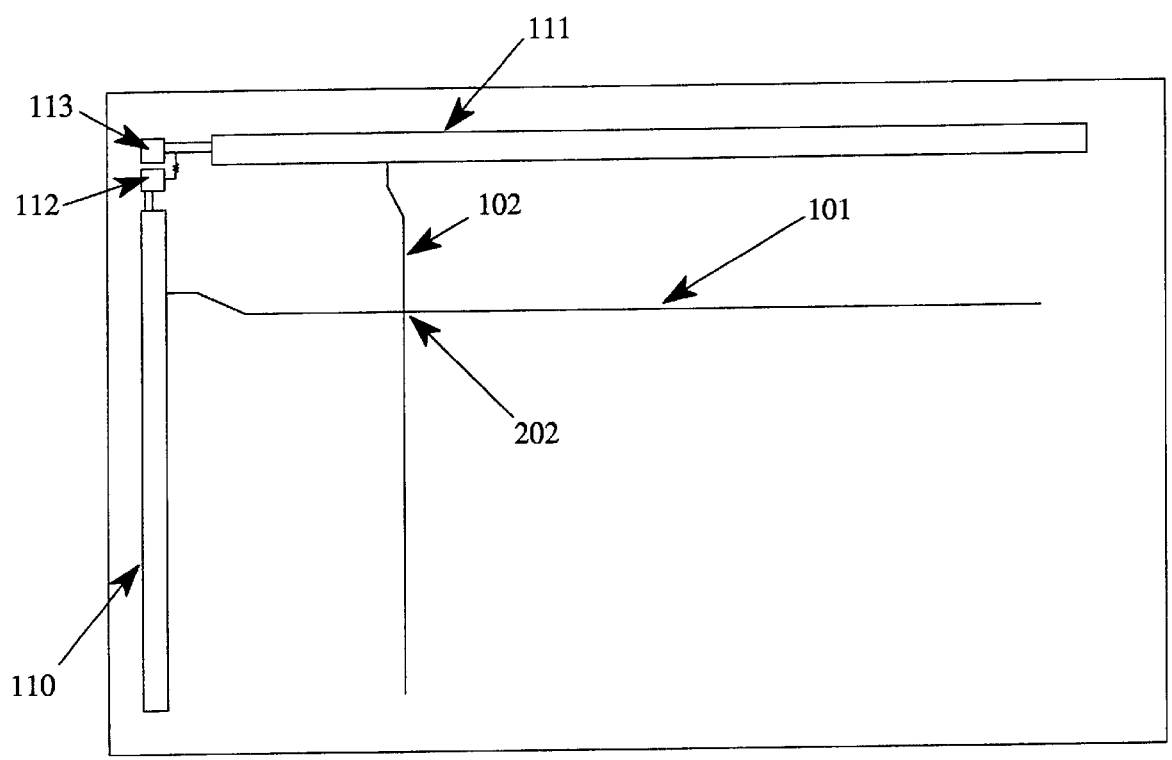
FIG. 2a is a stylized diagram of an FED backplate, with only one column and one row showing.
Figure 2B:
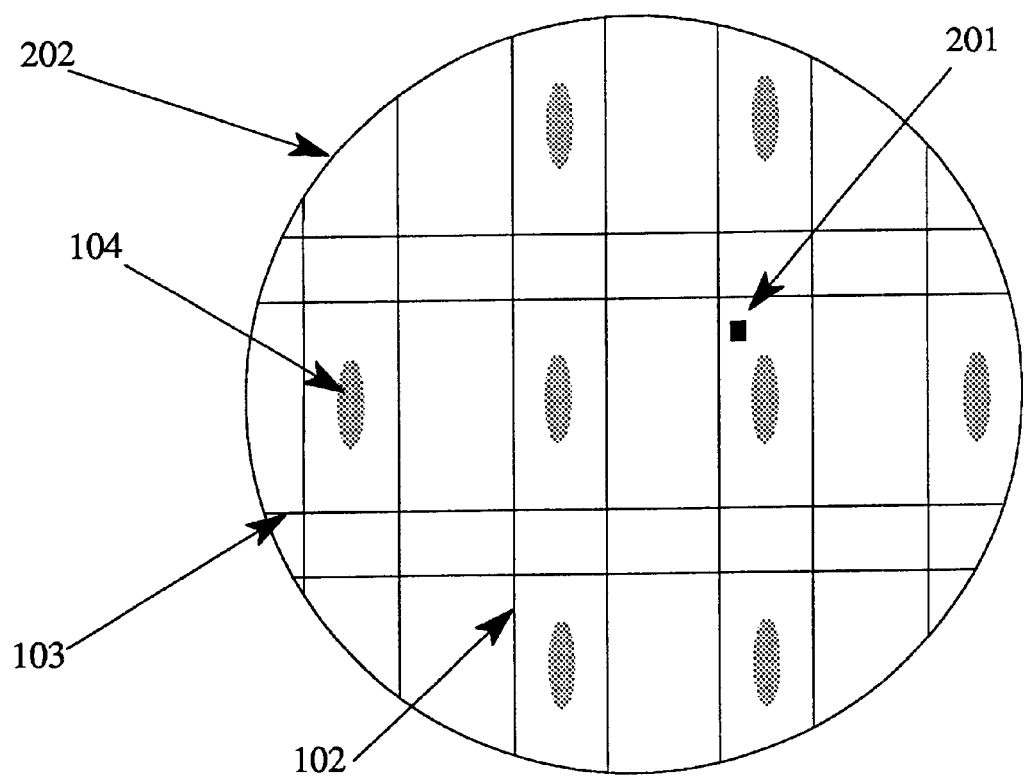

If a voltage is provided between patches 112 and 113, neglecting the effect of defects, it is to be expected that this voltage will appear between the rows and columns at every electron emission site 103. FIG. 2a shows relevant conductors of FED backplate 100 in the event of a conducting defect 201 at an electron emission site 202. FIG. 2b shows the emission site 202 enlarged. As can be seen, a current will flow from the column contact patch 113 through the column bus 111, the column driver area 106, the column fanout region 108, through the column 102 containing the defect to the defective electron emission site 103, through the defect 201, through the row 101 containing the defect, the row fanout region 107, the row driver area 105, and finally through the row bus 110 to the row contact patch 112. In the event that the voltage applied has a temporal dependence, the current which flows will be determined by the electrical characteristics of the FED array as well as the electrical characteristics of the conducting defect, namely its resistance and capacitance as well as a possible non-linear impedance. At typical frequencies of excitations, below 1 megahertz, it is normally the case that an ideal array electrically is similar to a large capacitor and the defect resembles a resistor.

It will be apparent from the above description that if the temperature were to be changed over any part on the device surface in the current path of FIG. 2a, then the change in resistance with temperature would result in a change in the total resistance of the device between the contact patches 112 and 113 or between the busses 110 and 111.

Figure 3A:
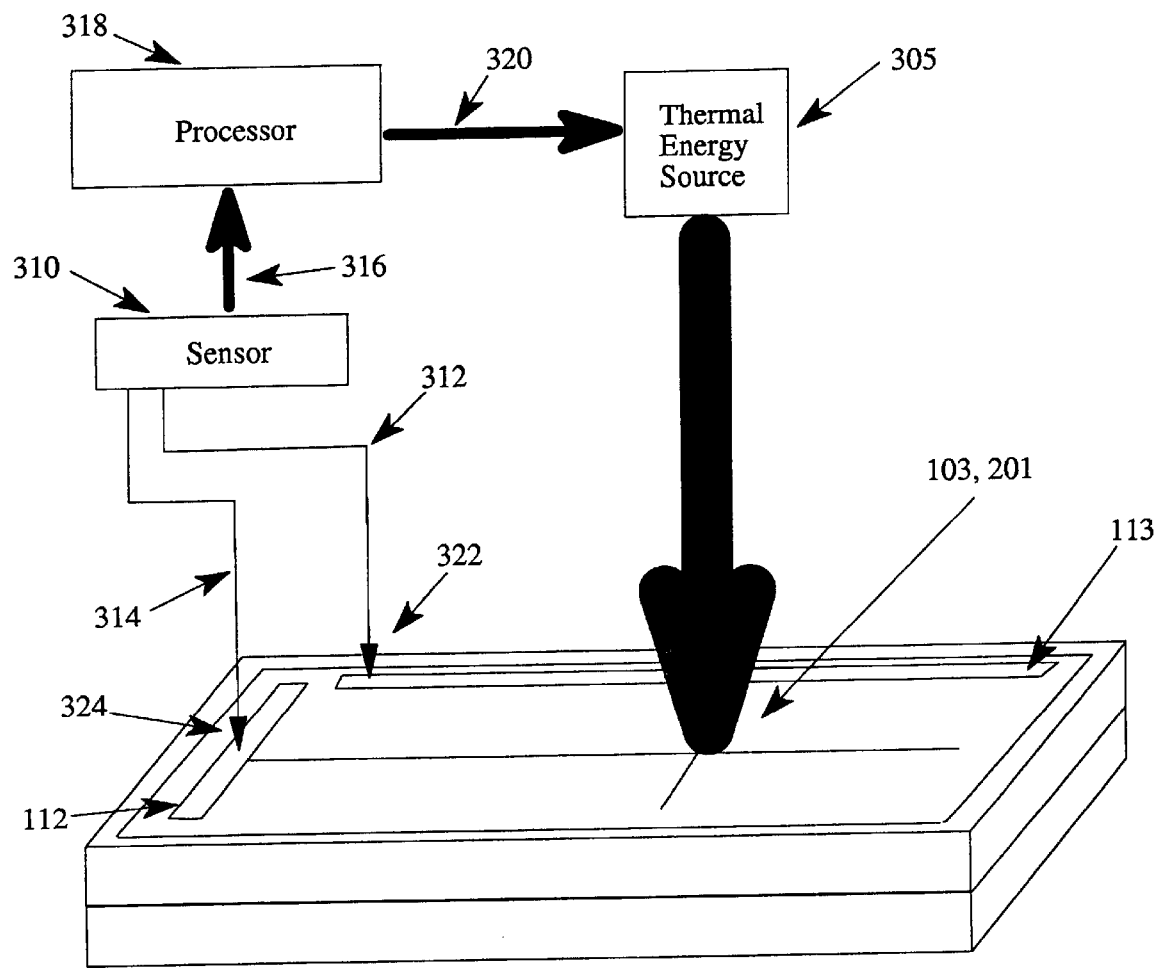
FIG. 3a is a stylized diagram of test apparatus for testing a flat panel display.

FIG. 3a is a block diagram of test apparatus that can be used with the invention. It comprises a sensor 310 having two sense terminals 312 and 314, and an output 316 connected to a processor 318. The processor has a control output 320 connected to control a thermal energy source 305. In operation, a device under test (DUT) such as a display backplate 100 is placed on a platform (not shown) which is translatable relative to the thermal source 305. It is not necessary that the platform itself be moveable, since it is often easier to steer or move the thermal energy source 305 instead. The terminals 312 and 314 are connected electrically to the column and row buses 113 and 112 by respective contact probes 322 and 324. In operation, the processor 318 controls the thermal energy source 305 (which may be a laser, for example) to induce a temperature change within the region of the electron emission site 103. If the short 201 is present, then the sensor 310 detects a change in the electrical resistance across its sense terminals 312 and 314 and reports this information to the processor 318.

Figure 3B:
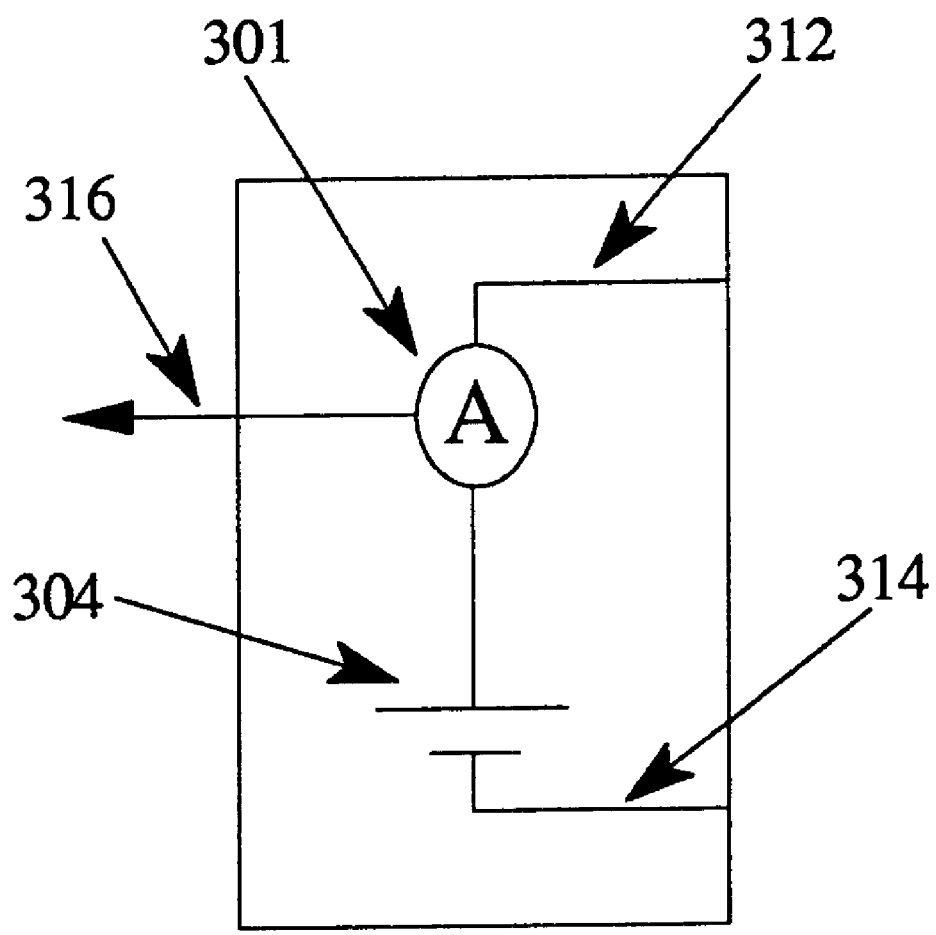
Figure 3C:
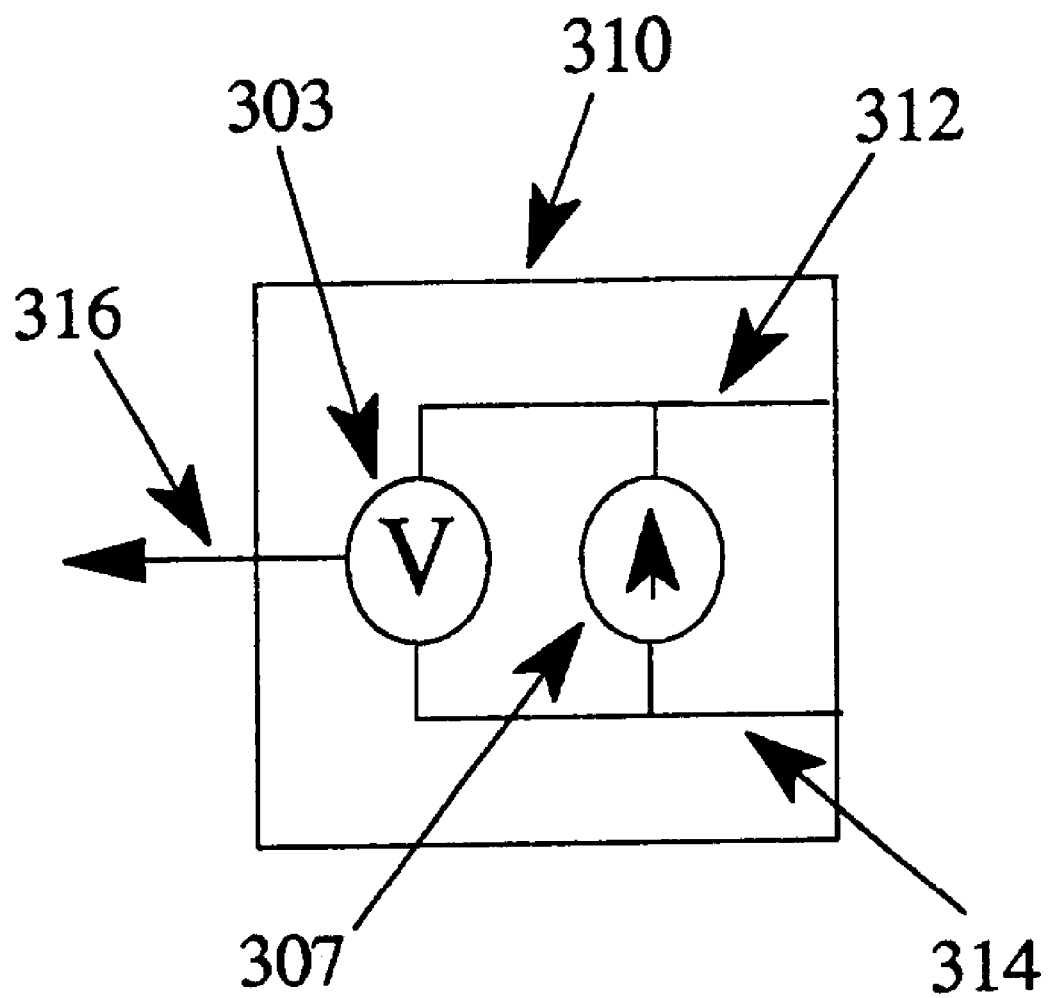
Figure 3D:
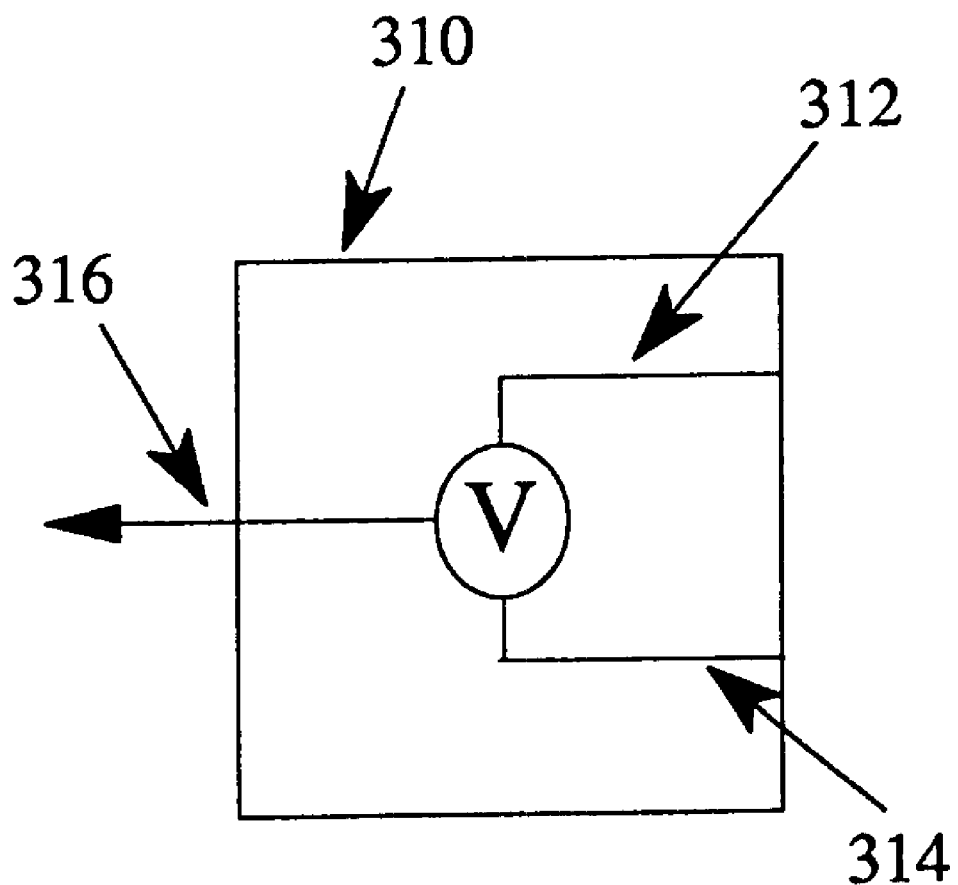

For purposes of the sensor 310, the DUT can be thought of as a 2-port network under test, the two ports being the points at which the probes 322 and 324 make electrical contact with the DUT. It will be appreciated that for different embodiments, the sense terminals 312 and 314 can be coupled to the DUT at points different from the column and row buses 322 and 324, in which case the two ports of the network under test will be located elsewhere on the DUT. It will be appreciated further that a purpose of the sensor 310 is to monitor an electrical signal in the DUT, which is detected from either of the two ports of the network under test, or both in combination, to detect changes of a predetermined type which might have been produced in response to the temperature change induced by the thermal energy source 305. If such a change is detected, then a current path is likely to exist between the two ports of the network under test. If such a change is not detected, then no such current path is likely to exist. The signal observed by the sensor 310 might in one embodiment be produced entirely by the DUT, for example in a thermocouple embodiment described elsewhere herein. In that case the sensor 310 might be simply a voltmeter as shown in FIG. 3d, or an ammeter. It is often preferable, however, if the sensor 310 also biases the 2-port network wafer test with a bias voltage or current, or both in combination, and the signal from the two ports are observed for the predetermined types of changes. For example, FIG. 3b illustrates one embodiment of a sensor 310, in which a fixed DC voltage is applied across the sense terminals 312 and 314 by a battery 304. The signal from the two ports is observed by ammeter 301.

Taking the sensor of FIG. 3b as an example, since the voltage is fixed by battery 304, a temperature change induced by thermal source 305 would give rise to a change in the total current which can be extremely accurately and quickly measured by ammeter 301, whose output 316 is normally provided to processor 302. An alternative embodiment is shown in FIG. 3c. In this case, a fixed current flows through the device due to current source 307, and the electrical measurement is that of the voltage across the device. In this case, in the event thermal energy is applied to the circuit path of the current, a change in voltage will be registered by the voltmeter 303. As before, the output of the voltmeter is fed to processor 302 for defect localization and reporting of this information on a display or into a data file.

It will be appreciated that if the current path does not include the region in which the temperature is changed, then no change in the sensed signal will be observed by the external ammeter 301 or voltmeter 303. Therefore, using the apparatus depicted in FIG. 3a including a heat source, such as but not limited to an external laser, it is possible to rapidly test for the presence or non-presence of a defect or defects on isolated areas of the device. By moving the heat source 305 in relation to the device, the entire area of the device can be tested in rapid succession. From a practical standpoint, this can be achieved by using electronically controlled mirrors to direct a laser beam on the surface of the device, having variable apertures on the laser beam, or by simply moving the device and/or the source with respect to each other.

Figure 15A:
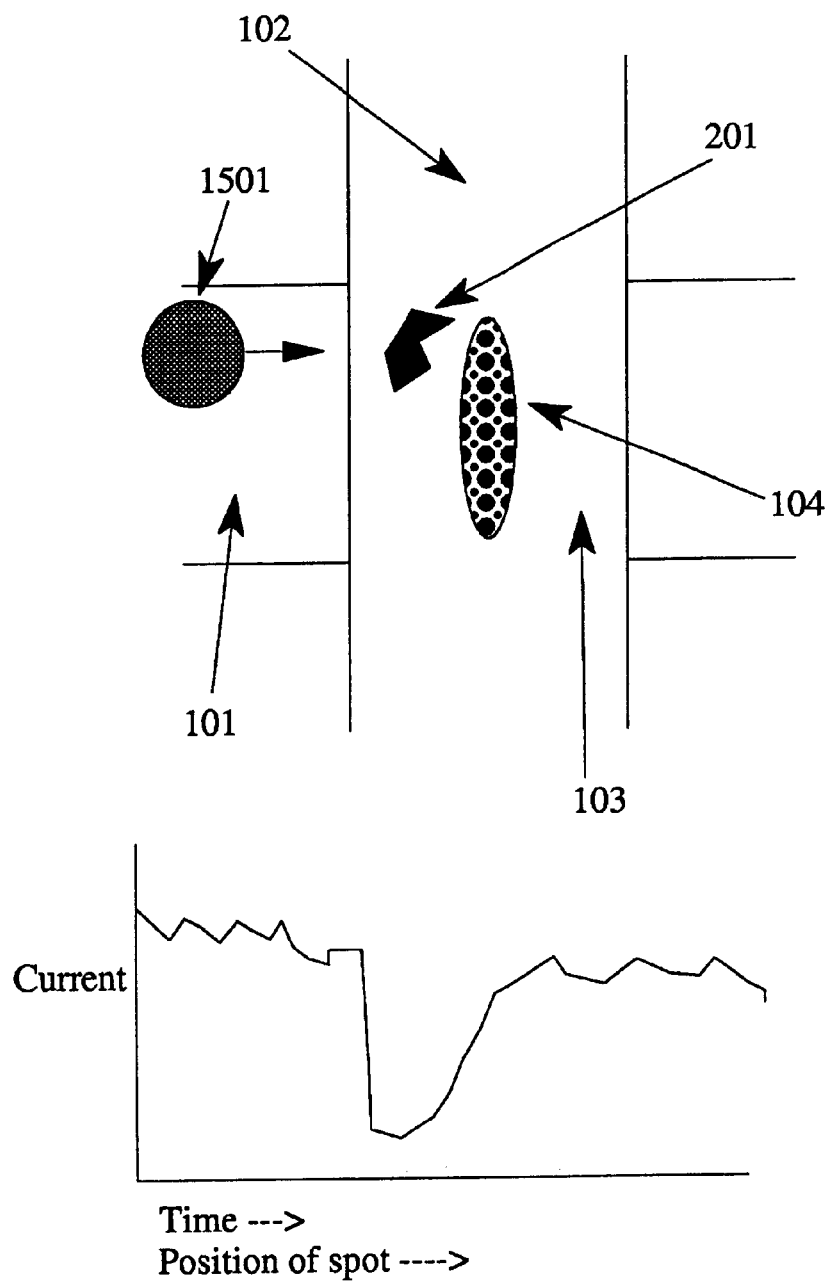
FIGS. 15a and 15b illustrate a row/column crossing containing a short-type defect, and an example signal change that might occur as a thermal energy spot traverses the defect.
Figure 15B:
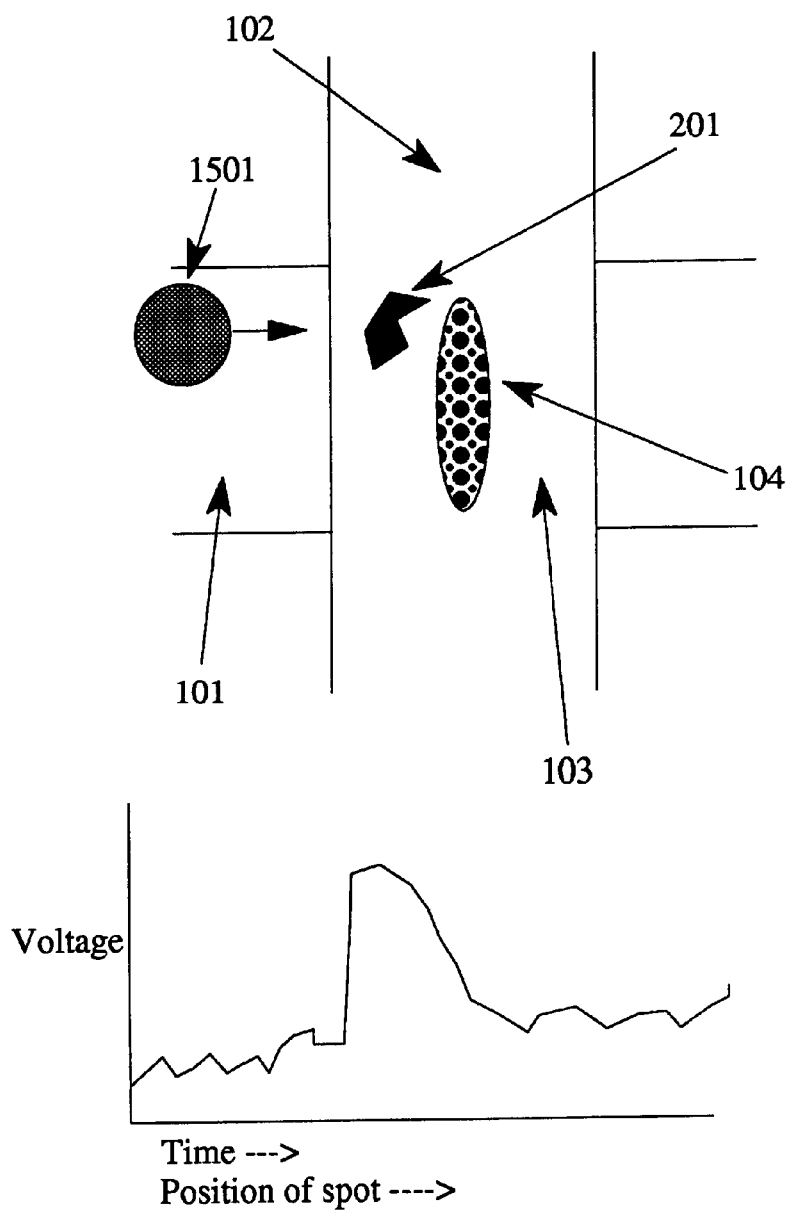
Figure 16:
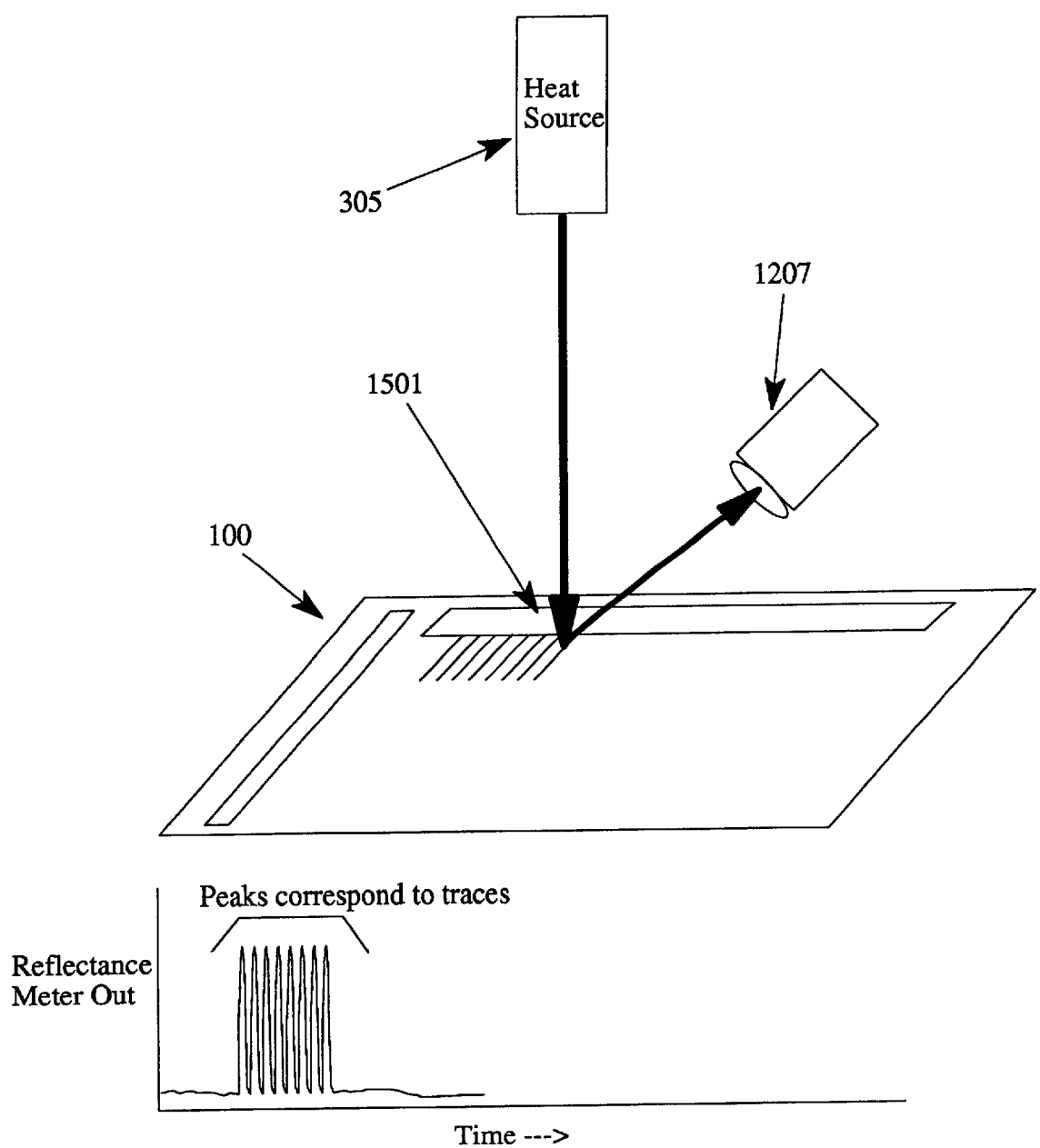
FIG. 16 illustrates a portion of a flat panel display, with an optical beam thermal energy source and a camera, together with a reflectance meter output during beam scan.

FIGS. 15a and 15b (collectively "Fib. 15") show the typical current and voltage measurements reported by the sensor 310 for sensors in the form of FIGS. 3b and 3c, respectively. In FIG. 16, the thermal source 305 applies thermal energy in a spot 1501 that moves across the device under test from left to right in the figure. The spot 1501, and therefore the region being heated, is smaller than the width of row conductor 101 but larger than the diameter of the interlayer short 201. The plots below the drawings indicate the sensor 310 output with the time axis representing the horizontal position of the spot of application of thermal energy 1501. Referring to FIG. 15a, it can be seen that before the thermal spot 1501 reaches the defect 201, the current measured by sensor 310 is substantially constant except for some small modulation due to noise. The absolute current level is given by the voltage of the battery 304 (FIG. 3b) divided by the resistance of the current path through the two-part network under test (which includes the defect 201). This resistance is higher than it would be without the thermal spot 1501 because the resistance horizontally across the spot 1501 is elevated. The resistance is only slightly higher than it would be without the spot 1501, however, because the region being heated is significantly smaller than the width of the row trace 101; the portion of the width of row trace 101 that is not heated does not exhibit elevated resistance.

When the thermal energy spot 1501 reaches the defect 201, assuming (as is often the case) that the defect 201 is much smaller in diameter than the width of the row trace 101, the spot 1501 is now of sufficient size to heat the entire inter-layer conduction path created by the defect. Thus the overall resistance in the current path between the two ports of the two-port network increases, resulting in a measurable current dip as shown in FIG. 15*a*. As the spot 1501 continues traveling beyond the defect 201, the resistance in the current path again falls to its earlier level, which the sensor 310 observes as a return to a higher current level in the current path. It will be appreciated that depending on the location of the probe points 322, 324 (FIG. 3*a*), and depending on the presence of additional current paths between the two ports of the two-port network, the spot 1501 may not be part of a current path when it is on one side or the other of the defect 201. In this case the nominal current level observed by sensor 310 will be slightly different on either side of the defect 201. It can also be seen that the current change observed by sensor 310 while the region being heated 1501 includes the defect 201, will be reduced to the extent that the spot 1501 is smaller than the diameter of the inter-layer conductive path. By manipulating the size of the spot 1501, therefore, once the general location of the defect 201 has been found, it is possible to determine certain characteristics of the defect 201 such as the diameter of the inter-layer short.

FIG. 15*b* is similar to FIG. 15*a*, except that because sensor 310 applies a current bias in this embodiment, the characteristic of the electrical signal that it observes is a voltage. Therefore, as the thermal spot 1501 reaches the defect 201, the sensor 310 will observe a voltage increase due to the elevated resistance, rather than a current decrease. As with the sensor 310 of FIG. 3*b*, the test apparatus of FIG. 3*a* reports a short-type defect in response to the observation by sensor 310 of a change in the electrical signal from the network under test, of the type shown in FIG. 15*b*.

Figure 12A:
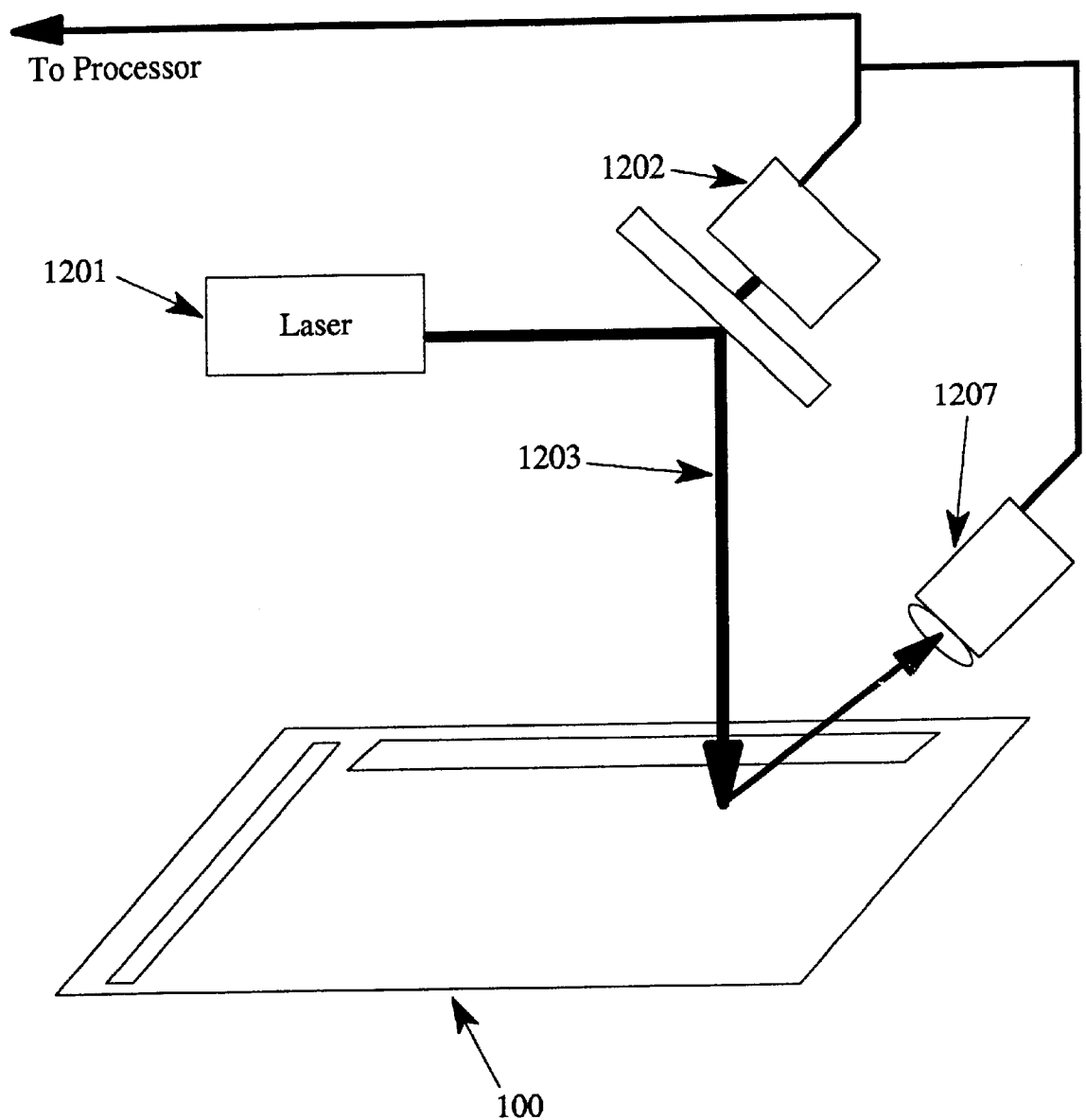
FIGS. 12a, 12b and 12c are stylized diagrams of test systems in which a scanning laser beam applies them energy to the device under test.
Figure 12B:
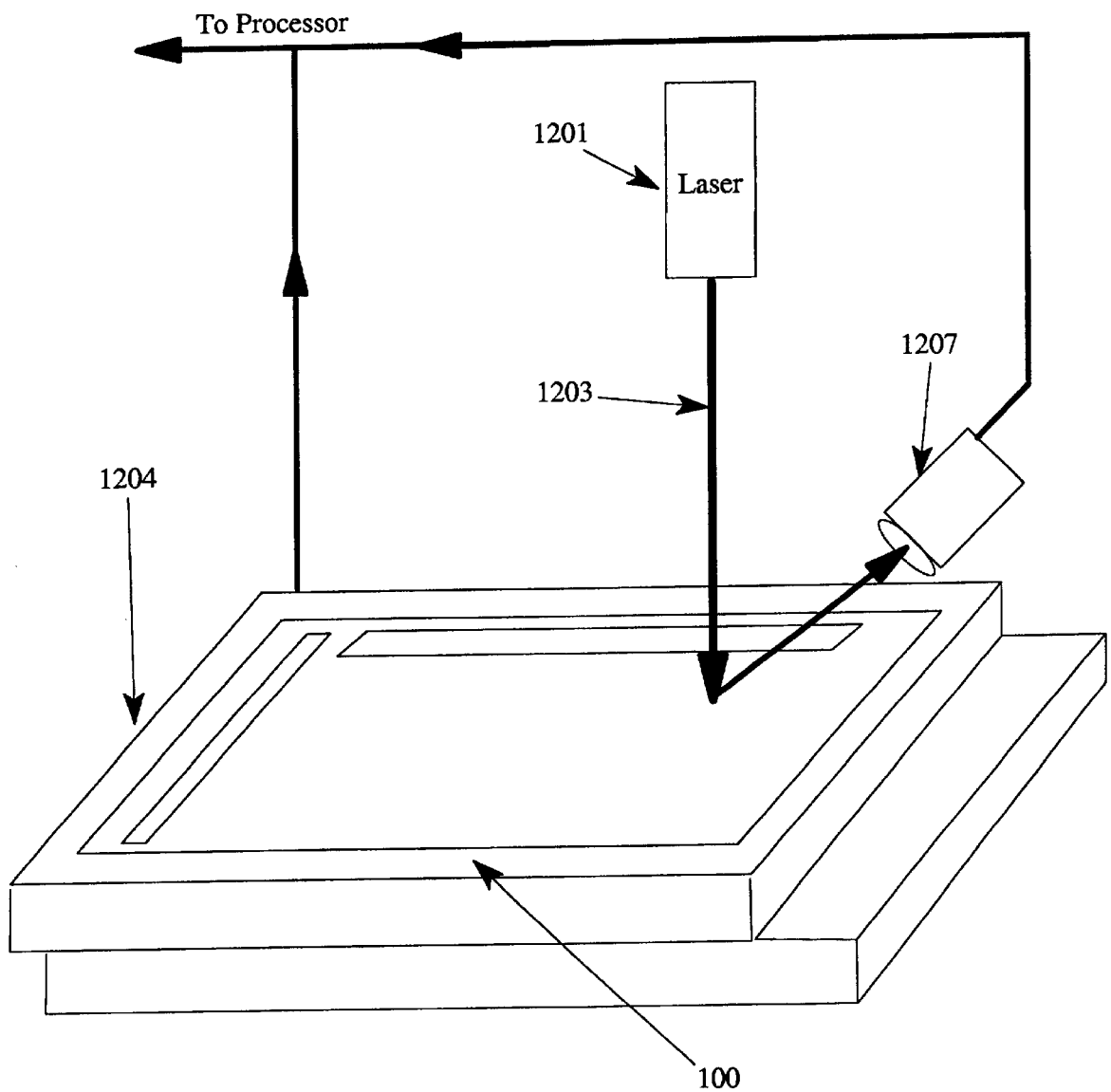
Figure 12C:
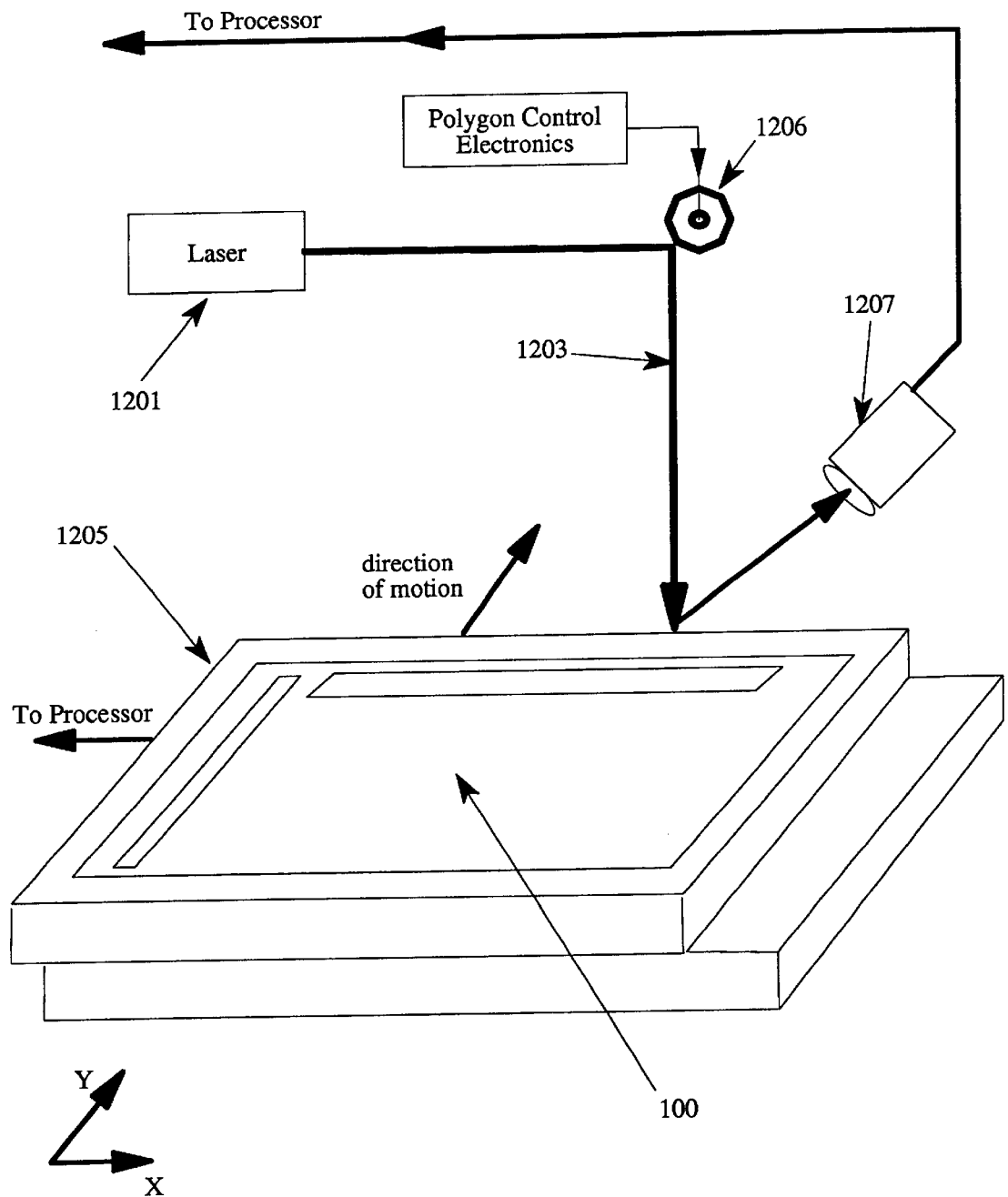

FIGS. 12*a*, 12*b* and 12*c* illustrate various techniques by which the thermal spot 1501 (FIGS. 15*a* and 15*b*) can be moved relative to the DUT 100. All assume that the thermal energy source 305 includes a laser 1201 outputting a laser beam 1203. FIG. 12*a* shows an embodiment in which the laser beam 1203 is moved with moving mirrors or substantially equivalent optical devices 1202. FIG. 12*b* shows an embodiment in which the device under test is moved with respect to the laser 1201 and laser beam 1203 by a movable platform 1204. FIG. 12*c* shows an embodiment is which the laser beam is scanned in the X axis by a rotating polygon 1206 or similar optical or electro-optical device and the device under test is moved with respect to the beam in the Y direction by platform 1205 for the coordinates defined in the figure. It will be appreciated that many combinations of the above embodiments can be realized depending on the exact situation of the test.

Also, it will be appreciated that by adjusting the size of the heat source, it is possible to implement a binary or other progressive narrowing search described in the above Summary of the Invention in a wide variety of fashions. This has the practical advantage of not requiring individual test of every point on the device, but rather permits the number of tests to be reduced to approach the logarithm of the ratio of the device area to the desired defect localization area. The processor 302 uses the information from the sensor 301 to detect the locations of defects which may then be reported to the operator on a display or recorded in a data file for later use. In test apparatus embodiments in which the thermal energy source 305 is a laser, such as the embodiments shown in FIGS. 12*a*, 12*b* and 12*c*, the laser beam spot size can be adjusted manually, or electronically under the control of processor 318 (FIG. 3*a*) through the use of appropriate optical elements such as filters, masks, or lenses.

Figure 11:
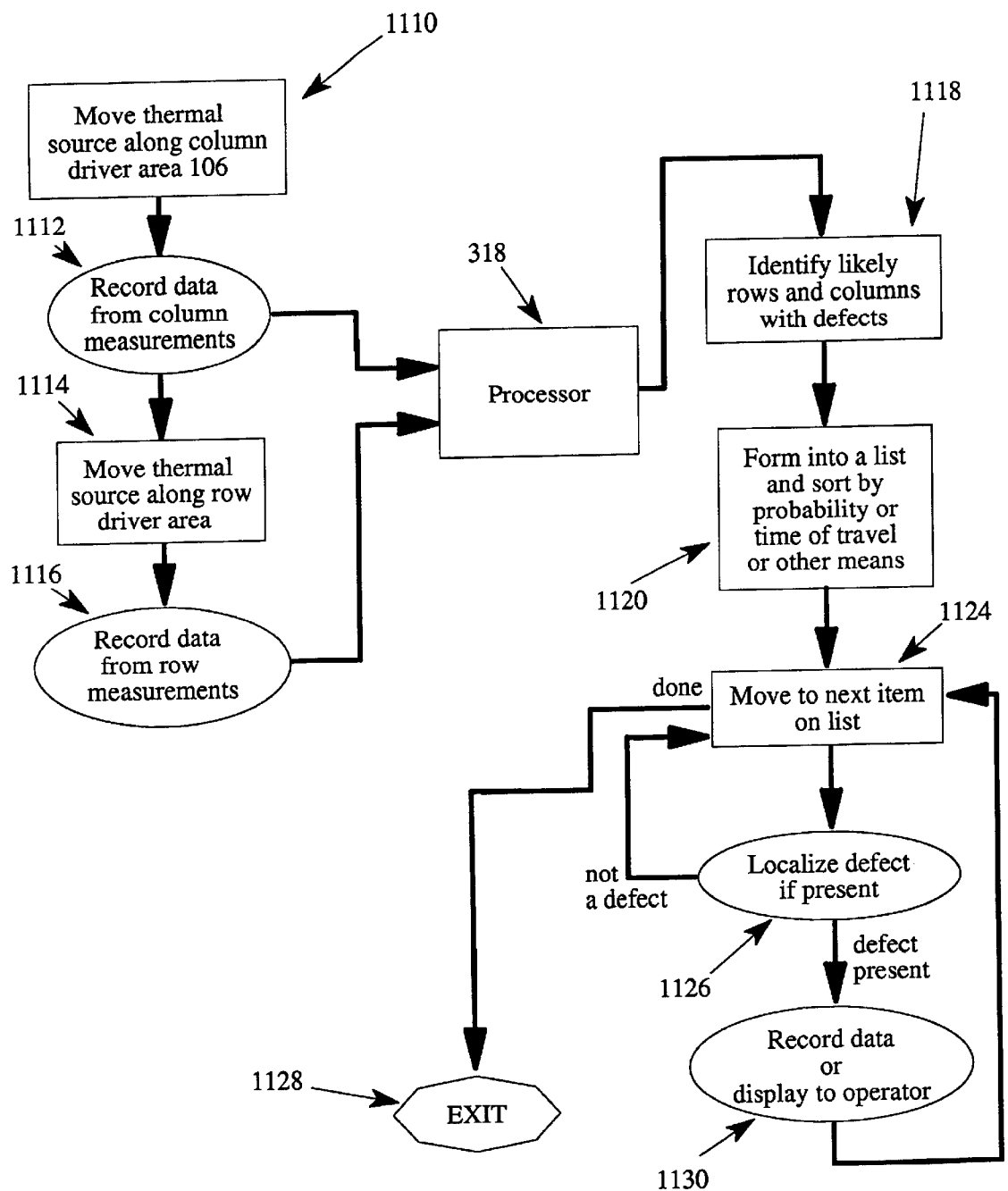
FIG. 11 is a flow chart showing a process flow for a coarse search followed by a fine search, for a defect.

For a variety of practical reasons, it is often desirable but usually not necessary to achieve the defect localization in a coarse and then a fine stage. FIG. 11 shows a typical process flow for implementing this coarse and then fine search. Following the flow diagram on the figure, the apparatus first moves the thermal source along the column driver area 106 to measure the resulting currents and/or voltages (steps 1110, 1112). Then the apparatus performs the same check on the row driver area 105. (Steps 1114 and 1116). In both cases either the region heated is large enough to significantly increase the resistance in the column or row trace, or another technique is used to ensure the signal change is large enough in the presence of a short, to be detected by the sensor 310. The processor 318 collates all this data and identifies likely rows and columns for defects (step 1118). Typically, the processor uses a convolution type filter on the incoming measurements and then applies above described signal detection procedure on the output to make defect decisions. Because of the complexity of modern flat panel displays, the convolution filter used may vary with time during the data acquisition. The actual process of synthesizing an optimal set of filters and detection algorithms for this apparatus can be very involved but nevertheless well known. See for example, *Random Processes* by Robert M. Gray and Lee D. Davisson, incorporated by reference above. It is sufficient to note that the apparatus operates satisfactorily over a wide range of choices of filters and separation algorithms.

In step 1120, the list of likely rows and columns with defects is then sorted into a list in order of probability of a defect, or the time of travel, or other means as desired. Again, the details of the sorting process will vary enormously with the situation, and for many applications, the preferred sorting technique is in order of probability. Once the list is formed, the processor follows a loop 1122 in which each potential defect point is visited and then localized by techniques and methods discussed already and further in the present invention. For example, in step 1124, the processor 318 controls a thermal energy source 305 to apply thermal energy to the next location identified on the list. In step 1126, techniques such as that shown above with respect to FIGS. 15*a* and 15*b*, optionally coupled with a binary or other progressive narrowing search, the defect is either localized or ruled out within the region identified on the list. If a defect is ruled out, then control returns to step 1124 in which the thermal energy source 305 moves to the next item on the list. If there are no more items on the list, then the search is complete (step 1128). If step 1126 did successfully localize a defect, then in step 1130 the defect is reported either by recording its location in a data file or by displaying its location to an operator. The process then returns again to step 1124.

As mentioned, the driver areas are located on the perimeter of the DUT, outside the grid of row and column crossings. As such, they provide a convenient place to implement an initial coarse search. It is not necessary, however, to perform the coarse search in this area. In another embodiment, rows and columns are heated within the grid.

Figure 18:
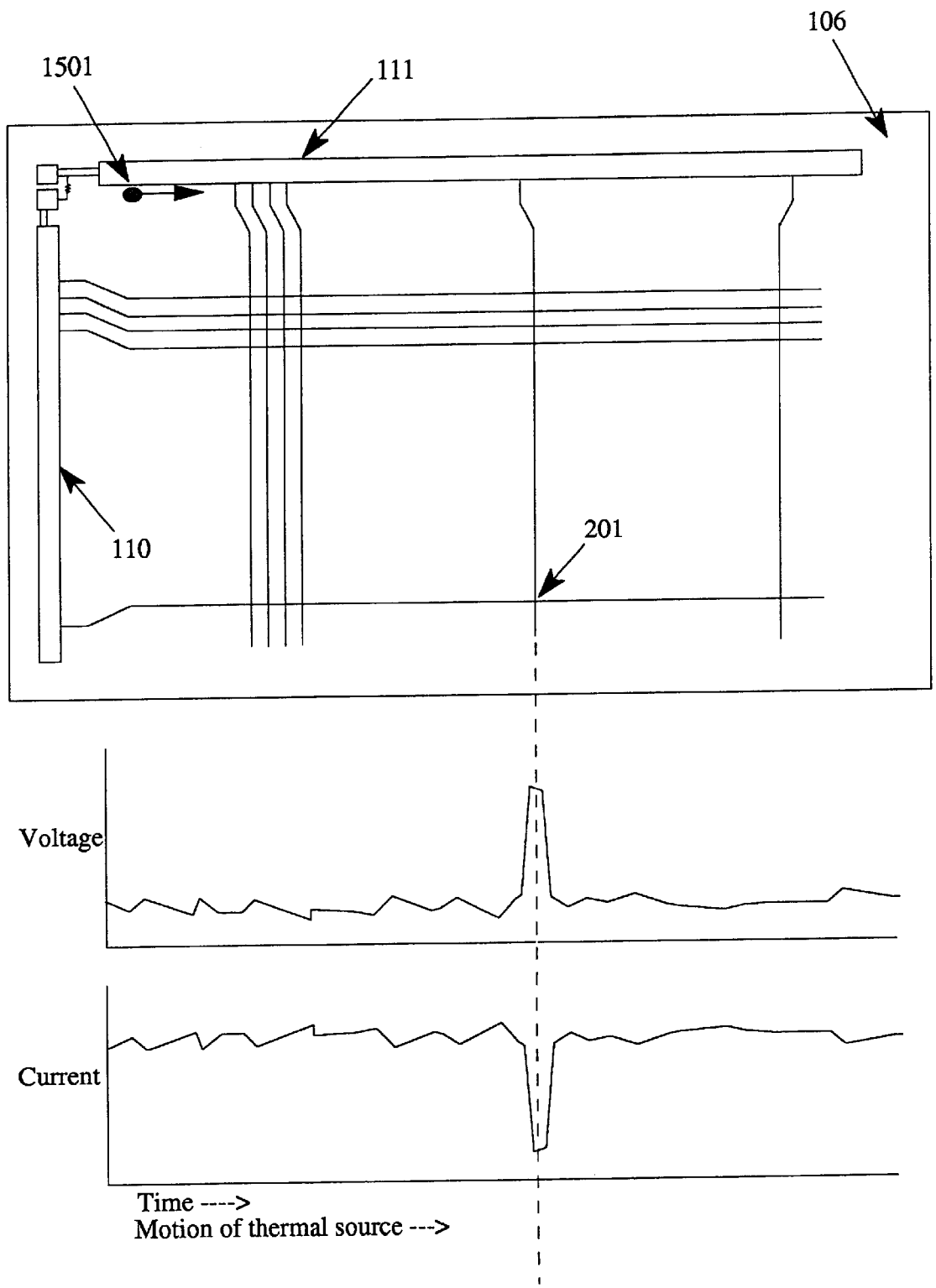
FIG. 18 is a stylized diagram of an FED backplane having a short at a particular row/column crossing, together with signal output waveforms produced as a thermal energy spot crosses the column containing the short.

In the event the driver area is used, a heat source 305, a laser beam for example, is directed onto a single trace or in the vicinity of a single trace on the column driver area. A measured change in the observed signal indicates the presence of an electrically conducting defect on that column. By moving the heat source with respect to the device (possibly by an optical beam steering mechanism), it is possible to rapidly check each column trace on the device. FIG. 18 shows a typical output from the electrical measuring device for the coarse stage of the search along the columns. The thermal energy source 1501 travels horizontally to the right in the figure across the column traces in the column driver area 106. A change of the predetermined type is detected in the observed output signal in either the voltage or current measurement case when the thermal energy source enters the vicinity of the column containing the defect 201.

Several points need to be kept in mind here. The size of the spot of energy application 1501 will affect the width of the measured peak. Also, the speed with which the spot moves with respect to the wafer will affect the resolution due to the principles of heat diffusion in solids. In some cases, it may be desirable to add a temporal dependence to the magnitude of the thermal energy application or a temporal dependence on its position relative to a mean steady velocity along the column driver area to decrease the effective thermal diffusion time and thereby increase the resolution of the method. This is discussed hereinafter.

In an analogous fashion, the row driver area may be tested.

Figure 10:
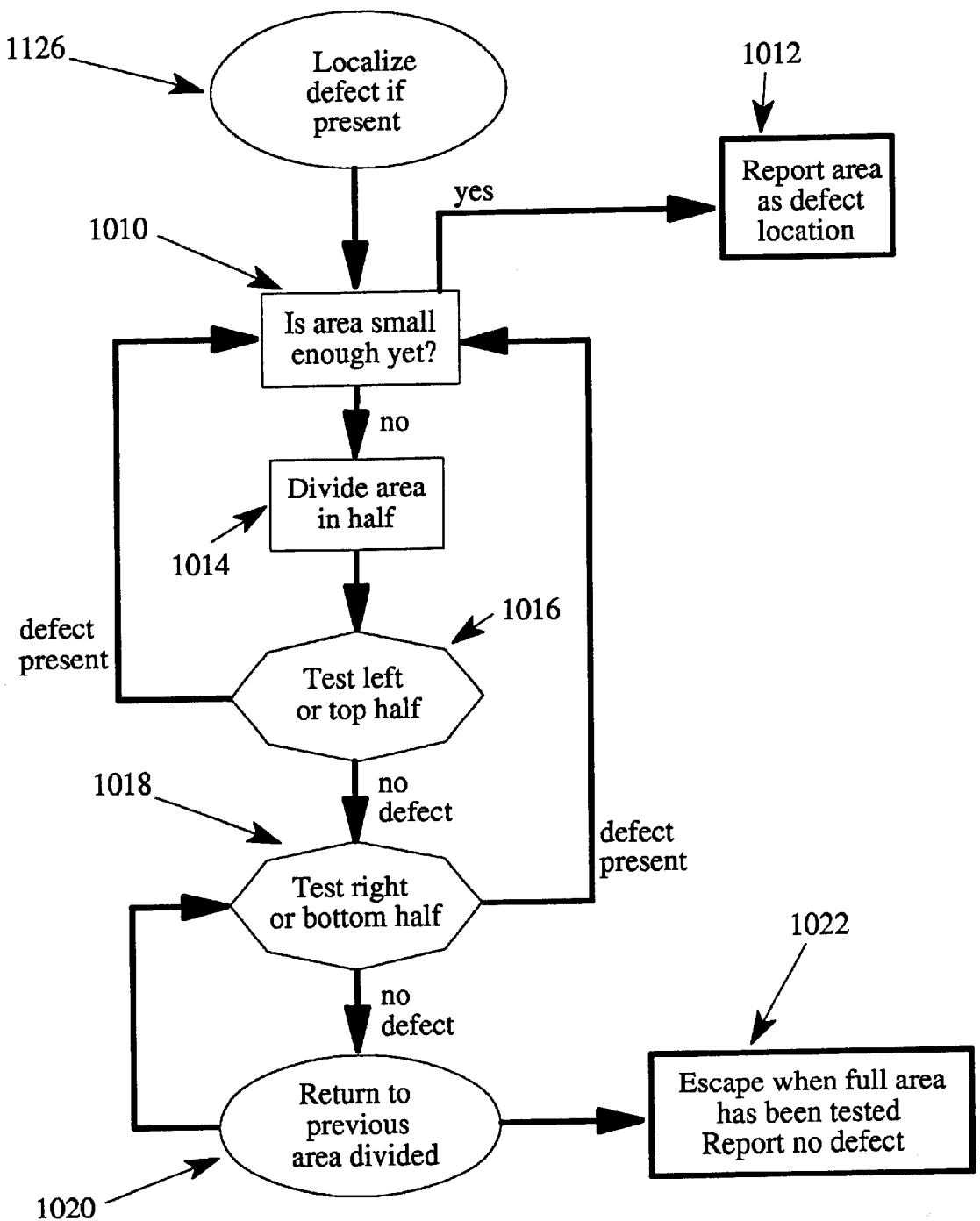
FIG. 10 is a flow chart of a process for a binary search technique to localize a conducting defect.

At the end of this process, as discussed above, the fine localization method is applied to potential defect sites in an order determined by an appropriate algorithm using the signals recovered from the coarse search. A thermal energy source 305, possibly physically different or of a different nature than the one utilized for the coarse search, is applied to a region in the vicinity of and typically containing each potential defect site. If and when a defect is found to be present, a binary search or other search algorithm as depicted in FIG. 10 can be applied by reducing the area heated and repeating the test. In the case of FIG. 10, one half of the device is tested in accordance with the present invention. At this point the presence of a defect in this half would necessitate the test of one half of same already tested half. By repeating this process within the tested half recursively and then repeating the entire procedure on the other half, always terminating the recursion when the absence of a defect is found within the last tested area, a search with exponentially decreasing resolution in time may be realized. For the binary search, in logarithmic time, the defect can be localized to a region as small as the larger of the defect size, the spot size of the heat source (in the laser case this would be the diffraction limited spot size), or the thermal diffusion distance of the heat during the time of thermal energy application.

Referring to FIG. 10 specifically, in a step 1010, it is first determined whether the area within which a defect is believed to exist is small enough for purpose of the test. If so, then the area containing the defect is reported as the defect location (step 1012). If not, then in step 1014, the region is divided in half, and the spot 1501 size is accordingly narrowed (step 1014). The division is either a horizontal division or a vertical division, in alternate iterations of step 1014. In step 1016, the left or top half (as the case may be) of the area from step 1010 is tested for a defect in the manner previously described. If a defect is detected within the tested region, the control returns to step 1010 to determine whether the tested region, which is now half the area of the previously tested region, is small enough to satisfy the purposes of the test. If step 1016 rules out the presence of a defect in the tested region, then in step 1018, the spot 1501 is moved to the right or bottom half of the region of step 1010, as the case may be, and the test is performed again. The defect, if present, should be detected in step 1018, in which case control returns again to step 1010. If the defect is not detected in step 1018, then the initial belief that the defect was present within the region of step 1010, was false, or at least the defect was not localizable using the technique of FIG. 10. In this case the spot size is again increased to the size of the spot prior to the last division in step 1014 (step 1020), and returning to step 1018, the right or bottom half of the region of the prior iteration of step 1010 is tested. If in step 1020, the entire region which, when step 1126 was entered, was believed to have contained a defect, has been fully tested, then in step 1022, the procedure exits with a report that such region did not, in fact contain a defect which was detectable by the procedure of FIG. 10. It will be appreciated that many alternative search strategies can also result in very rapid localization of the defect in related fashion.

Figure 25A:
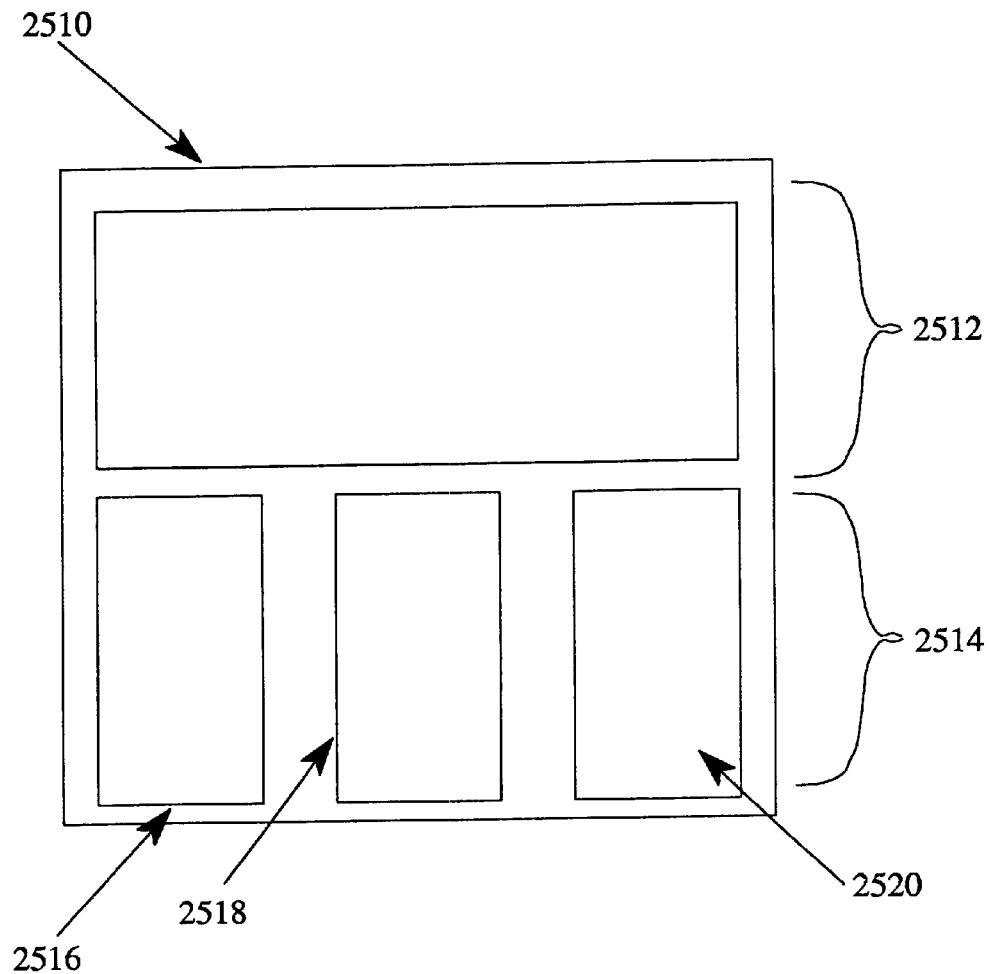
FIGS. 25a and 25b illustrate regions and subregions of a row/column crossing.

For a number of practical reasons, it will be appreciated that a strict binary search may not be possible in a given embodiment. For example, it may not be practical to produce laser beam spots which are exactly rectangular and cover exactly one half of either the prior included region under test or the prior excluded region under test. On the other hand, a strict binary search is not necessary to achieve many of the benefits of progressive refinement such as the exponentially decreasing area of localization with number of test measurements. For example, FIG. 25a illustrates a region 2510 suspected to contain a defect. Region 2510 may, for example, be defined by a row/column crossing. In a first iteration, the region 2510 is divided in half horizontally, and either the top or half 2512 or the bottom half 2514 is tested for presence of the defect. Assuming the defect is localized to region 2514, for example, this region may be divided for the next iteration in to more than two subregions. For example, as shown in FIG. 25a, it might be divided into three subregions 2516, 2518 and 2520. These three regions need not be of equal size. Thus, for the second iteration, region 2516 is tested. If the defect is not detected in region 2516, then region 2518 might be tested. Note that region 2518 need not be smaller than region 2516. If the defect is not found within region 2518, then region 2520, or a subregion of region 2520, might be tested next. A procedure such as this is not strictly binary, but does include a progressive narrowing aspect and therefore improves upon an algorithm that merely tests a plurality of same-size subregions within the originally suspected region 2510.

Figure 25B:
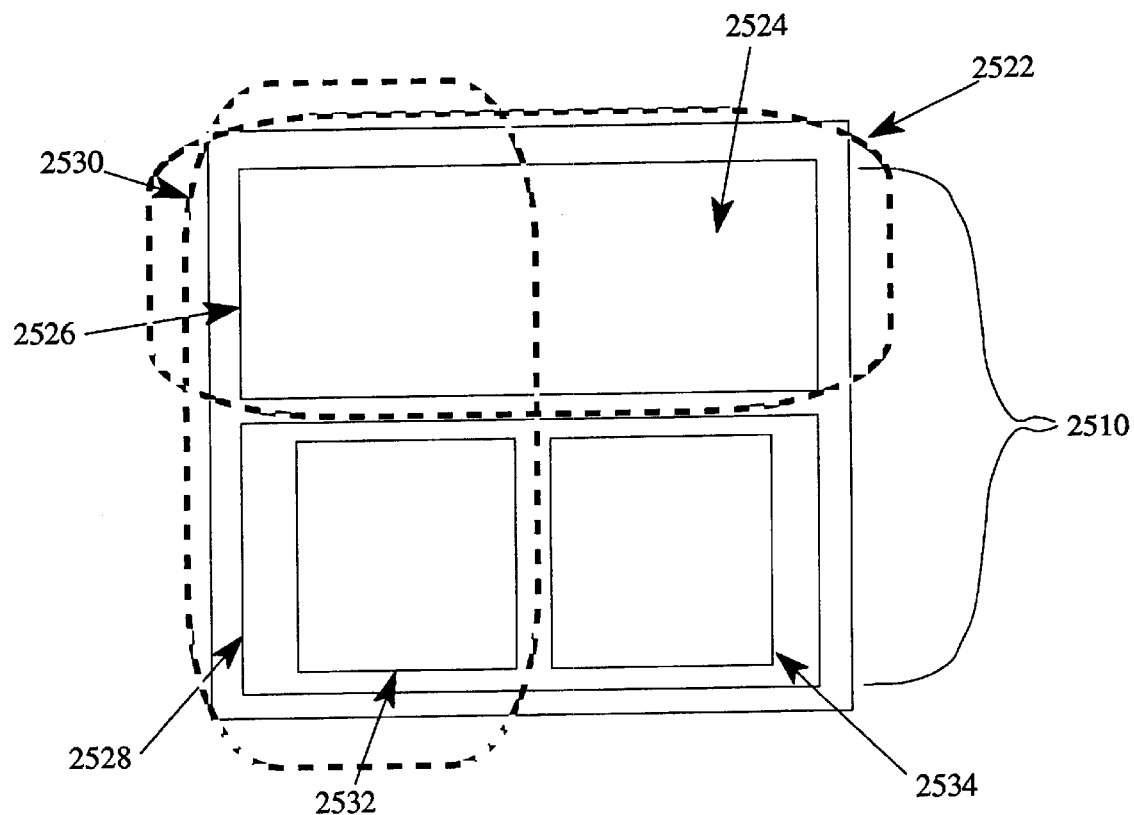

FIG. 25b illustrates another variation of a search technique which includes a progressive narrowing aspect. This illustration takes account of the fact that it might be more convenient to produce laser spots which are not strictly rectangular or on which the edges are not as sharp as one might prefer. In the illustration of FIG. 25b, after the region 2510 is identified as likely to contain a defect, an oval-shaped laser spot 2522 is projected onto the DUT. The spot 2522 is localized to a region of the crossing 2510 which includes the top half 2524, although it also includes a small portion of the bottom half of the crossing 2510 as well as a small part of the DUT which is outside the crossing region 2510. If the predetermined type of signal change is detected by sensor 310 in response to the temperature change with the region 2522 then the defect has been localized to a portion of the crossing region designated 2526. If the predetermined type of signal change is not observed in response to the temperature change localized to the region 2522, then the defect, if it exists, has been localized to be within the portion 2528 of the cross 2510, outside of the oval 2522. Certainly in this case the region containing the defect has been localized to at most the bottom half of the crossing region 2510.

For the second iteration, it is necessary only that the region being heated include a portion of the region which, in the first iteration, has been determined to contain the defect if one exists. The heated region harmlessly can also include portions of the DUT outside of the crossing region 2510, as does the oval 2522. In addition, the region heated for the second iteration harmlessly can also include portions within which a defect was ruled out in prior iterations. The progressive narrowing aspect requires only that the region to be heated next include part of the region which in a previous iteration was determined to probably contain a defect, and exclude a different part of the region which in the prior iteration was determined to probably contain a defect. In fact, because of these principles, the spot size for the second iteration can even be the same as that of the first iteration, only oriented differently. For example, oval-shaped spot 2530 can be used for the second iteration. In particular, if the first iteration ruled out a defect within region 2526, then the region under test for the second iteration, using laser spot 2530, is that designated 2532 in FIG. 25b, and excludes the portion designated 2534 in FIG. 25b. Further iterations can be performed to further localize the defect to progressively smaller areas.

The techniques described herein with respect to FIGS. 10, 25a and 25b include methods for localizing a defect within an initial region suspected to contain one. Whereas these techniques (and others described herein) can be used to localize the area containing the defect to extremely small areas, it will be appreciated that even a small reduction in the area believed to contain the defect can provide a significant benefit. For example, if the initially suspected region is the size of a row/column crossing, and if the localization process can reduce the size of the region believed to contain the defect by only half, then assuming proper orientation and location of the half-region relative to the row and column traces and any emitters, it may be possible to repair the device simply by destroying the top conductive layer (row or column) in the entire half-region. This would eliminate the inter-layer short, without breaking the downstream conductivity of the trace. Thus the term "localize", as used herein, refers merely to any reduction in the size of a region which is believed to contain a defect. The reduction need not be enormous.

During the fine search, one might expect that the signal level would be vastly reduced as the area under search is reduced. This turns out not to be the case for the following reason. In the area of a highly localized defect, the current density is extremely high. As a consequence, the electric field inside even the most conductive of materials becomes substantial. The result is that the voltage dropped versus diameter of the heated area falls off only logarithmically with the heated diameter. Therefore, a reduction factor of 100 in the diameter under consideration only results in a reduction of the signal level by about 4.6 times. This is a minor enough reduction that extremely high degrees of localization remain practical for all known room-temperature conductors.

It is instructive to consider typical ranges of signal levels that are generated by this method. Most commonly used conductors have temperature coefficients of resistivity in the range of 0.005/° C. For a 1,000 Angstrom thick metal film, the sheet resistance of a perfect film will be in the vicinity of 0.5 ohms per square. If the films are of poor quality, the resistance may be much larger, but the coefficient of change of resistivity should not change. This would, however, be likely to make the signal level stronger. If we allow for a 100 degree C change in temperature of the film, a value well below the rapid oxidation point of most metals, we would expect a change in resistance on the order of 0.5 ohms per square×100 deg C×0.005/deg C, which is approximately 0.25 ohms per square. For the high aspect ratio driver areas, each trace typically having a length to width ratio of about 20, this corresponds to a change in resistance of approximately 10 ohms for the case of the coarse search. Considering the fact that typically short circuit defects have resistances in the range below 10,000 ohms, for each 1 Volt of bias applied to the device, this 10 ohm change in total resistance will result in a total change in current flow of approximately 100 nA. Compared to typical thermal electronic noise levels in the range of pA/sqrt(Hz), it is apparent that this is an enormous signal and therefore the test may proceed very rapidly without degrading its reliability. In the case of the fine search, the total resistance will be no less than the spreading resistance of the current approaching the defect. Assuming the defect is 1 micron in diameter, and the test is of an area of 10 microns in diameter, the change in spreading resistance will be $\ln(10)/\pi$ times the sheet resistance, or on the order of 0.2 ohms for the above described metal film. The resistance of the defect itself will, of course, add to this value often greatly; therefore, this number must be considered a worst case value. This value is much smaller than that for the coarse search case, but in general, it is not necessary to perform a localization operation with the same rapidity as the coarse search since presumably the number of defect points to be localized will be small. At 1 Volt applied bias, the 0.2 ohm change in resistance corresponds to a change in current of 2 nA for a 10,000 Ohm defect. This change, as above, is far above the level of electronic noise in achievable in practical current measuring devices and therefore the test may proceed rapidly. It is, however, important to note that the signal level for the present case decreases as the square of the total resistance in the defect current path. This fact limits the maximum defect resistance which can be detected by this technique with sufficient rapidity. For typical FED-type displays with 1 Volt of applied bias, and production throughput requirements of a few thousand tests per second, this limit is typically greater than 10,000 ohms and less than 100,000 ohms. Of course, these limits can vary substantially if the device can withstand larger voltages, if the rates vary, depending on the total capacitance of the device, as well as many other factors. This level of sensitivity is sufficient for normal FED-type or LCD-type production testing requirements.

The preferred process that the processor utilizes to identify the presence or non-presence of a defect from the electrically measured signal is an involved algorithm that deserves attention. In general, if the noise levels are sufficiently small, and the signal levels sufficiently large, it would be sufficient to use a simple thresholding procedure in which the determination of the presence or non-presence of a defect could be made by comparing the instantaneous output of the electrical measuring device against a preset reference value for the device, area, and conditions of the test. Because of the large capacitance of flat-panel displays, the substantial resistance of traces as they traverse the display, and the rapidity with which it is preferred to perform the test, the preferred embodiment uses a more sophisticated approach for detection.

Figure 21A:
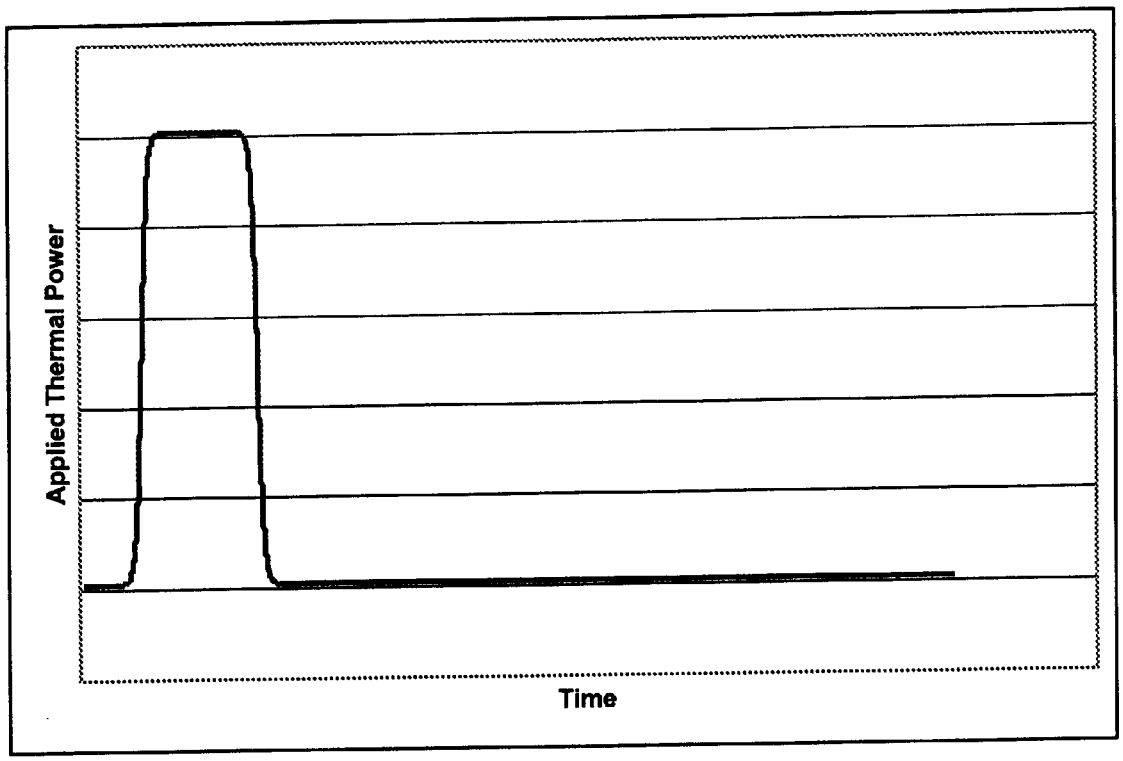
FIGS. 21a–d depict the time history of thermal energy application, temperature profile, and the resulting electrical profile, respectively, of a device under test.

A simple model of the preferred process is outlined below. The thermoelectric case is used here, and the situation for the temperature change of resistance is highly similar. Suppose the case in which the thermal energy application is a continuous and uniform application during the period of the test. Consider further that the test is to localize a defect within a region of about 25 microns square. The diffusion time for heat for an area this wide is on the order of 300 microseconds, and therefore, the test time and the thermal application time will be of the same order. FIG. 21a shows a time profile of the application of thermal energy to the device. It is the temperature of the actual conduction path which is important for purposes of the invention, and for this case, this conduction path will be taken to be very close to the surface of the device, and the conduction path will be taken to be a uniform absorber of the thermal energy applied. This is a rather good approximation for the practical case of a continuous laser beam impinging on the surface of a thin metal trace on the order of a few thousand Angstroms thick.

Figure 21B:
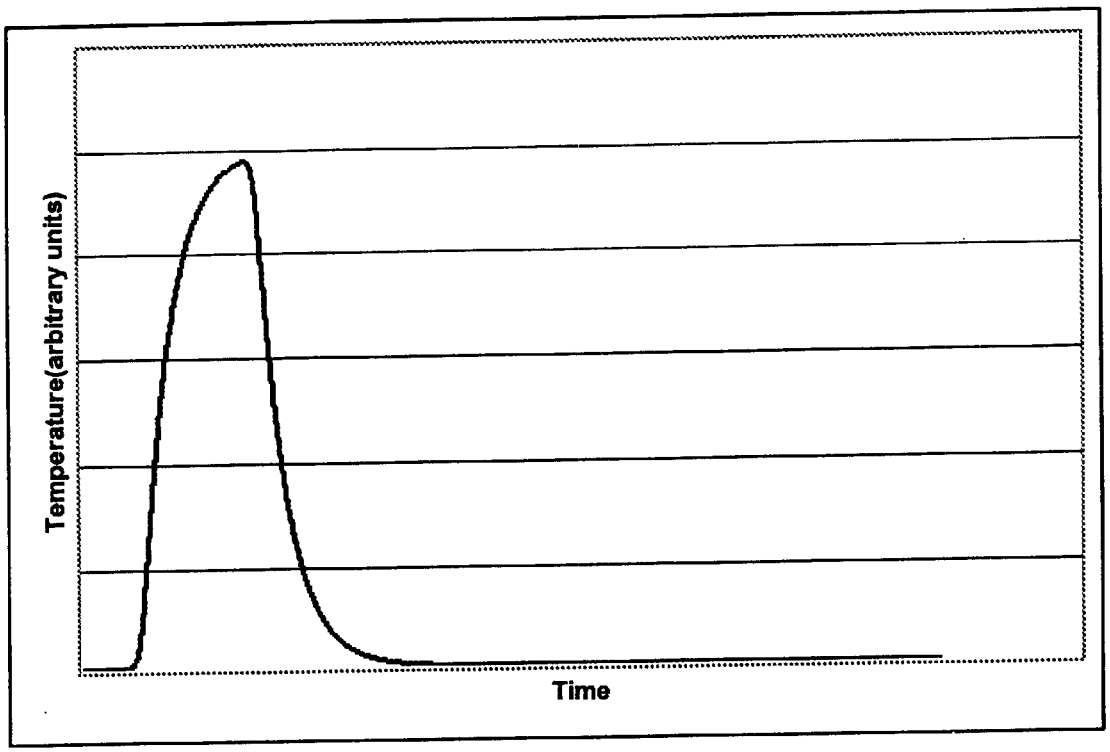
Figure 21C:
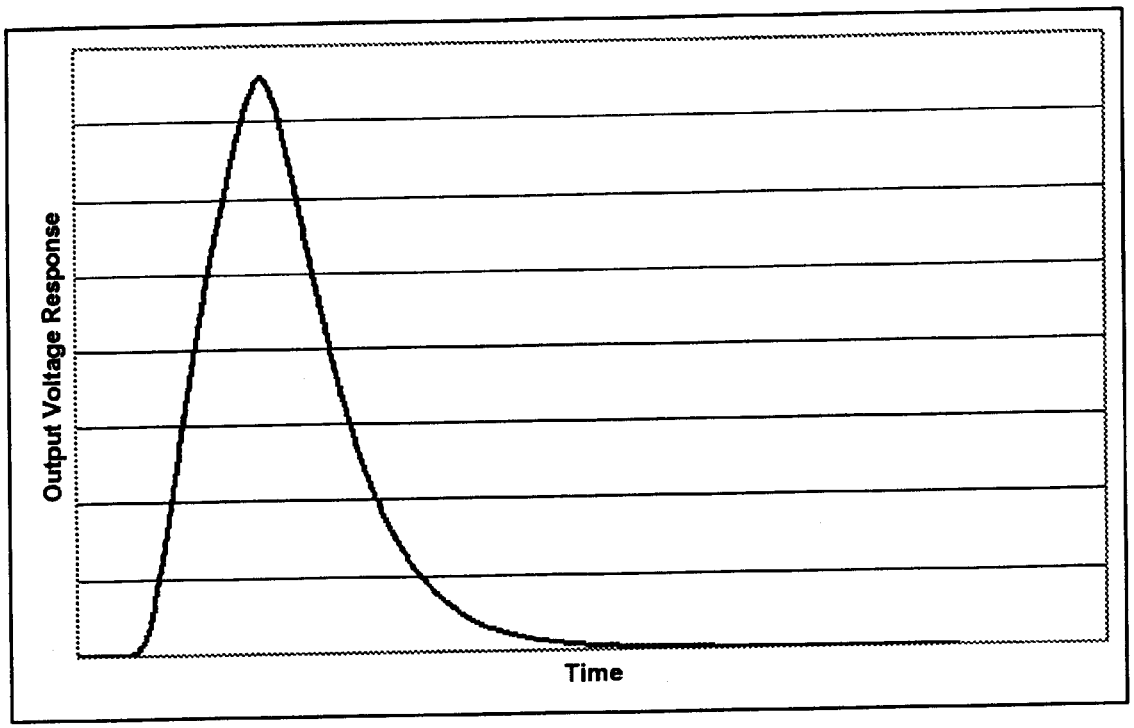

As the thermal energy is first applied, there is a period typically 50 microseconds of rapid temperature rise toward an equilibrium value. During this period, the electrical current flowing through the area being heated will change in accordance with the electrical characteristics of the area being heated, the temperature, and the electrical characteristics of the device and the electrical measuring apparatus. After the warm up period, the area being heated will achieve a substantially uniform temperature for the remaining 250 microseconds at which time the thermal application will cease and the area will cool in accordance with the well-established theory of heat conduction in solids. The cooling process will go on forever, but will substantially complete in a period on the order of another 300 microseconds. FIG. 21b shows the time history of the temperature of the device in the area being heated. It is to be expected, therefore, that the electrical signal which the electrical measuring device observes will have the general profile shown in FIG. 21c. The electrical profile in FIG. 21c lags behind the temperature profile in FIG. 21b due to the resistive-capacitive time constant of the device under test. Because of the finite resistance of the trace to the defect, and the capacitance of every crossover area 103 on the device under test, as well as the electrical characteristics of the measuring device, the device under test will require a time on the order of the trace resistance multiplied by the total capacitance of the device to respond. This time can vary widely depending on the situation; as depicted in the figure, the time constant is on the order of 50 microseconds.

Note that various bussing arrangements can substantially change the time scales so described without changing the basic physical nature of the effect. It is often the case that the response time of the entire system can have a time constant much longer than 600 microseconds. In this case, the total response of the device under test never reaches a substantially equilibrium value and therefore the sensitivity of the test apparatus is reduced. If the capacitance of the device were to be very, very large, this would create substantial difficulties as the noise levels present in any measuring device would eventually overwhelm the measured signal. For the case of typical flat-panel displays, however, even in the presence of substantial reductions in the overall response of the device under test, by amounts on the order of 100 to even 1,000 times or more, the overall signal level is still easily distinguishable from the electronic noise. In the event that the noise is too great for the signal to overcome, it is still possible to improve the sensitivity by repeating the test again and again and averaging the measurement results to reduce the degrading effect of noise.

Figure 21D:
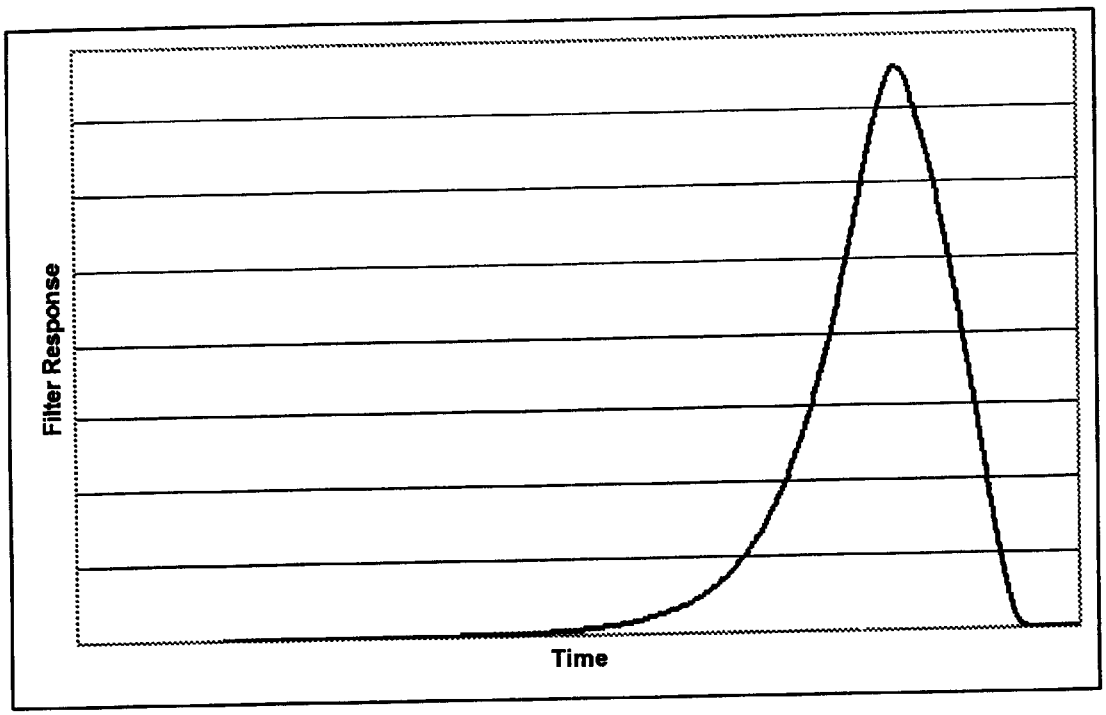

There still remains the problem of extracting the signal from the noise in an efficient fashion. For a given thermal energy application and device, it is possible to calculate the expected output of the sensor 310 to the processor as discussed above, or by other well-established means in electrical circuit theory and the theory of heat conduction in solids. It is also possible to directly measure the output of the sensor 310 many, many times and by averaging reduce the effect of the noise to negligible levels. The effect of noise on the output of the sensor 310 to the processor may be measured directly under the conditions of the test. This noise is statistical in nature, may take many forms and come from many sources, such as the thermal noise present in any resistive circuit, digitization noise associated with the conversion of an analog signal to a digital one, etc. Frequently, it is assumed that the noise is Gaussian in nature with a spectral content consistent with the measured correllation or the calculated circuit response. From the measurement of the noise, and the expected value of a defect signal, it is possible using well established techniques in the field of signal processing to synthesize a filter based on a convolution algorithm that at a particular instant in time will report an estimate of the change in current flow or change in voltage to minimum error in least square, based on several assumptions about the character of the noise and the signal. These filters may or may not be causal since they may be implemented in a post processing computation. In general, this filter will make a maximal weighting of spectral components of the signal for which there is a maximum ratio of signal power to noise power and a minimum weighting for the minimum of said ratio. External constraints may also affect the design of the filter. For example, in the event that the testing is to be performed rapidly on many traces, it may be necessary to separate the effect of previously tested traces from the trace under test. It is possible to add a Lagrange multiplier to the system of least squares error equations to add constraints of this or other form into the filter synthesis procedure. This can be very important because it is frequently the case that the level of statistical certainty that a defect is present or not-present needs to be much higher than the certainty with which the particular test containing the defect must be ascertained. For example, in the case of a coarse test, a very high degree of certainty is desired on a test that no defect is present because of the large number of traces to be tested, but given the fact that a defect was present in a test within the last few milliseconds, it is only necessary to select with high probability the offending trace from the collection of those traces tested in those same last few milliseconds. FIG. 21d shows the typical impulse response for a typical filter designed to respond to a defective trace when the testing is proceeding at the rate of approximately every 200 microseconds which is faster than the thermal relaxation time of the device under test. Filters of this general type are often referred to as optimal least-squares filters. In the event that non-linearities are present in the device under test or the measuring apparatus, approximate techniques exist for identifying an optimal or approximately optimal filter design. Generally, after the filtering has been accomplished either in the electrical measuring device, or in the processor, by either analog, digital, or software means, a decision is made based on the magnitude and sign of the output of the filter at a particular instant or instants in time. Occasionally, it is desired to have multiple filters, the outputs of which reflect different characteristics of the device under test. For example, in one embodiment, one filter measures defect resistance while another measures capacitance. In this case, the defect decision could be based on values of either filter output or a particular mathematical function of both.

In order to control the application of thermal energy to the device under test both in magnitude and in position for the case of an optical beam such as from a laser, the preferred embodiment contains a reflected light monitor. FIGS. 12a, 12b, and 12c show a reflected light measuring device 1207 attached to the processor. In these cases, the reflectance varies with the patterns on the device under test. This variation can be used by the processor for identifying the location of the beam at an instant in time. This is depicted in FIG. 16. As the beam traverses individual traces, the reflected light signal varies significantly, and the processor can correlate this variation to the position of the optical beam. Further, the processor can monitor the magnitude of the reflected light so as to control the application of thermal energy to the device under test. This has the desirable consequence of controlling the temperature at the point of interest to a much greater degree. The materials to which thermal energy is applied are typically metals, and are often 80 to 90 percent reflective. Therefore, most of the light energy is reflected from the surface rather than being absorbed. In the event of a very dark defect or even variations in the reflectance, the application of thermal energy may be much greater or somewhat less than would be normally expected for a typical location on the device under test. For example, if the reflectance over the defect were only 30 percent, conceivably, the absorbed thermal energy could increase by seven (7) times in this case from what would be expected without a reflectance monitor.

Figure 4:
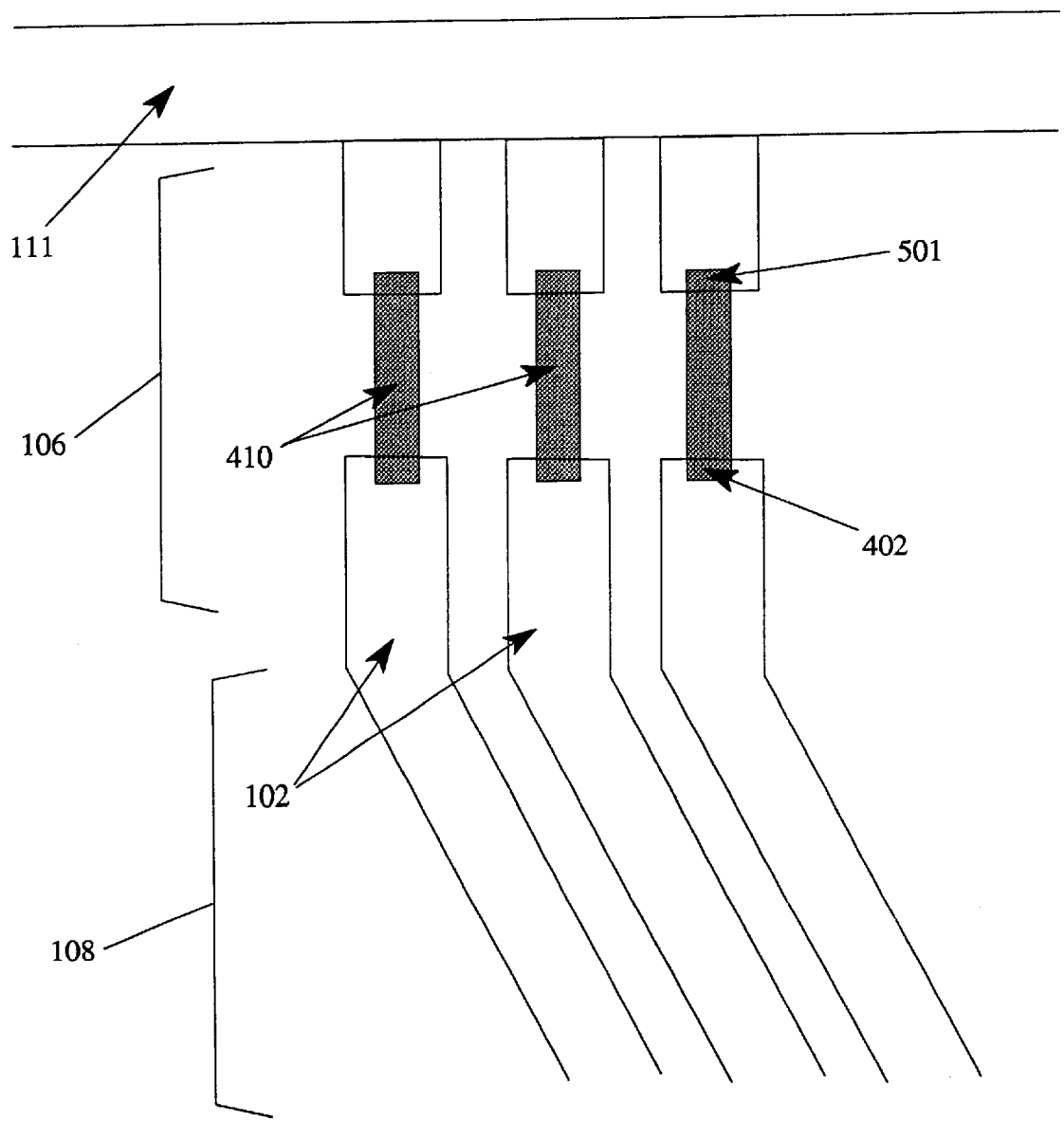
FIGS. 4, 5, 6, 7, 8a and 8b are stylized diagrams of portions of FEDs.

In the event that dissimilar materials as described in the discussion of the thermoelectric effect can be utilized in the device under test, a related, but often much more sensitive test is possible. As discussed, at each junction of dissimilar materials, a thermocouple junction is formed. In this case, if the heat source is applied at the point of contact of the dissimilar materials, a thermoelectric potential is created in the circuit. FIG. 4 is an enlarged view of a portion of the device of FIG. 1a, illustrating a portion of the column bus 111, and a segment of each three column conductors 102. Within the driver area, a segment of each of the column conductors is replaced by a dissimilar material 410, sufficiently dissimilar to form two thermocouples 501 and 402 at either end of the dissimilar material 410. As in the thermal change of resistance embodiments, an external sensor 310 is used to sense signal changes at the ports of the two-port network formed by the device. The heat is applied to the junctions 501. These junctions can be implemented in parallel with normal fabrication of the device and therefore, no additional cost or performance penalty is incurred due to their presence. Typically but not necessarily, junctions 501 are created on both the rows and the columns.

Thermocouple embodiments have at least two additional advantages over temperature change of resistance embodiments. First, the fact that the thermocouple is localized to a single trace combined with a time varying bias allows for the probing of the resistive and/or capacitive current on the single trace while no average DC bias is applied to the device. This can be very useful for highly voltage sensitive devices such as FEDs. In this case, the processor 302 rapidly records measurements from the sensor 310 as discussed above for the coarse search. These readings can be correlated with the time or position varying application of thermal energy to determine both the resistance and the capacitive reactance of a single trace without making physical contact to it. Traces containing defects will have anomalous values of either resistance or capacitance, or both.

Figure 5:
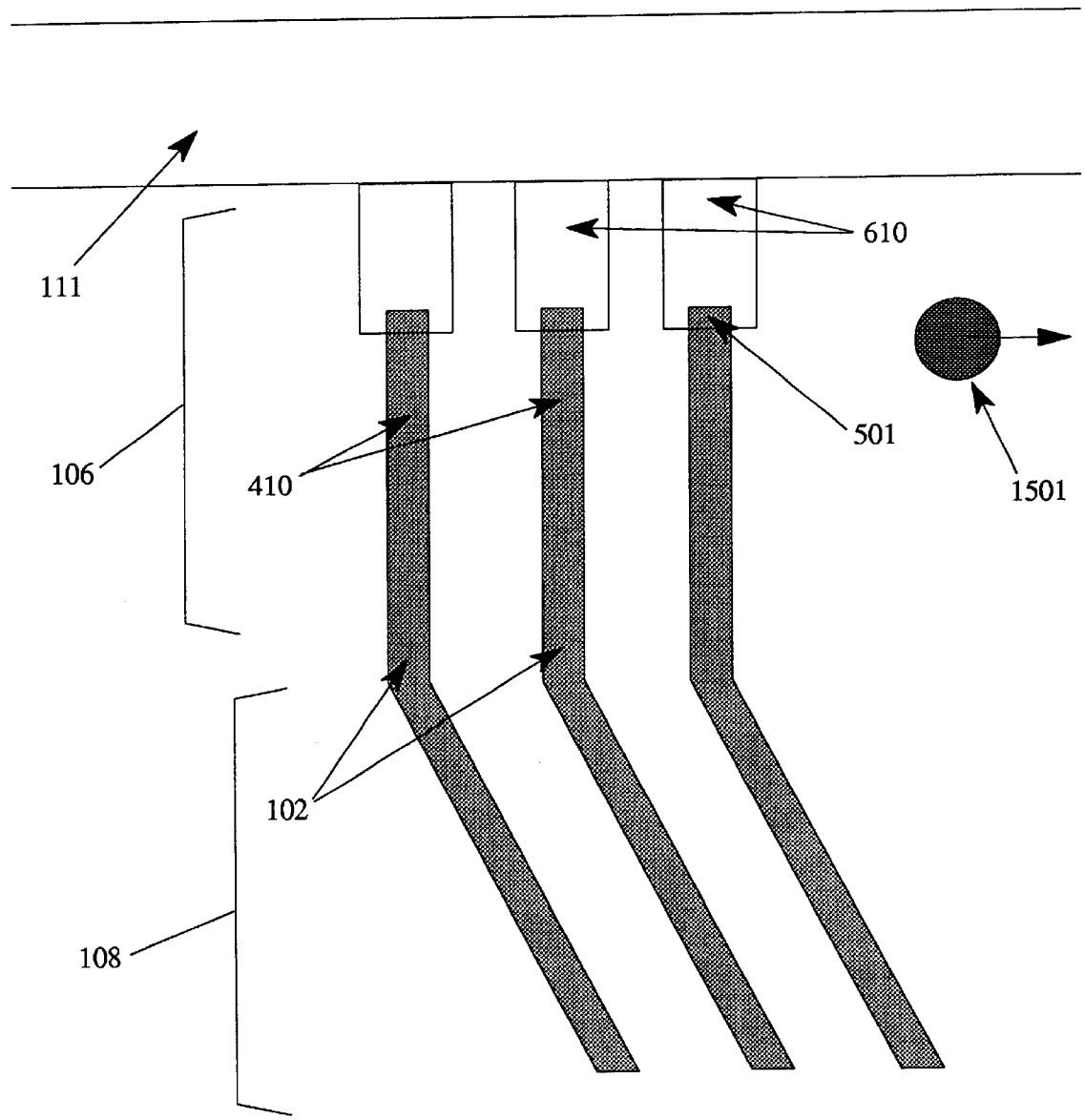

Secondly, it is also possible to construct an entire column or an entire row out of the dissimilar material. FIG. 5 is an enlargement of the same area as FIG. 4, except that the dissimilar material 410 extends the entire length of each of the columns 102. As with FIG. 4, the thermal energy beam is still scanned across the thermocouples 501 formed at the junction between each of the column conductors 102 and a respective stub 510 connected to the column bus 111. In this case, the presence of a conducting defect would a priori lead to another and opposite thermocouple junction at the exact location of the defect. It will be appreciated that it does not matter what material the actual short circuit is made of because it is only the materials which enter and exit the heated region that define the thermoelectric potential. Therefore, when thermal energy is applied over the location of the defect, a thermoelectric potential will be generated. A continuous current will flow only in the case of a conductive defect present under the area of thermal energy application. One possible drawback with an embodiment such as that of FIG. 5 is that it makes a requirement on the choice of materials for the interconnections within the device. Nevertheless, it is frequently the case that dissimilar materials are chosen for various unrelated fabrication process reasons, in which case this requirement creates no disadvantage whatsoever. It is also frequently the case that the fabrication process can tolerate small or even large changes in the composition of the materials so as to again give rise to a useful thermoelectric potential. Because the area which is required to be illuminated in this case can be vastly smaller than in embodiments relying on temperature change in resistance, it is possible to greatly reduce the amount of laser power which is applied to the device under test. This is very desirable in high throughput laser applications where the laser power can become very high, especially for highly reflective devices under test where the total absorption efficiency of the laser energy is poor.

As described for the temperature change in the resistance embodiments, the search for defects can be divided into coarse and fine stages. The fabricated thermocouples 501 are used as row-wise and column-wise thermoelectric voltage sources to identify candidate locations for defects. Candidate rows or columns will flow a thermoelectric current signature characteristic of a defect. Again, according to an appropriate algorithm, the potential sites are visited in order. By applying thermal energy over the entire area of the potential site, a rapid test is made for the presence of a defect. If a defect is present, a thermoelectrically generated current will flow. FIG. 18 again shows the approximate output of the sensor 310 (FIG. 3a) with the understanding that the nominal voltage and current level is zero. In the event a defect is found, the binary or other search algorithm as described above can be utilized to rapidly localize the defect in a fashion analogous to that of the temperature change in resistance embodiments.

It is again instructive to consider typical levels of signals that are generated by this method. Thermoelectric potentials between dissimilar metals are typically on the order of 1 mV for a temperature change of 100 degrees C around room temperature. These potentials do not vary with the size of the junction point provided that the junction is large compared to the mean free path in the material, typically on the order of 100 Angstroms in metals at room temperature. They also do not vary with the volume or area of heat application provided that the region contains the junction point.

Normally, electronic noise levels are in the range of a few nV/sqrt(Hz) and therefore nearly six orders of magnitude of voltage dynamic range are possible for a few tests per second. It is apparent that such an apparatus can be built to operate at very high speeds, and in fact the electrical characteristics of the device under test typically form the upper bound for the purely electronic speed of the apparatus. Since flat-panel displays typically have RC time constants in the range of a few microseconds, in the case in which the wafer is moving within the apparatus, mechanical motions of the wafer are normally the limiting factor for test times.

Figure 22A:
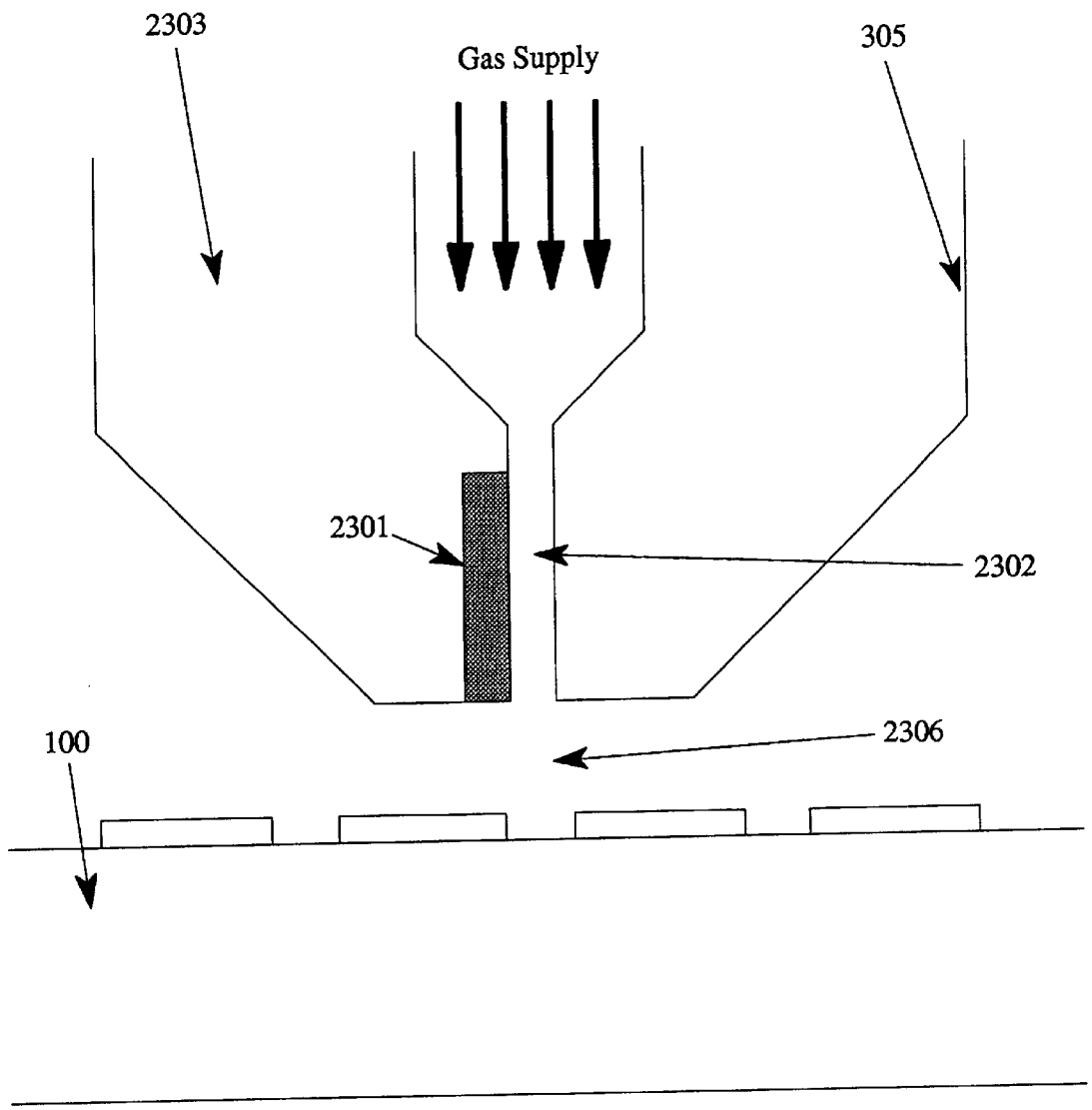
FIGS. 22a and 22b are stylized diagrams illustrating hot gas thermal energy sources disposed over a device under test.

In another embodiment of the present invention, a line source of hot gas is used as the thermal energy source 305 (FIG. 3a) to effect the coarse search in both the row and column dimensions. The hot gas is emitted in a line in close proximity to the surface of the device along the column 106 or row drivers 105. The position of the source moves rapidly with respect to the device under test. Consider the column case first. As the source moves, a single column, or perhaps several columns are heated rapidly by the hot gas. Because the source moves quickly over the point, the heat is only applied to a very thin layer at the surface. As a consequence, after the heat source passes a particular column, the temperature of the column rapidly decreases consistent with the thermal diffusion of heat. It will be readily appreciated that the test can proceed in a manner essentially identical to that described above. Because of the large amount of heat which can be delivered from a hot gas source, it is also practical to heat an entire column or row or several of either simultaneously. This has the significant advantage of greatly increasing the voltage or current signal generated by the device under test if the temperature change of resistance is utilized for defect detection. The reason for this is that a large segment of the electrical current path due to the defect can be heated and therefore the net change in resistance will be large therefore leading to a large change in the voltage or current depending on the circuit attachment. To see that this is practical, it is instructive to consider the conditions under which such a test can be accomplished. Consider a heat source moving at a rate of 1,000 traces per second. For normal flat-panel displays, the column pitch will be on the order of 100 microns, and therefore this corresponds to 100 millimeters per second. In one millisecond, the diffusion of heat in typical flat-panel display glass should carry the heat approximately 50 microns, and therefore a single trace can be heated for the duration of 1 millisecond. The amount of heat which must be deposited on the glass can be estimated as:

$$c_p \times dT \times 50 \text{ microns} \times 100 \text{ mm/s} \approx 10 \text{ Watts/meter of length to heat/deg C of heating,}$$

where $c_p$ is understood to be heat capacity per volume and dT is the desired temperature change. Since a typical driver region 105 or 106 has a height of about 2 mm, this corresponds to a heat transfer of about 20 milliwatts per degree C of temperature change that needs to be generated. The thermal conductivity for air around 100 degrees C is about 0.033 W/(m deg C). FIG. 22a shows a close-up view of a heater arrangement to achieve this heating. In the figure, the heater moves from left to right. The gap between the heater and the device must be held to high precision. Typically, this height should be on the order of 35 microns to avoid collision with the device surface and yet to allow for rapid heat transfer. This gapping can be achieved by using a capacitive height sensor and appropriate servo system. It will be well appreciated that many other gapping approaches could be used. (See, for example, Field, PCT Publication PCT WO 99/06844, Magnetic Current Sensing and Short Circuit Detection in Plate Structure, incorporated above.) Assuming that the height and width of the hot zone is 100 microns, the heat conducted to the surface will be somewhat greater than 0.1 W/m per degree of temperature difference between the heater and the device under test. A heater which operates at a temperature of 300 degrees C in air or preferably another inert gas may be constructed of a noble metal element 2301 such as platinum, nickel, or stainless steel. The dominant heat conduction can be out the top of the heater 2303 so that runaway temperatures will not occur in the event of failure of the gas flow. Note that the entrance orifice 2302 is narrower than the escape orifice 2306. This is to ensure continuing increasing pressure of the gas so as to effect Joule-Thompson heating of the gas and thereby increase the efficiency of the heater. For these conditions, the overall conduction of heat will be somewhat greater than 30 W/meter of heater length corresponding to a temperature increase of somewhat more than 3 degrees C beneath the heater on the device under test. Assuming a temperature coefficient of resistance of approximately 0.005 appropriate for most metals and a length to width ratio of the driver areas 105 and 106 of about 20, this corresponds to a change in resistance of 0.15 ohms. This is small, but the resulting change of current of 1.5 nA for a 10,000 ohm defect and 1v bias is very large compared with the Johnson noise into a 10,000 Ohm resistor of approximately 30 pA/sqrt(Hz) in an effective integration bandwidth of about 500 Hz for this experiment. Alternatively, if thermocouple junctions are formed in the driver areas 106 and a defect is present on a trace, a delivered electromotive force in the range of several tens of microvolts would be expected as a consequence of this temperature change depending on the materials choice. Again, this is a very large signal compared to intrinsic thermal noise levels of electronic circuits.

Figure 22B:
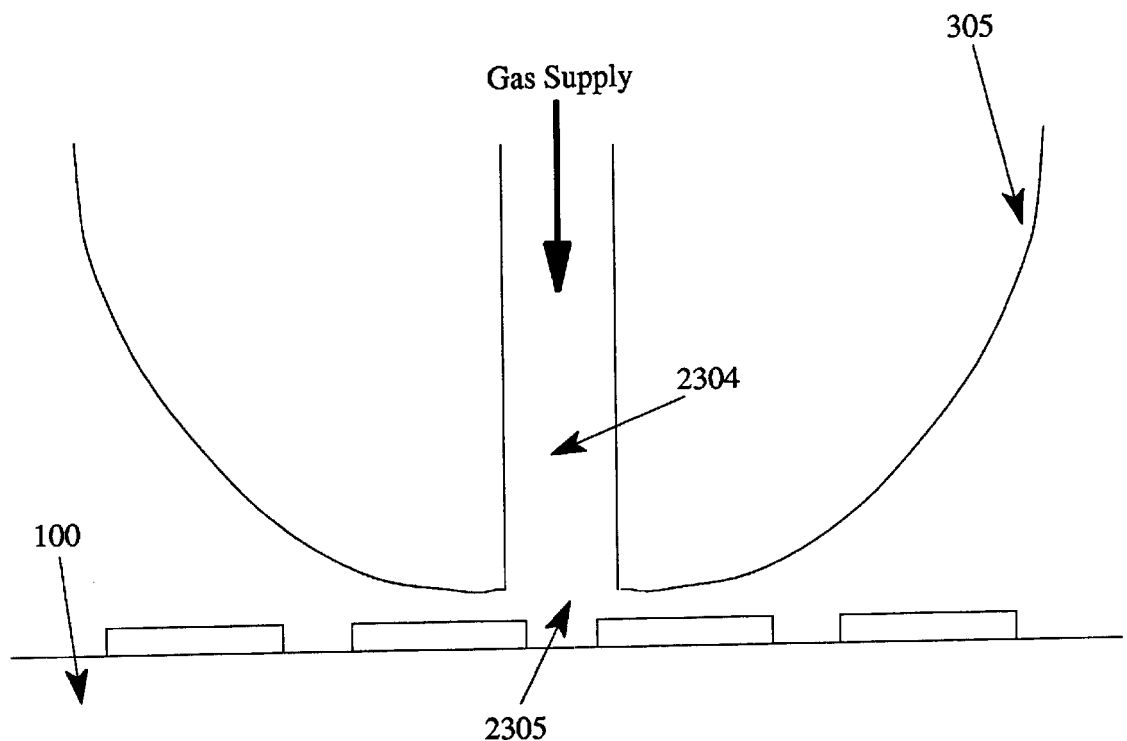

An alternative embodiment of the above "heater" arrangement can be achieved in an analogous fashion using the Joule-Thompson cooling of the gas flowing over the wafer surface. In this case, the high velocity of the gas stream results in a substantial cooling of the gas at a restriction formed between the device surface and the "cooler" in this case. FIG. 22b shows an embodiment based on this effect. In this case, the gapping 2305 between the cooler and the device is considerably smaller than the supply orifice 2304 width so as to provide for a quasi-adiabatic expansion and consequent cooling of the gas flow. Since it is not possible based on thermodynamic arguments to obtain as great a cooling energy transfer as for the above "heater" configuration, it seems that this case is somewhat less practical but still falls within the spirit of the present invention.

Figure 6:
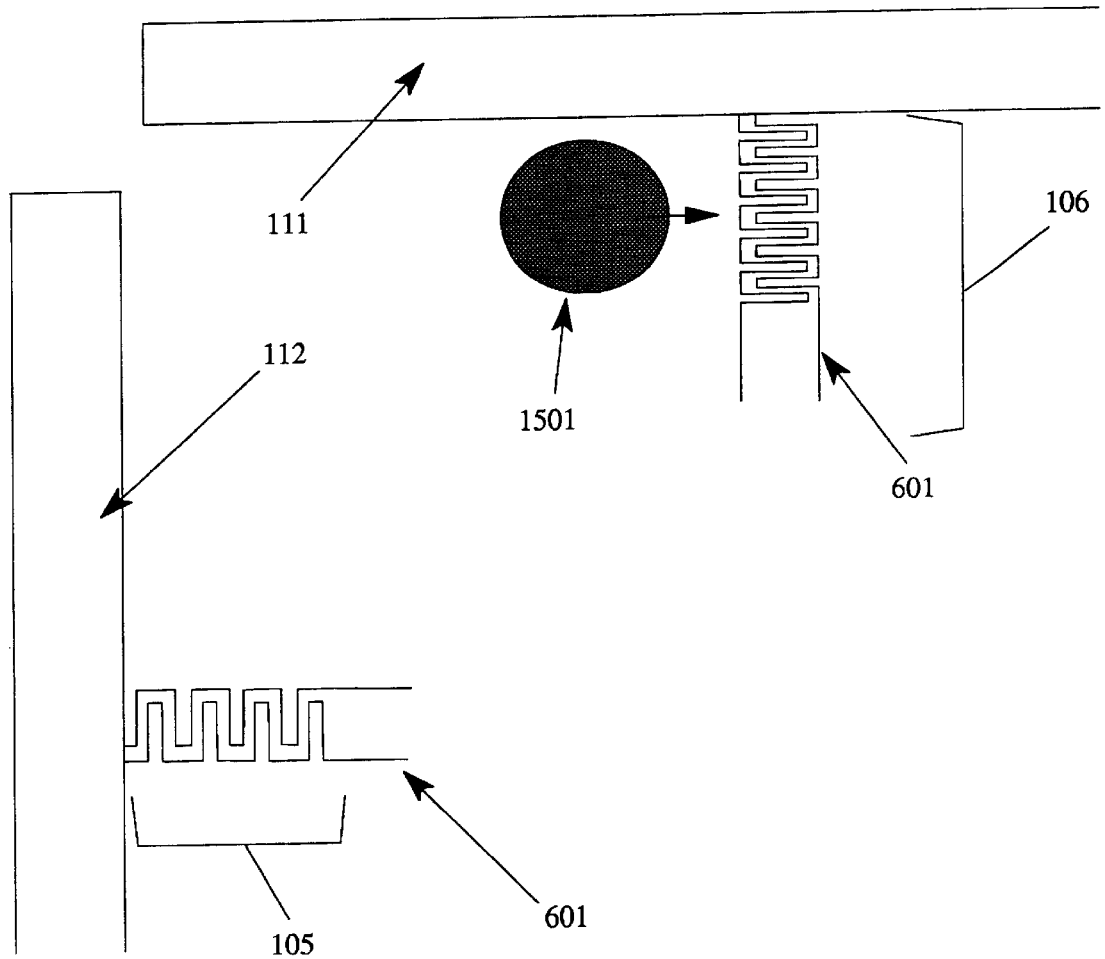

As mentioned above, certain of the thermocouple embodiments can take advantage of features designed into the device under test specifically for the purpose of facilitating thermal testing using equipment such as that shown in FIG. 3a. For example, the thermocouples 601 illustrated in FIGS. 4 and 5 may be added to a conventional FED backplate design in order to provide regions within which the thermoelectric effect can be induced by the thermal energy source 305. FIG. 6 illustrates another feature which can be designed into a DUT in order to facilitate temperature coefficient of resistance embodiments. In particular, in the embodiment of FIG. 6, a "serpentine" structure 601 has been written into each of the row and column traces within the row driver area 105 and column driver area 106. The consequence of the "serpentine" structure 601 is to increase the overall electrical path length in the driver areas where the application of thermal energy due to thermal energy source 1501 occurs. From the standpoint of the device performance, this has a negligible impact as the total resistance in the driver area is only a few ohms. Typically, driver electronics is attached in these regions in subsequent processing using special conductive tapes that will contact the "serpentine" structure equivalently to a solid trace. The traces are typically fabricated using standard lithographic techniques, and therefore, the "serpentine" structure requires only a small change to the conventional etch pattern and incurs no additional cost. Nevertheless, the electrical path length in the region in which thermal energy will be applied may be increased significantly. The resulting thermally induced change in resistance is increased by an approximately proportional amount. The result is that the overall sensitivity of the system can be improved by a substantial factor. Or, equivalently, at a given sensitivity level, the rate with which testing can be accomplished can be greatly increased. Alternatively, a combination of both advantages can be achieved. Even a simple restriction of the current path can significantly improve the sensitivity of the system. Materials of higher resistivity or temperature change of resistance will also improve sensitivity. Apparently, many different geometric patterns, material or fabrication changes can lead to substantial improvements in the overall sensitivity of the system. It is to be appreciated that obvious embodiments of the above discussed improvements fall within the general spirit of the invention. An alternative advantage of design changes such as this is to reduce the total laser power requirement, or increase the speed at fixed laser power, or to decrease the maximum temperature which the device under test experiences during test, or a combination of all of these.

Figure 13:
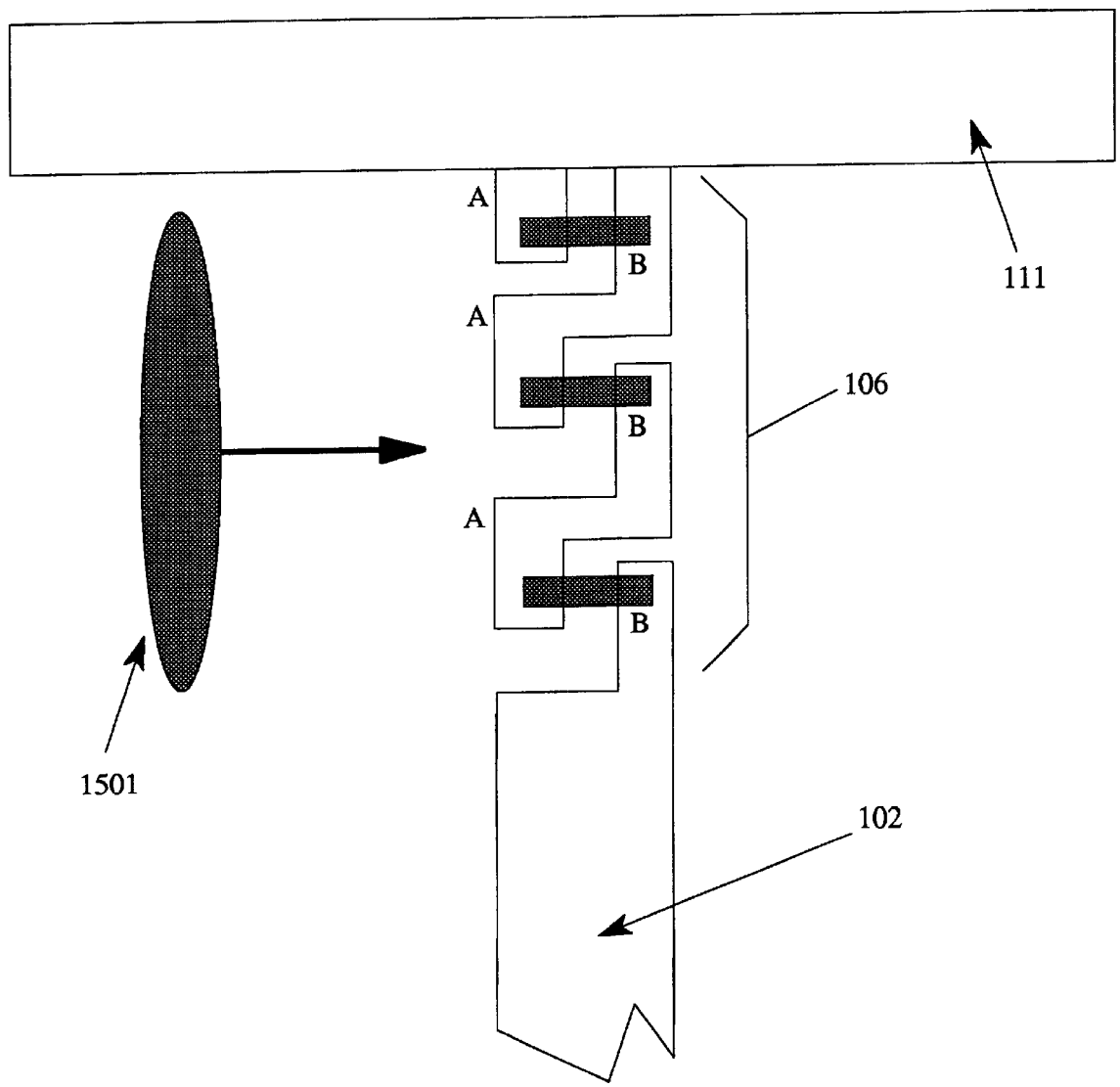
FIG. 13 illustrates an enlarged portion of a display under test.

FIG. 13 illustrates yet another feature that can be designed into a device under test in order to improve the sensitivity of thermal testing using equipment such as that shown in FIG. 3a, this time for a thermocouple embodiment. Referring to FIG. 13, many thermocouple junctions have been formed in the column or row driver region 106 or 105 in each column or row of the device under test in order to greatly enhance the measured signal. FIG. 13 illustrates these junctions in a single column trace 102. The two alternating materials used are designated A and B in the figure. The application of thermal energy by thermal energy source 305 is in the region of the junctions from material A to material B, before it is in the region of junctions from material B to material A. Note that the spot geometry of thermal energy source has been changed so that as the spot 1501 moves left-to-right first all the A to B junctions will be illuminated followed by the B to A junctions. For each junction, a thermoelectric potential characteristic of the temperature at the location, the temperature of the device under test and the test apparatus, and the materials A and B is formed. The result is that the total potential generated is as much as approximately N times as great as for a single junction and therefore the expected currents in the device under test and the voltages or currents in the electrical measuring apparatus are increased by a corresponding amount. An analogous structure can be constructed on the row side. The structure can be designed so that it starts and ends with either of material A or B, and therefore it is still possible to either ensure thermoelectric potentials in the active region of the device or to ensure similar and process compatible materials in the active region. This entire structure can be fabricated in parallel with the normal fabrication of the device, and as long as more than one conductive material is used in separate mask steps in the normal fabrication process, the structure can be added at no additional cost. An alternative advantage of a structure such as this is to reduce the total laser power requirement, or increase the speed at fixed laser power, or to decrease the maximum temperature which the device under test experiences or a combination of all of these.

Figure 7:
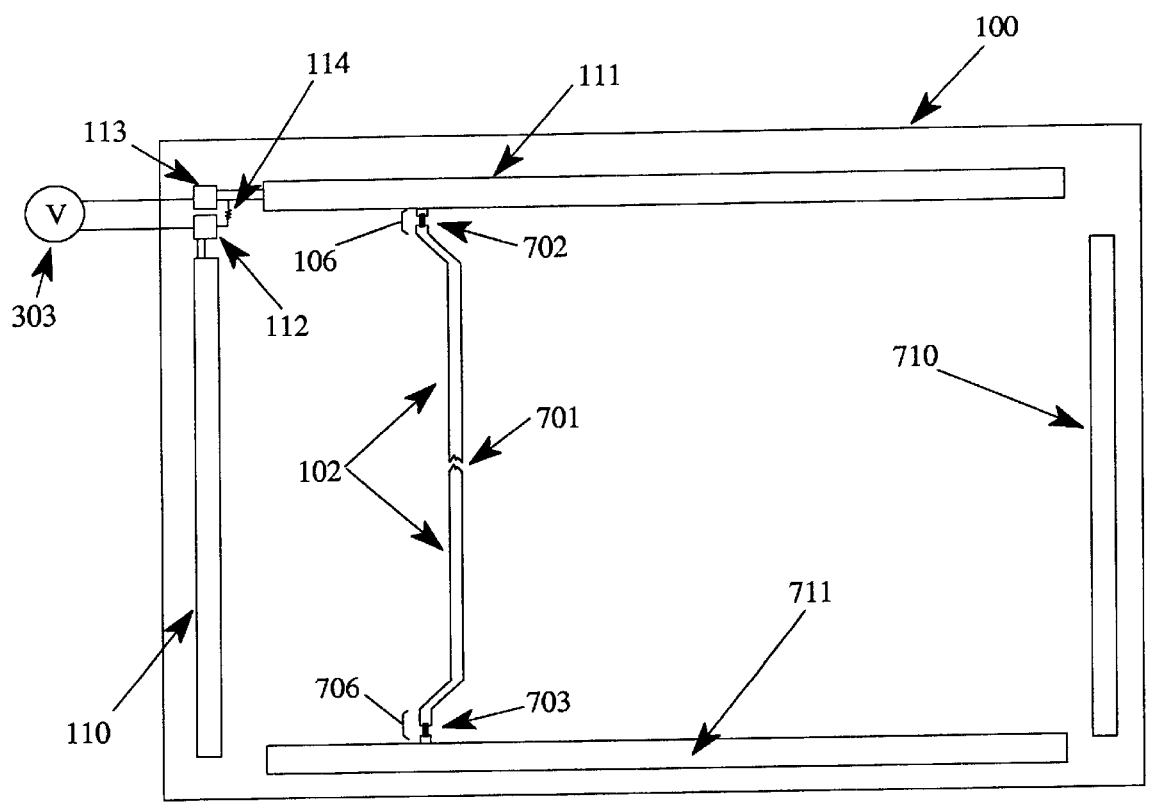

The invention is not limited for use with short circuit-type defects. It can also be used with open circuit-type defects. FIG. 7 depicts a device with an open circuit defect 701 present in a column conductor 102. In this embodiment, thermocouple junctions 702 have been added in the row 105 and column driver areas 106 for testing purposes. (Only the column conductor 102 and the column driver area 106 are shown in FIG. 7 for clarity of illustration.) Matching thermocouples have also been added in lower column and right row driver areas 706 and 705, which are on opposite sides of the row/column crossings grid from upper column driver area 106 and left row driver area 105, respectively. Note that in addition to the row 110 and column shorting busses 111, matching shorting busses 710 and 711 have been added on the opposite side of the device. These shorting bars can readily be added to the device without incurring great additional cost, and in fact, many conventional LCD and FED manufacturing processes include these double shorting bars for other process reasons.

Consider first the situation in which a search is made for an open circuit defect in the columns. A suitable sensor 310, a voltmeter 303 as drawn, is attached across the two column shorting busses 111 and 711. The application of thermal energy is performed in sequence on each column trace in the column driver area 106. In the absence of an open column conductor, the thermoelectric voltage generated at each thermocouple will result in the flow of electrical current through the selected column trace. It is to be expected that the vast majority of the current generated in this fashion will be returned through the column traces not so selected. The return of this current will create a small voltage drop between the two shorting busses 111 and 711 which the external voltmeter 303 has been attached to detect. (Equivalently, the two shorting busses 111 and 711 could be held at a fixed relative potential and the absence of current generated by the thermocouple being heated can indicate the presence of an open circuit defect in the selected column conductor.) Typically, the magnitude of this voltage will be approximately equal to the thermoelectric potential divided by the number of columns in the device minus one. Although there may be a great many columns on the device, since the thermoelectric potential is on the order of millivolts, for a typical device with a few thousand columns, there still remains two orders of magnitude of signal above the approximately 1 nV/sqrt (Hz) background noise level. Consequently, it is still possible to rapidly search the device for open circuit defects. The rows may be tested in exactly analogous fashion only using the row shorting busses 110 and 710 instead of the column ones, 111 and 711.

It is well know that two dissimilar materials in sufficiently close proximity to each other can form a thermocouple even if they are not in electrical contact with each other. This principle can be used to localize an open-circuit defect within a column or row conductor. In particular, once the defective column or row is identified, it is possible to use a binary search or other search technique on the entire column or row. This, of course, requires that the columns and the rows are fabricated out of dissimilar materials in the thermoelectric sense as previously discussed. By applying thermal energy to an area on the column or row, a transient thermoelectric current flows while the capacitance between the column and the row charge to the nominal value of the thermoelectric potential. Unfortunately, in this case, the capacitance to which the thermal energy is applied must drive the entire capacitance of the panel (or some subset of it if a more complicated bussing arrangement is used).

The thermocouples in the lower and right column and row driver regions in the embodiment of FIG. 7 permits this embodiment to be used to detect short-type defects even if column and row conductors contain open circuit-type defects. In order to accomplish this, thermal energy is applied to both ends of each column or row trace in sequence. For example, if a laser is used to apply the thermal energy, two beams can be utilized to heat both ends of each column at the thermocouple junctions in sequence. In this way, a thermoelectric potential is applied in sequence to each column. An appropriate sensor, a voltmeter 701 as drawn, can then be utilized to detect the defects in a manner exactly analogous to the utilization in the previous discussion about the use of the thermoelectric potential.

Open circuit-type defects can be detected also in a thermal change of resistance embodiment, where dual column shorting busses (as shown in FIG. 7) and dual row shorting busses are present on the device. In particular, a voltage or current bias is applied across opposing shorting busses, thereby causing current to flow through substantially all of the column (or row) traces. Only the traces with open circuit defects will fail to carry a current. The thermal energy source 305 is scanned across the individual columns (rows), and the voltage or current signal across the two opposing busses is sensed by sensor 310 (FIG. 3a). If the current decreases or the voltage increases in response to a temperature increase within a particular column (row) conductor, then no open circuit-type defect is present in that column (row). If the current or voltage fails to change, then no current is flowing through the selected column (row) trace, indicating the presence of an open circuit-type defect with the selected trace. Therefore, in this embodiment it is the absence of a change in the observed signal in response to the temperature change, which signifies the presence of an open circuit-type defect. The sensitivity of this approach can be improved using techniques described elsewhere herein, such as the serpentine structure shown in FIG. 6. On the other hand, the approach of this embodiment requires an undesirably large average current flow over the device.

Figure 8A:
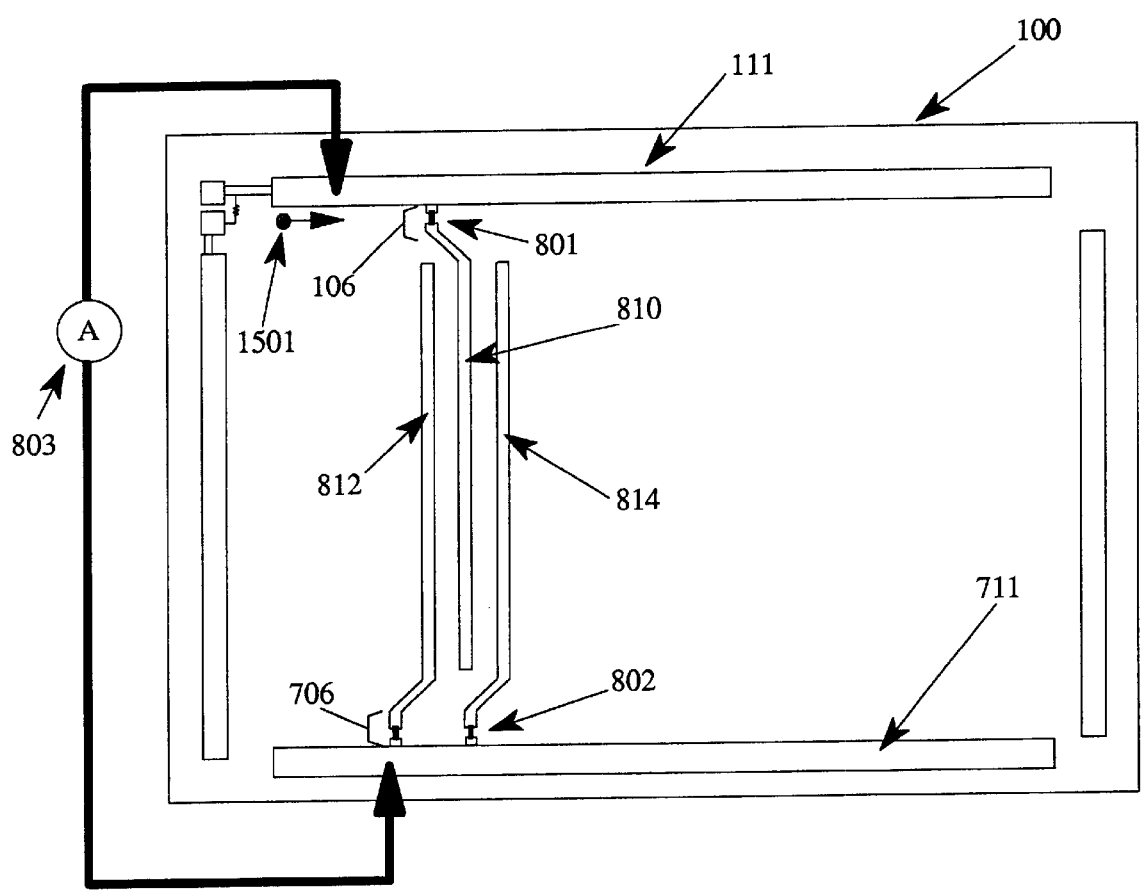

Apparatus according to the invention can also be used to detect intra-layer short circuit-type defects. FIG. 8a is similar to FIG. 7, in that dual column and row busses are present on the device. However, each of the column conductors is connected to only one of the upper and lower column busses, alternating ones of the column conductors being connected to alternating ones of the upper and lower column busses. Thermocouples 701 are present in the upper column driver areas 106 for column conductors that connect to the upper column bus 111, and thermocouples 702 are present in the lower column driver areas 706 for column conductors that connect to the lower column bus 711. A similar arrangement (not shown in FIG. 7a) is present for the row conductors. Note that whereas the thermocouples illustrated in FIG. 8a are made up of short segments of dissimilar metals at the upper or lower ends of the column conductors, in another embodiment, the dissimilar metal can extend the entire length of the column or row conductor in a manner similar to that discussed above with respect to FIG. 5.

In operation, the sensor 310 (FIG. 3a) is connected across the upper and lower column busses 111 and 711. The thermal energy source 305 is then scanned across the thermocouples in the upper column driver region 106. If a short circuit-type defect is present between two of the column conductors 810 and 812 or 810 and 814, then current will flow between the two column busses 111 and 711 in response to thermal activation of the thermocouple 801 for the column conductor 810. It is not yet known, however, whether the short is between column conductor 810 and column conductor 812, or between column conductor 810 and column conductor 814. In order to make this determination, the processor 318 directs the thermal energy source 305 to apply thermal energy to the thermocouples 802 in the lower column driver area 706 for each of the columns 812 and 814 at different times. A change of the predetermined type in current flow between the two column shorting busses 111 and 711 in response to the temperature change at one of these two thermocouples, sensed by sensor 310, determines that the selected column 812 or 814 is the one which is involved in the short. An analogous method can then be applied for the rows.

Figure 8B:
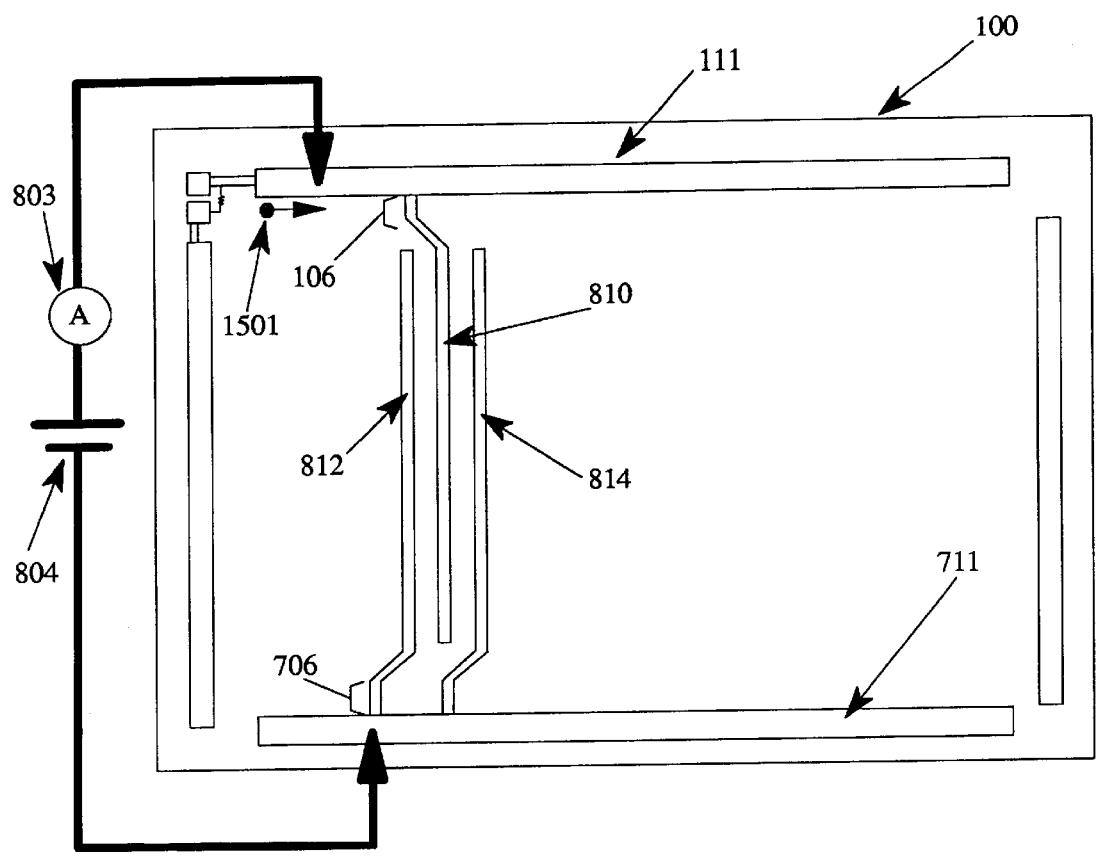

FIG. 8b illustrates a modification of the embodiment of FIG. 8a for the temperature change of resistance method. The structure of the device under test in FIG. 8b is the same as that of FIG. 8a, except there are no thermocouples 801 or 802. Also, a current or voltage bias (voltage bias 804 is illustrated in FIG. 8b) is applied across the column shorting busses 111 and 711.

In this event, current flows only in two columns that are shorted together. When the thermal energy spot 1501 is applied to a column 810 attached to the upper bus 111 which is shorted to a column 812 or 814 attached to the lower bus 711, the total current flowing through the device would be modified by the temperature change of resistance of the column 810 in the column driver area 106. It is then possible to apply thermal energy to the two adjacent columns 812 and 814 in the lower column driver area 706 to determine which of the two columns is shorted to column 810. An analogous method can be applied to detect any rows that are shorted together.

In the case of open circuit-type defects as well as in the case of columns shorted to columns or rows shorted to rows, once the defect is localized to a known pair of traces, it is very probable that the defect can be further localized using conventional optical techniques. This is because these defect types by their very nature must be on the order of the size of the traces. Thus an open circuit or two traces that are shorted together are very likely to have a strong optical signature. Optical inspection can be accomplished by an entirely automated process on the same machine as that used to implement the invention.

Figure 19A:
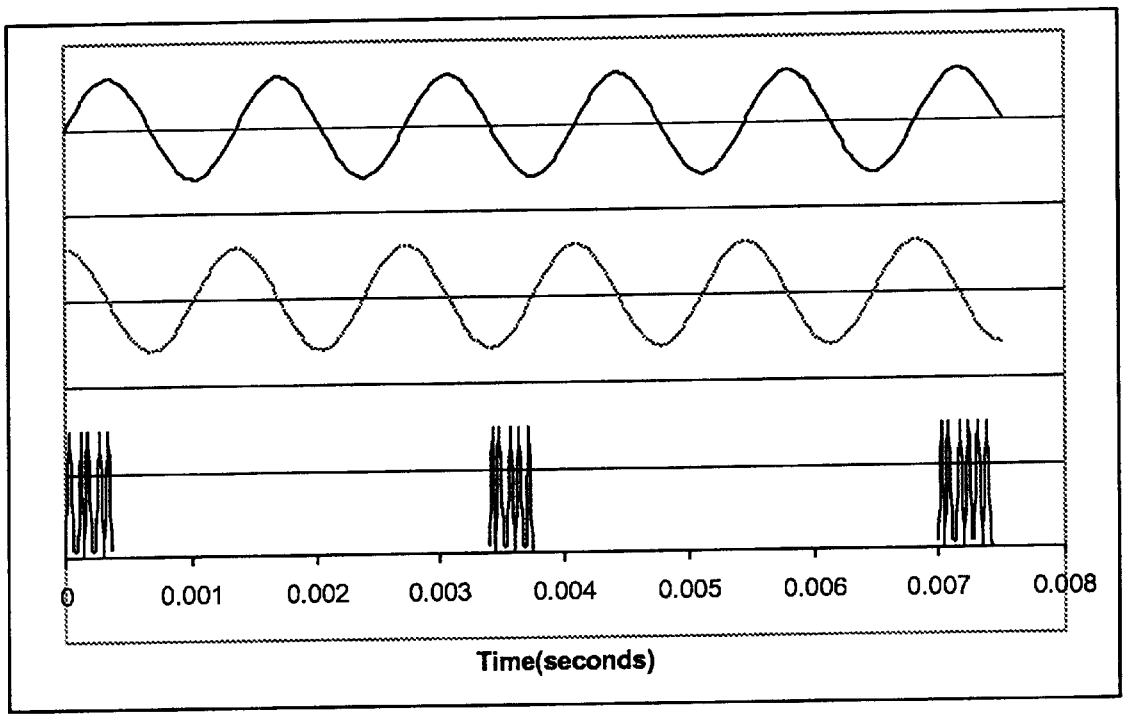
FIG. 19a shows an applied time varying bias waveform and time varying thermal energy waveform.
Figure 19B:
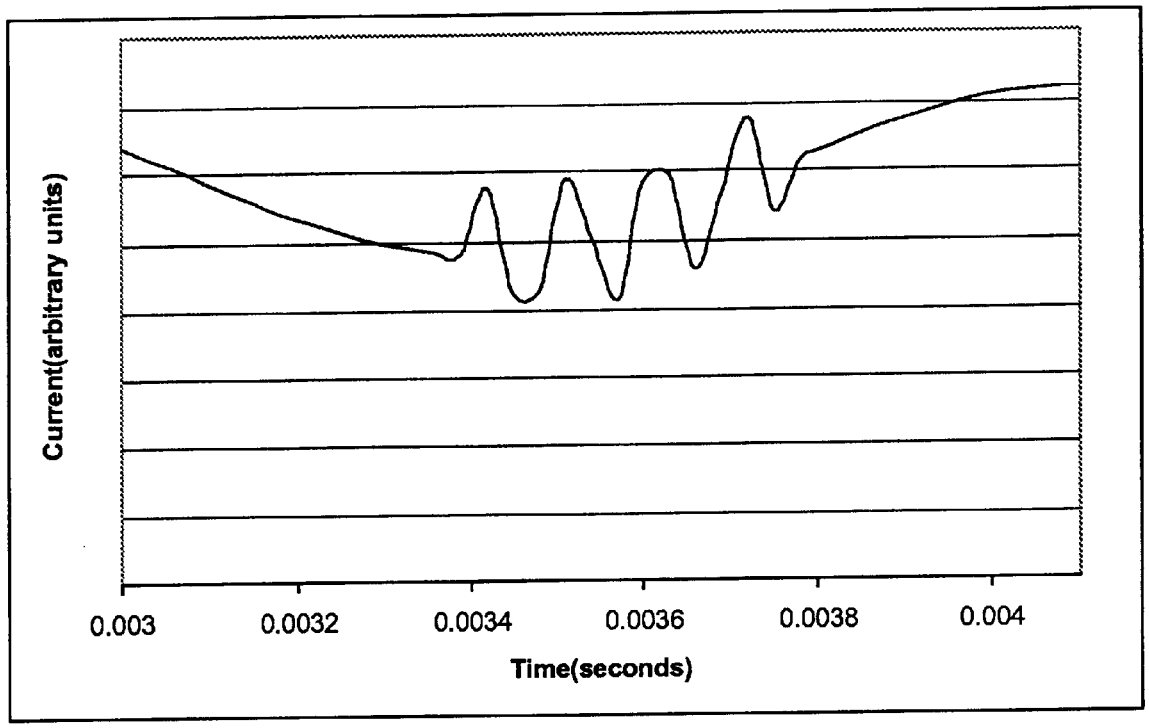
FIGS. 19b and 19c illustrate typical output signals for a temperature change in resistance embodiment and for a thermoelectric potential embodiment, respectively.
Figure 19C:
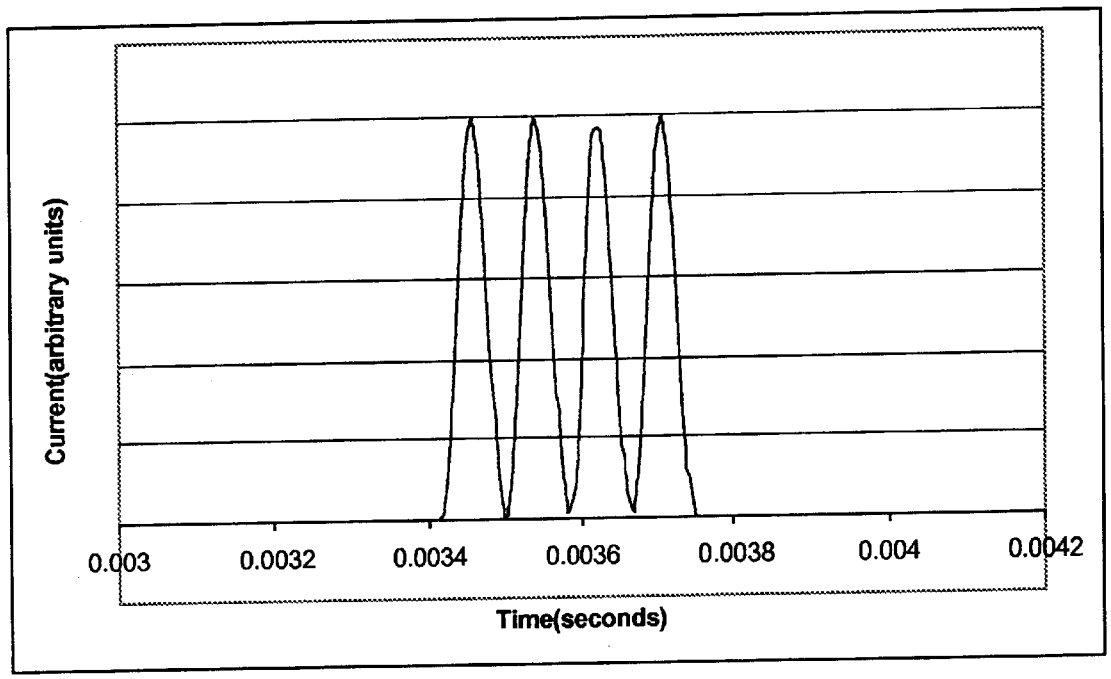

For a variety of reasons, especially related to increasing the overall sensitivity or spatial resolution of the invention, it is frequently desirable to apply a time varying electrical bias to the device and/or a time varying thermal energy. The effects of this do not change the spirit of the invention, but can improve its utility. FIG. 19a shows the time history of the applied voltage or current bias, and the applied thermal energy. FIGS. 19b and 19c show typical output signals for the sensor 310 as presented to the processor 318 for a temperature change in resistance embodiment and for a thermoelectric potential embodiment, respectively, as the thermal energy source passes over a defect point. It will be appreciated that for the temperature change in resistance embodiment, a multiplicative process is going on within the device. The flowing current is being multiplied by the change in resistance due to the application of thermal energy. It is therefore to be expected that mixing frequencies will be created in this case between the frequency of voltage application to the device and the frequency of application of thermal energy. For example, if a 700 Hz sine wave electrical bias is applied to the device and a laser is focused on a spot for test with a pulse repetition rate of 10,000 Hz, mixing frequencies would be observed at 9300 Hz and 10,700 Hz if a current flows, as well as other harmonics of the two driving frequencies, 10,000 Hz and 700 Hz, depending on the nature of the device, the temporal nature of the thermal energy pulse and its temporal position on the device. It is apparent that the magnitude of these mixing frequencies at the contact patches 112 and 113 will be strongly affected by the electrical characteristics of the device as well as the diffusion of heat into the device. This will generally create a more complicated output from the electrical measurement, but the principles of detection and localization remain the same and are well understood in the context of electrical circuit theory and optimal signal processing. Typically, by creating a harmonic frequency at a relatively low frequency, it is possible to increase the sensitivity of the apparatus because the electrical characteristics, and in particular the capacitance, of the device allow it to respond to a greater degree to the signal indicative of a defect. It is also apparent that depending on the character of the defects and the device, the noise which will be present in the system may be strongly affected by the application of different frequencies of excitation in voltage or temperature.

Figure 27A:
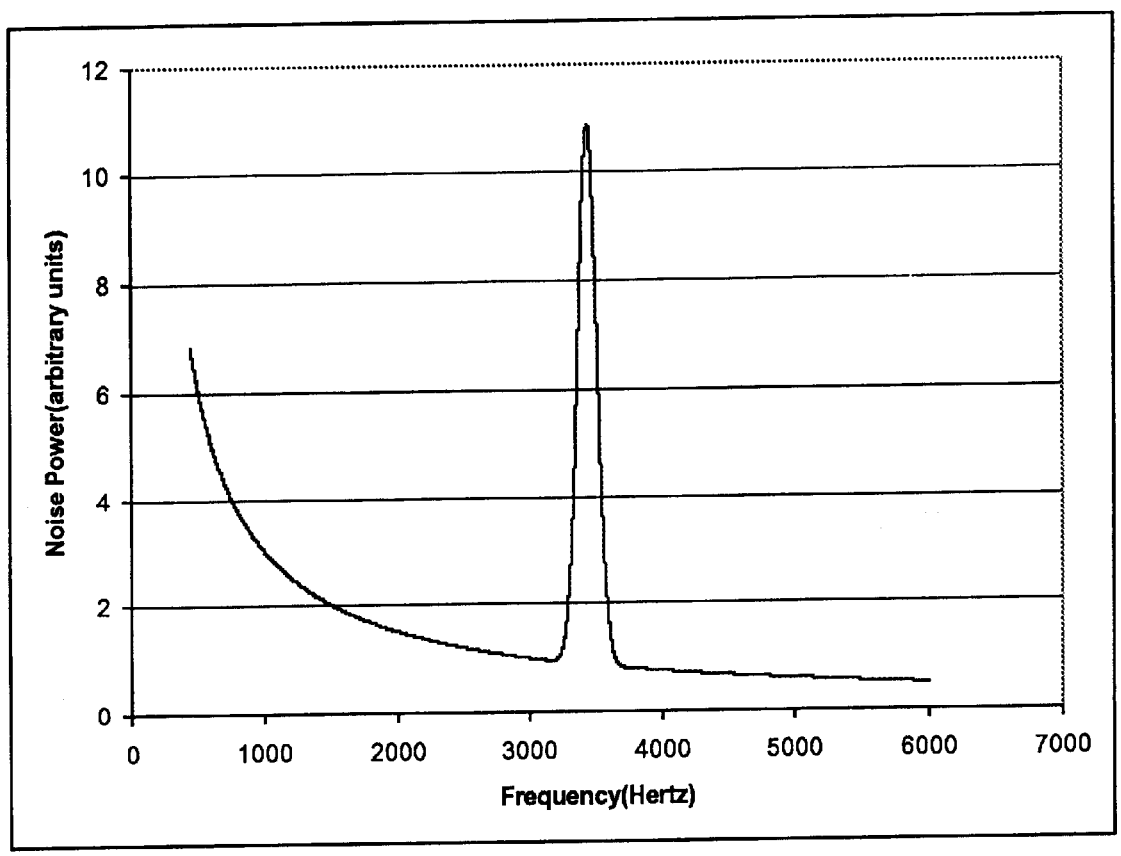
FIGS. 27a–e show the time and frequency characteristics of a simplified optimal filter for the purpose of signal extraction.
Figure 27B:
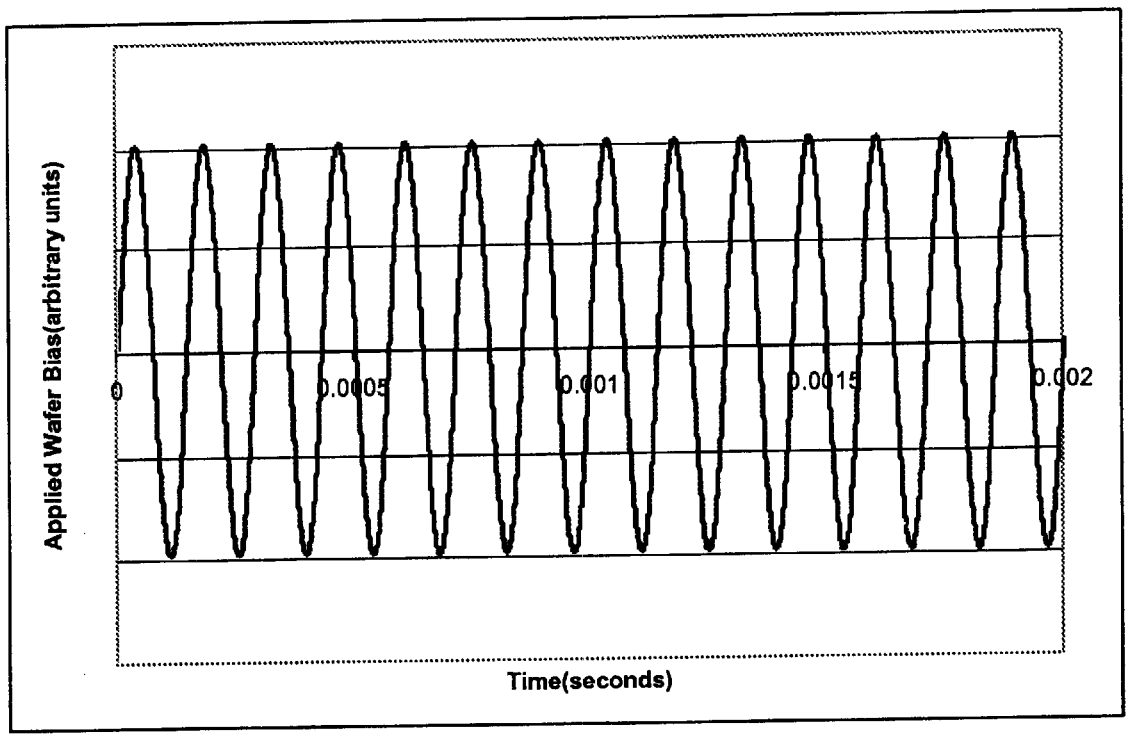
Figure 27C:
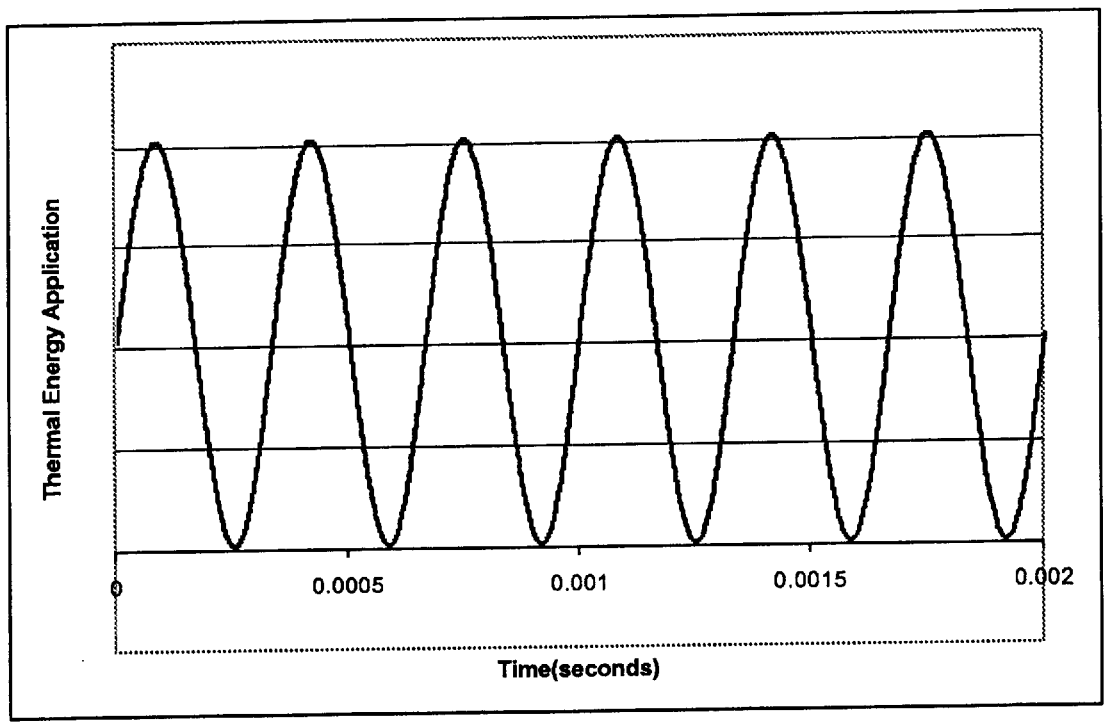
Figure 27D:
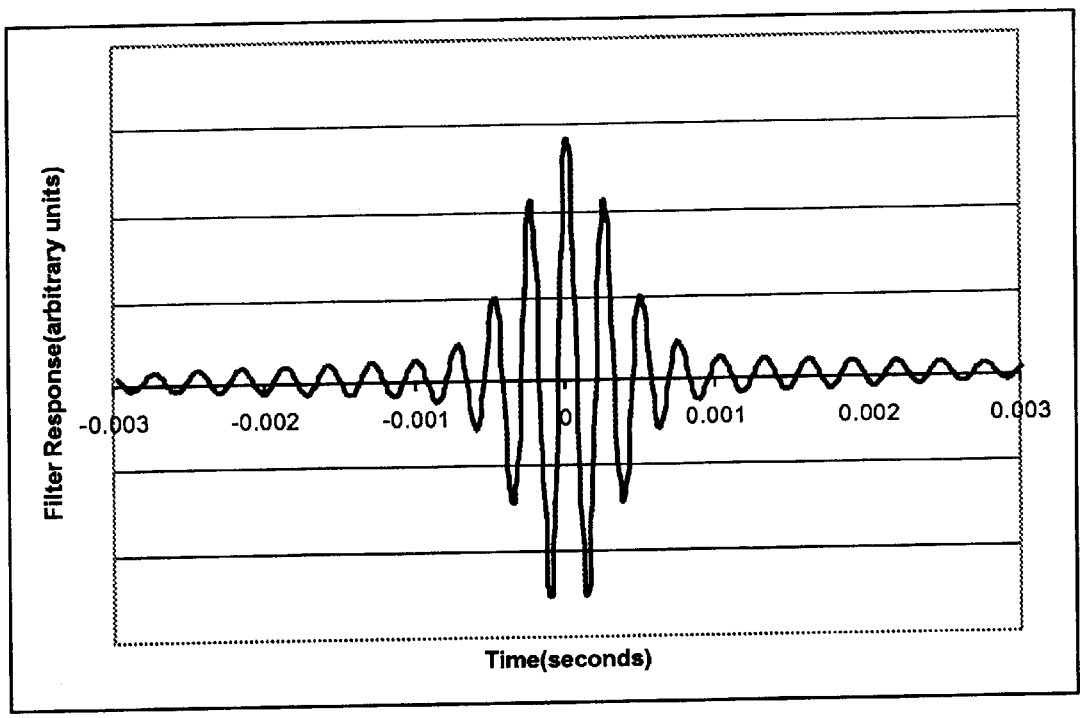
Figure 27E:
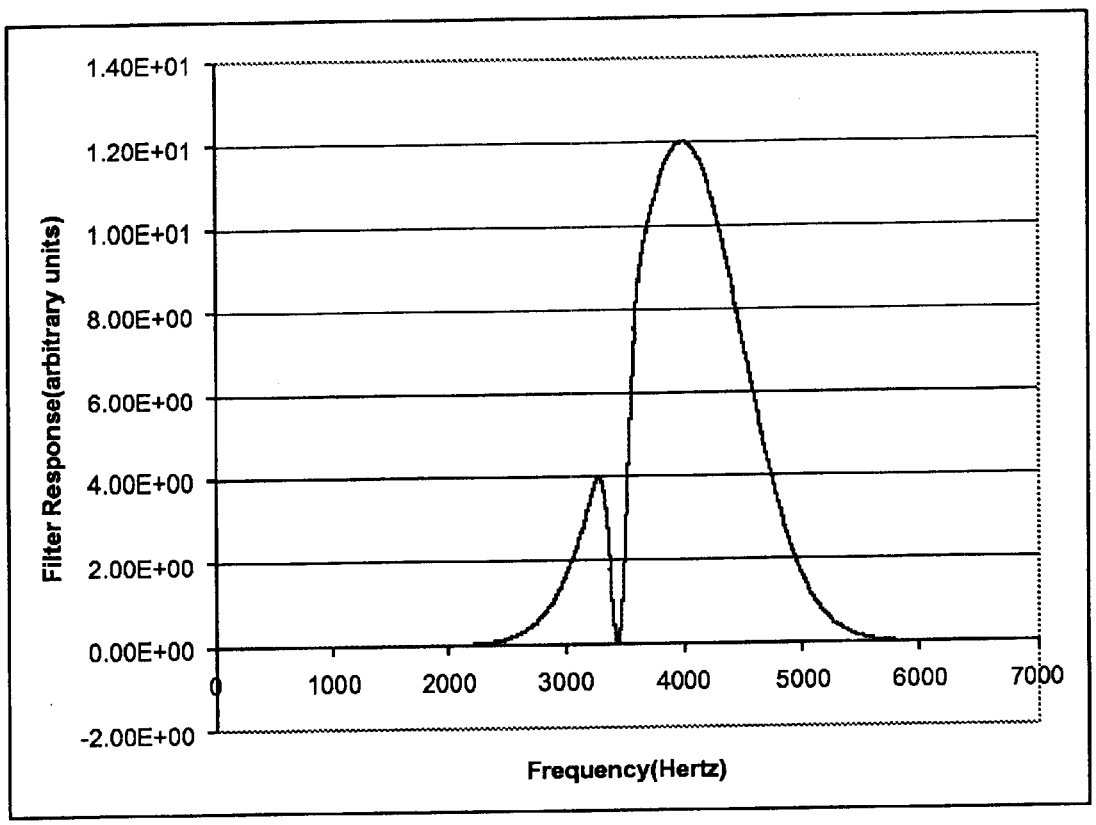

It is understood that the time varying application of thermal energy can be created by a time varying magnitude of energy application, or by a time varying position of the application without a change in the magnitude of energy application, or to a situation in which both position and magnitude change in time. FIGS. 27*a–d* depict the design of a simplified filter characteristics for the case of time varying bias potential and thermal energy application for the case of change in resistance due to temperature. FIG. 27*a* shows the background noise spectrum received by the pickup electronics. Notice that in this example case, there is a large amount of narrowband noise around 3400 Hz. FIGS. 27*b* and 27*c* show the time varying bias application and thermal energy application respectively. FIG. 27*d* shows the impulse response of a filter designed to maximize the received signal to noise ratio. FIG. 27*e* shows the power spectrum of the filter impulse response. The filter characteristic has strong frequency content at frequencies at which the signal is strong, and weak frequency content at those at which the noise is strong. This weighting of frequency content is often done by the well-known procedure of least squares analysis. It is frequently the case that other considerations also enter into the design of appropriate optimal or nearly optimal filters. The use of a time varying position of application of thermal energy is particularly advantageous in multiple thermocouple embodiments such as that shown in FIG. 13, described above. In this embodiment, a temperature change induced in the A-B thermocouple junctions will produce a thermoelectric potential which is opposite to that produced in response to a temperature change induced in the B-A thermocouple junctions. Thus if the thermal energy spot 1501 is oscillated back and forth between the A-B junctions and the B-A junctions, then the peak-to-peak oscillating thermoelectric potential created will be double that which would be created if the spot 1501 is merely oscillated onto and off of a single thermocouple junction.

Figure 14:
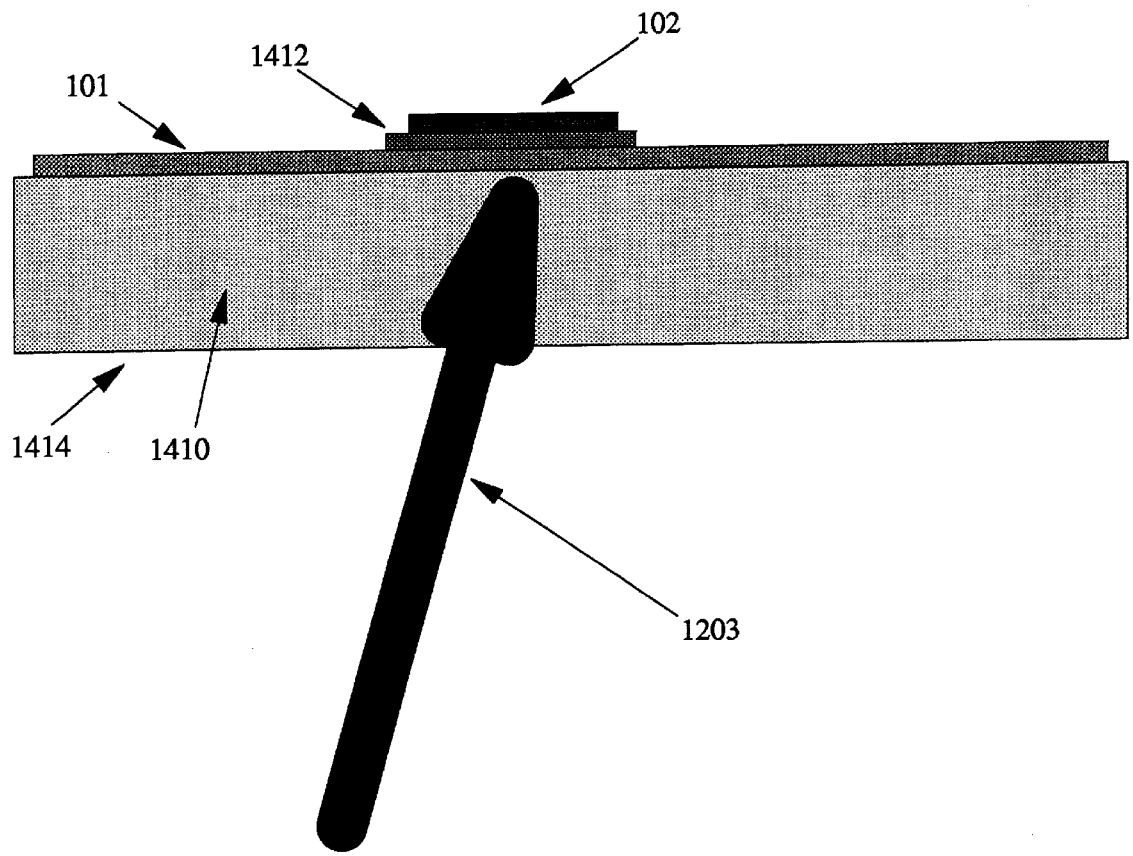
FIG. 14 is a simplified edge view of a flat panel display, showing back surface thermal energy application.

For most aspects of the invention, many different kinds of thermal energy sources 305 can be used. In the event that the thermal energy is electromagnetic in nature, as in the case of a laser, it is possible to apply the thermal energy from the back surface of the device provided that the electromagnetic radiation can penetrate the device. FIG. 14 depicts a greatly magnified edge view of a device under test, including substrate 1410, a row conductor 101, an interlayer dielectric 1412, and a column conductor 102. A laser beam 1203, produced by a laser not shown in FIG. 14, is shown passing through the device 100 from the back side 1414. Many of the inventive techniques described elsewhere herein for top surface application of a thermal energy source, can also be used with back surface application of the thermal energy. This feature greatly facilitates inspection after final assembly of the display at which time front surface inspection is generally not possible. It is therefore possible to localize defects after assembly. Furthermore, a laser beam, possibly the same laser beam 1203 used for test, can also be used to remove a defect from the back surface as well, again assuming that the laser can penetrate through the device substrate. Laser repair of flat-panel displays is a well developed art and therefore a wide variety of tools and methods exist for achieving the repair. The utility in back surface application is an important advantage of the invention since defects occurring after final assembly, perhaps during initial testing of the device, are almost certainly invisible optically from the back surface and a maximum of cost has been incurred at this point in the fabrication of the display. Therefore, there is a high premium on detection, localization and repair of defects after final assembly.

Figure 9A:
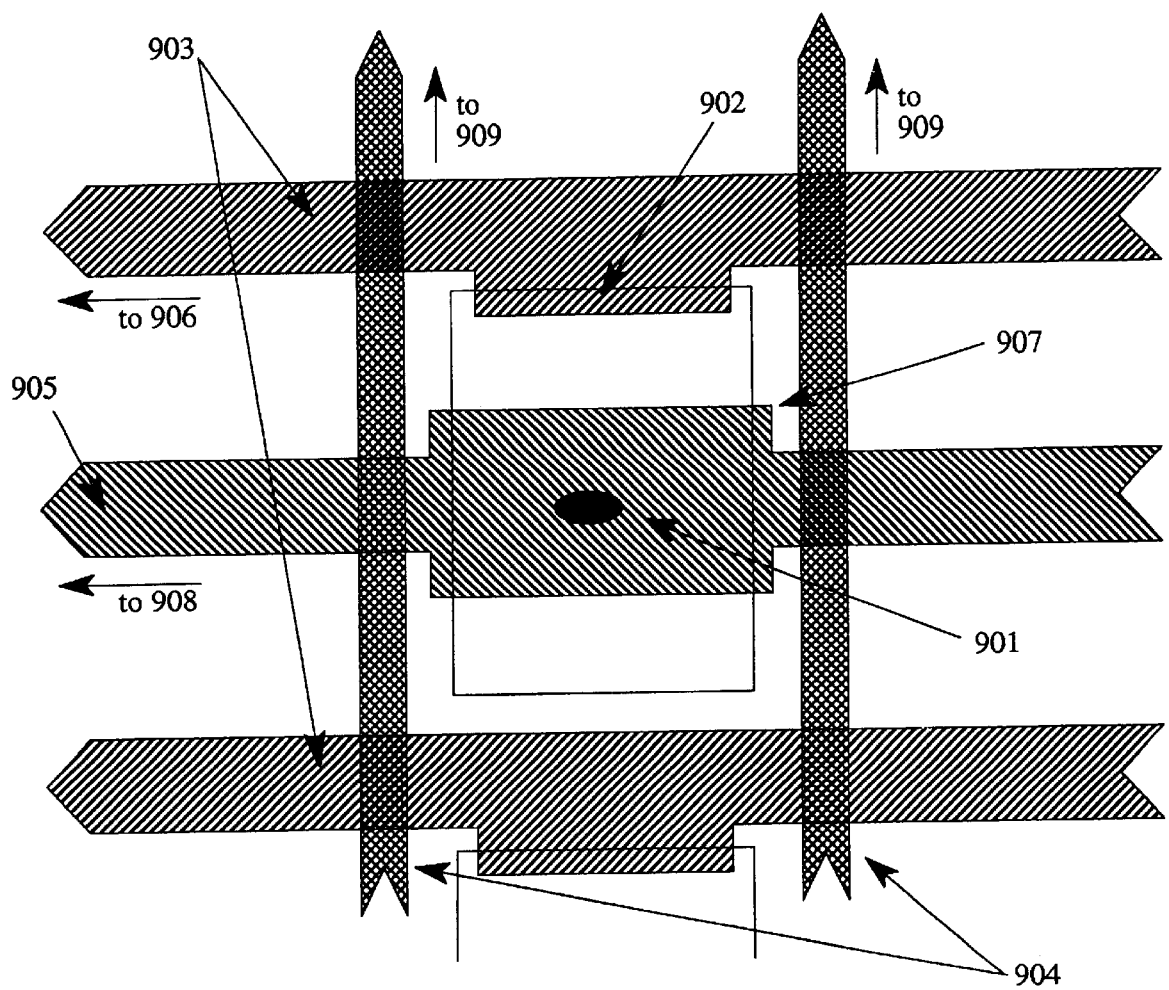
FIG. 9a is a stylized diagram of a portion of a LCD flat-panel device.
Figure 9B:
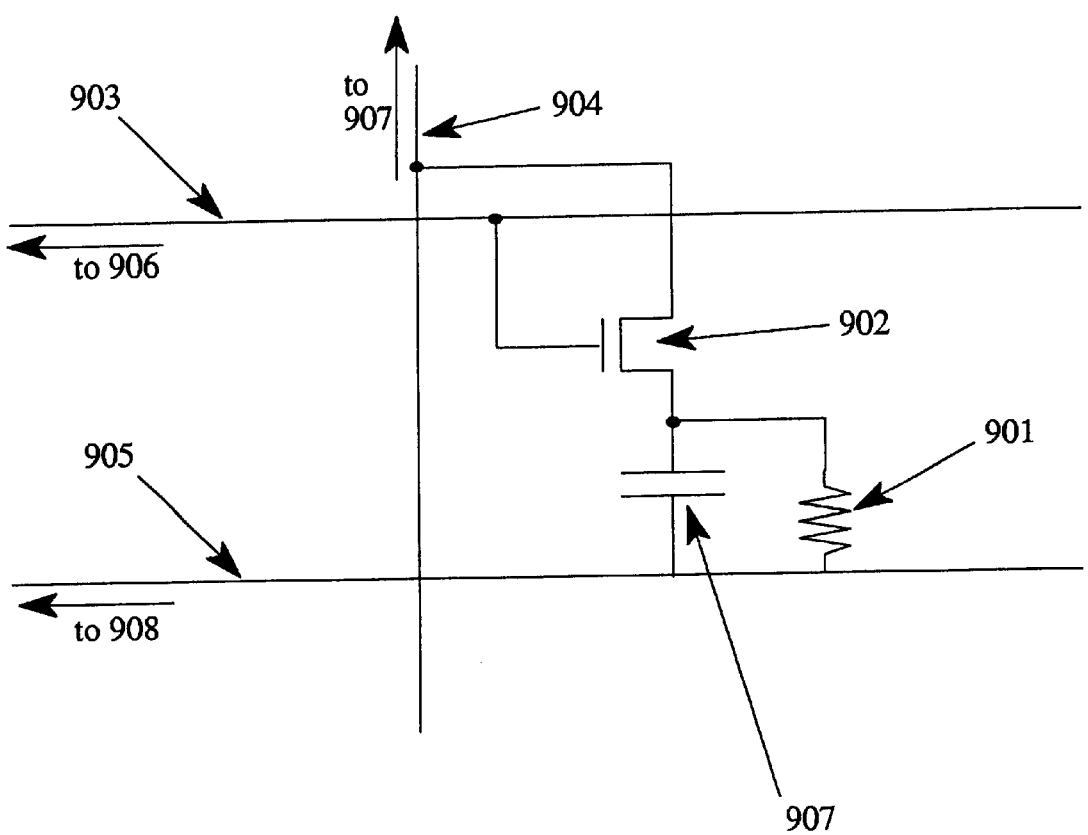

Some types of flat-panel displays, as in the case of LCD displays, have active electronic devices, such as diodes and transistors and other specially constructed devices, within the array. The presence of active devices creates the opportunity for additional defect types as well as more complicated testing. For example, FIG. 10*a* shows a case of a short circuit 901 in the storage capacitor 907 in an active matrix LCD panel. FIG. 9*b* depicts an equivalent electrical schematic of the situation. These illustrations show only essentially one pixel of the display on the backplate, including a horizontal gate line 903, a vertical drain conductor 904 and a horizontal source conductor 905. The storage capacitor 907 is typically made of an ITO layer. It is typically charged and discharged through transistor 902 to the drain line 906. The gate conductors are all connected at one end to an external gate conductor shorting bus 906 (not shown in FIG. 9*a*). Similarly, the data conductors 904 are all connected at one end to a data conductor shorting bus 909 (not shown in FIG. 9*a*) and the common conductors 905 are all connected at one end to a common conductor shorting bus 908 (not shown in FIG. 9*a*).

In order to observe the short circuit 901, the transistor 902 is switched on by applying an appropriate voltage signal to the gate of the cell transistor 902. Typically, the gate 903, data 904, and common 905 electrodes are controlled by their respective external bussing connections 906, 909, and 908 similar to the case for the rows and columns in an FED array. Therefore, all the transistors in the array may be turned on with an appropriate application of voltage to the gate bus 906. In this condition, short circuits may be located using the present invention.

Typically, flat-panel displays of the liquid-crystal type form capacitors with a overlay of aluminum, an insulator, and indium tin oxide (which is usually about 90% transmissive). It is apparent that a short circuit-type defect in a structure of this sort will inherently result in a thermocouple junction between aluminum and indium tin oxide. This junction will create a thermoelectric potential upon the application of thermal energy. Additionally, LCD displays have many overlapping conductive traces for the purposes of bringing the control signals and charge into and out of the device. In these overlapping regions, defects may be present which are analogous to those formed in the case of a FED device. In the case of dissimilar materials in the thermoelectric sense, again, a thermoelectric potential will be formed on application of thermal energy. This potential can be detected according to the principles discussed above for the FED case. In the case of identical materials, similar to the FED case of identical materials, the electrical resistance in the conductive defect will change on the application of thermal energy. Again, this change in resistance may be detected according to the principles discussed above for the FED case. In either event, it is possible to proceed in similar fashion to the methods described for the FED case.

It is apparent that LCD flat panel displays typically include three conductors for each pixel, whereas FED displays typically include only two. Thus while the conductors in an LCD display do cross each other at crossings, there is not a one to one correspondence between crossings and pixels as there is in a typical FED. Nevertheless, as used herein, the terms "row conductor" and "column conductor" are intended to be interpreted broadly enough to include all horizontal and vertical crossing conductors, respectively.

In LCD displays, short circuits may also occur in the transistors. In this case, many different situations may occur, but by applying the principles of the present invention, the location of these defects may still be found. It is now a frequent practice to install a second redundant transistor on each cell of an LCD panel for the purpose of laser-rewiring in the event a defective transistor is fabricated. Again, this is still compatible with the present invention.

Figure 20A:
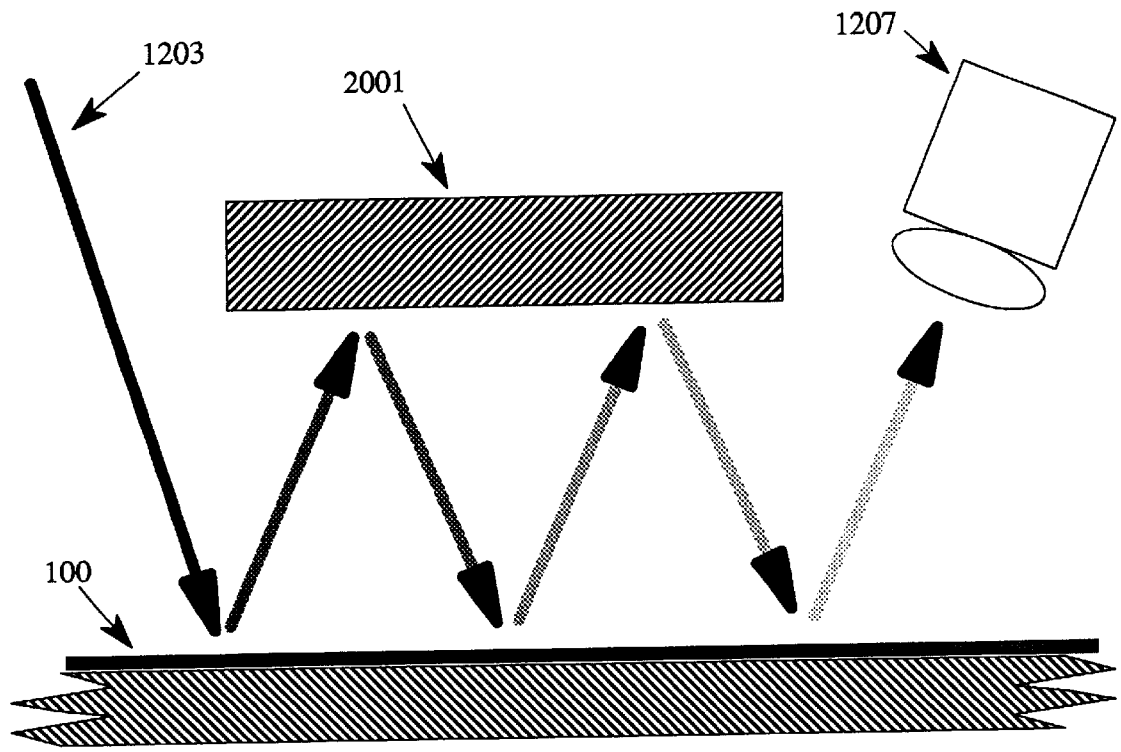
FIGS. 20a and 20b illustrate edge views of portions of a device under test, in which reflectors are used to increase the total intensity on target resulting from a laser source.
Figure 20B:
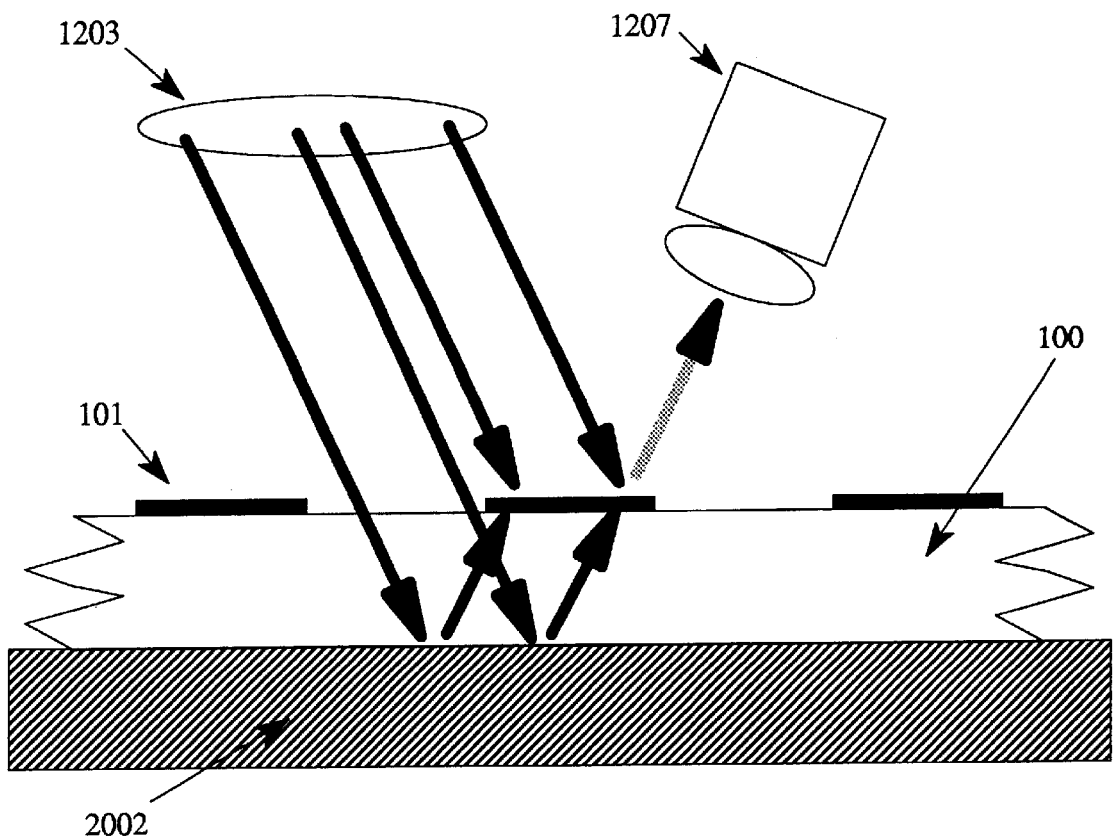

FIG. 20a shows a detail of an embodiment including a laser beam 1203 and a multipass reflector 2001 allowing for greatly increased intensity on the device under test 100 for a given laser power. For the case of highly reflective surfaces, laser energy absorption can be as low as 5–20 percent of the incident energy and therefore much of the laser energy is wasted. The embodiment of FIG. 20a illustrates a way to capture and re-use some of the laser energy that may otherwise be lost. Similarly, FIG. 19b shows a case in which the support plate 2002 for the device under test is reflective so that incident optical energy impinges on the location under test from the top as well as from the bottom thereby providing for absorption of laser energy that would have been wasted after traveling through the glass. Neither of the embodiments of FIGS. 20a and 20b preclude the use of a reflectance monitor 1207 as in FIGS. 12a, 12b and 12c.

Figure 17A:
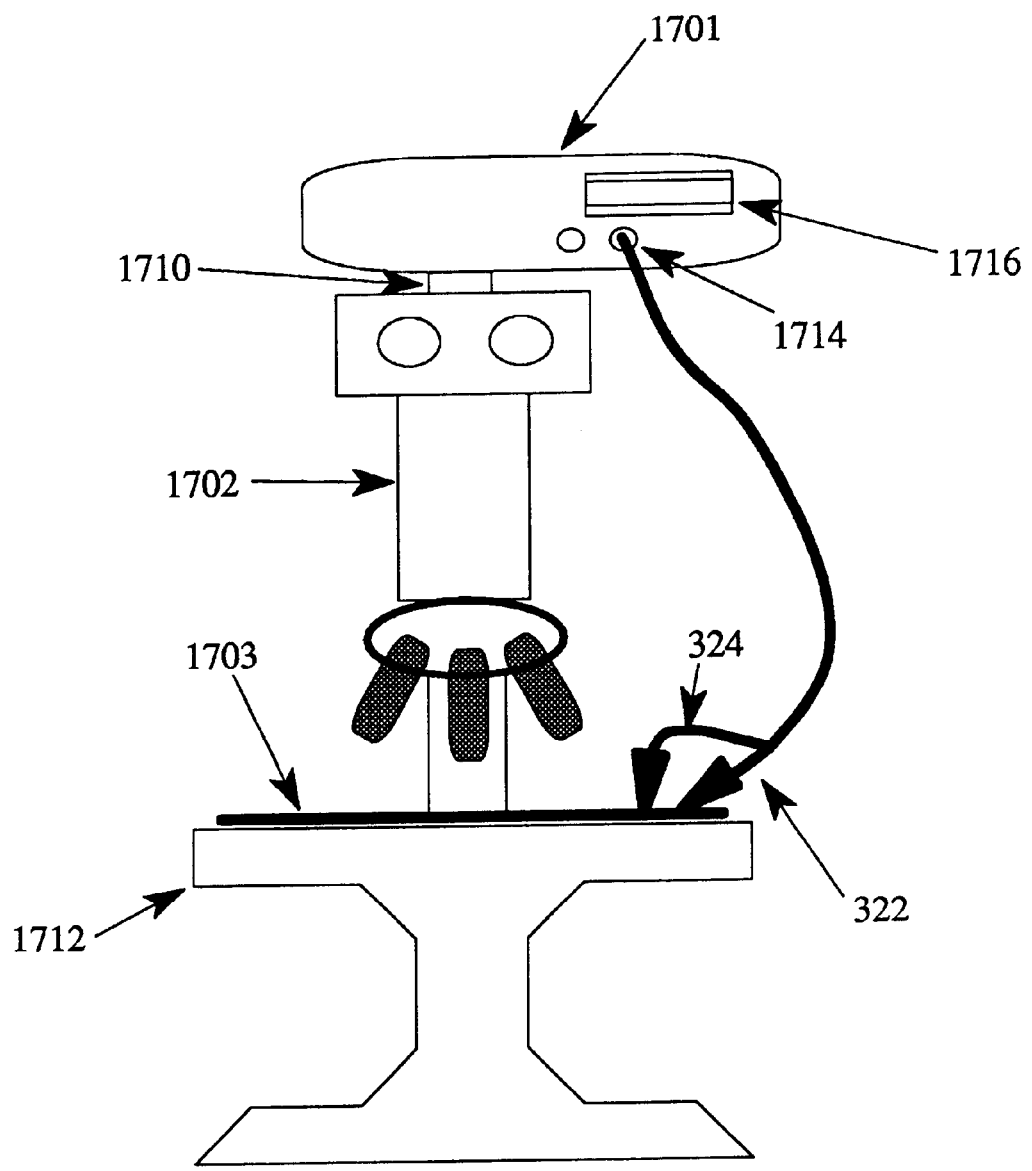
FIG. 17a is a stylized illustration of an inspection tool incorporating apparatus of the invention.
Figure 17B:
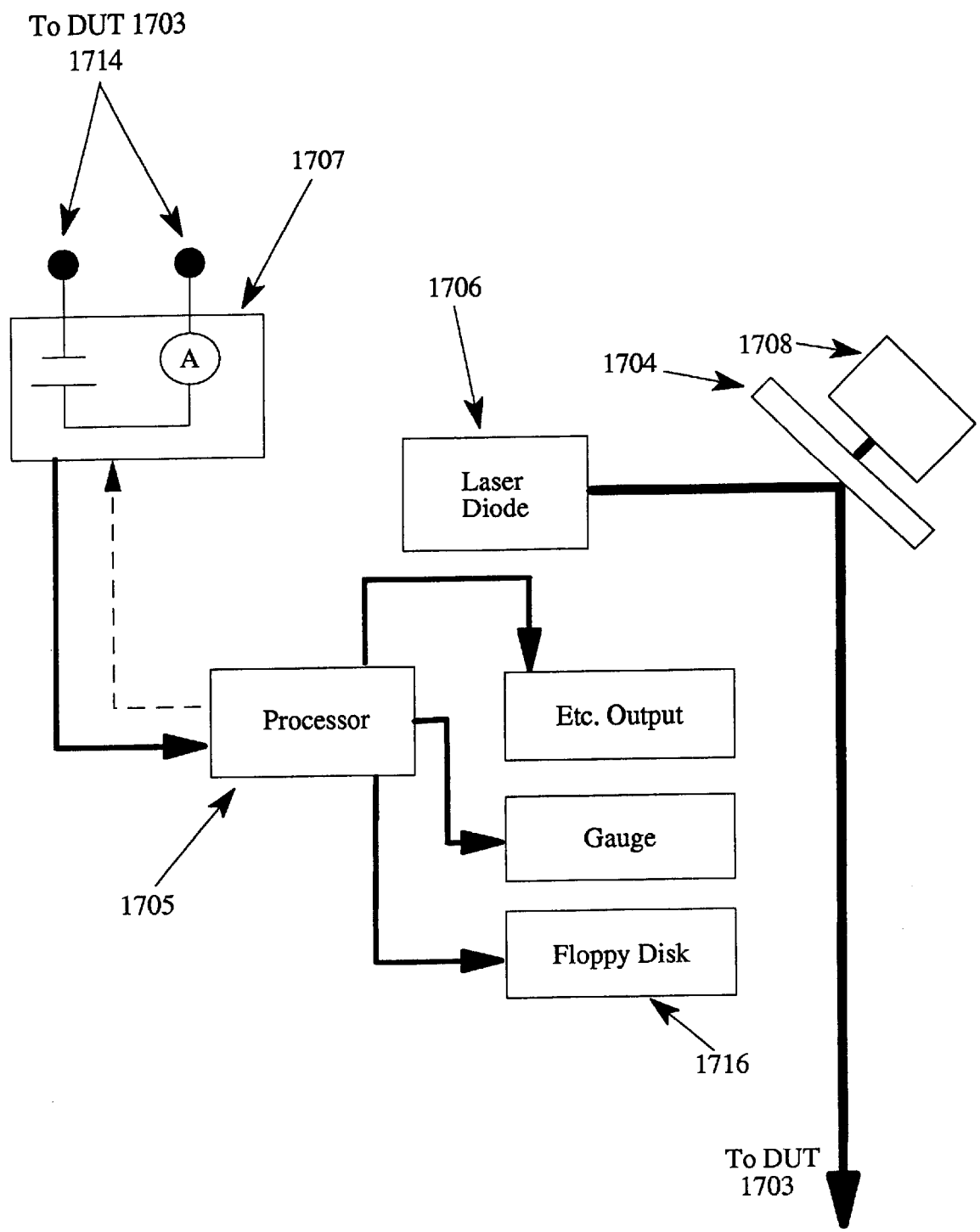

Test apparatus for implementing the present invention need not be very complex or expensive. In fact, advantageously it can be piggy-backed on other flat panel inspection equipment which may already exist in a flat panel development or production facility. FIG. 17a illustrates such a system, in which the test apparatus 1701 is piggy-backed onto a microscope 1702 that has a CCD camera mount at the top of its optical column. These mounts typically have standard and well known mating patterns and the test apparatus 1701 is designed to mate with this mount 1710. The microscope 1702 includes a platform 1712 designed to support a flat panel display component 1703 below the lens. FIG. 17b is a block diagram of the test apparatus 1701. Within the test apparatus 1701, there is an optical beam source, such as a high-power single transverse mode diode laser 1706. This beam source reflects off of a mirror 1704 which may be tilted mechanically by a mirror controller 1708 in response to commands from a processor 1705 within the apparatus 1701. Provision is made for electrical contact to the row and column bussing 110 and 111 or the electrical equivalent on the device, for example via probes 322 and 324 connected to a connector 1714 on the apparatus 1701. The probes 322 and 324 are attached to an electrical measurement device 1707, such as sensor 310, within the apparatus 1701. As discussed previously, the sensor 1707 may detect voltages, currents, or a combination of both quantities. Provision is made on the apparatus 1701 for additional electrical connections to device under test 1703 for the purpose of providing any additional and necessary or desired driving electrical signals to the DUT 1703. For example, in the case of a LCD array, an additional electrical connection could be utilized for the purpose of switching all the transistors on by the application of an appropriate voltage to the gate bus 906. The mirror 1704 is made moveable in order to accomplish a movement of the optical beam on the device under test 1703 itself. Many other standard optical methods may be applied to achieve this movement. These may include but are not limited to movement of the device 1703, the obstruction of parts of the optical beam by movable apertures or optical shutters, the actual movement or turning of the source of the optical beam, electro optical means, and many others. The movement of the optical beam on the device 1703 can be directed either by the processor 1705, the flat-panel inspection device 1702, or the operator. As the optical beam strikes an area of the device 1703, a test for the presence or absence of a defect may be made in similar fashion to the various methods described above. The output of apparatus 1701 may be in the form of a gauge reading, an indication on a display screen, an electrical output signal from apparatus 1701 (such as on a floppy disk in a floppy disk drive 1716), or the results may be stored in a data file either within said apparatus 1701, or externally via an appropriate connection to apparatus 1701. The preferred embodiment uses the temperature change of resistance effect to detect the presence of defects in the field of view of the inspection device 1702, although it is to be understood that other embodiments can be constructed using other effects discussed above within the spirit of the invention. Many of the above discussed embodiments apply as well in this case. For example, for purposes of sensitivity enhancement, it may be desirable to modulate the output of the laser temporally. At the same time, it may be desirable to apply temporally varying voltages and/or currents to the device under test. These decisions depend on the situation for the device under test, but can be made according to the well established principles of electrical circuit theory and optimal signal processing.

The preferred embodiment of the invention uses a set of pulses from a 120 mIlliwatt single transverse mode diode laser 1806 focused onto the device 1703 so as to form a 10 micron diameter spot. Diodes appropriate for this apparatus are currently commercially available at several wavelengths in the visible and near infra-red region of the spectrum. These pulses are chosen to be spaced by a time large enough to allow the device under test to return to substantially its equilibrium thermal state between pulses. The pulses are typically relatively short compared to the spacing of the pulses, typically the duty cycle is approximately 10% and the spacing between the pulses in time is about 200 microseconds. Simultaneously, typically a sinusoidal bias signal is applied to the rows and columns of device 1703. In the preferred embodiment, the frequency of this signal is close to but not the same as the spacing between the pulses, typically of period approximately 220 microseconds. Depending on the electrical characteristics of the device 1703 and the desired measurement, these values can vary substantially, from typically 0.1 sec to somewhat less than 1 microsecond. The frequency of the optical beam application and the frequency of the electrical excitation of the device 1703 result in a harmonic signal, typically at approximately 450 Hz. This embodiment is preferred in this case because the overall noise level at 4500 Hz is typically very small and 4500 Hz is a low enough frequency that it is to be expected that the wafer can respond quite effectively at this frequency. It is possible to construct highly sensitive electronics for the purpose of detecting the presence of a voltage or current at 4500 Hz which then relays this finding to the processor 1705. This provides for localization of defective points to within a few microns because of the short duration of the pulses consistent with the theory of heat diffusion in solids discussed above.

Figure 17C:
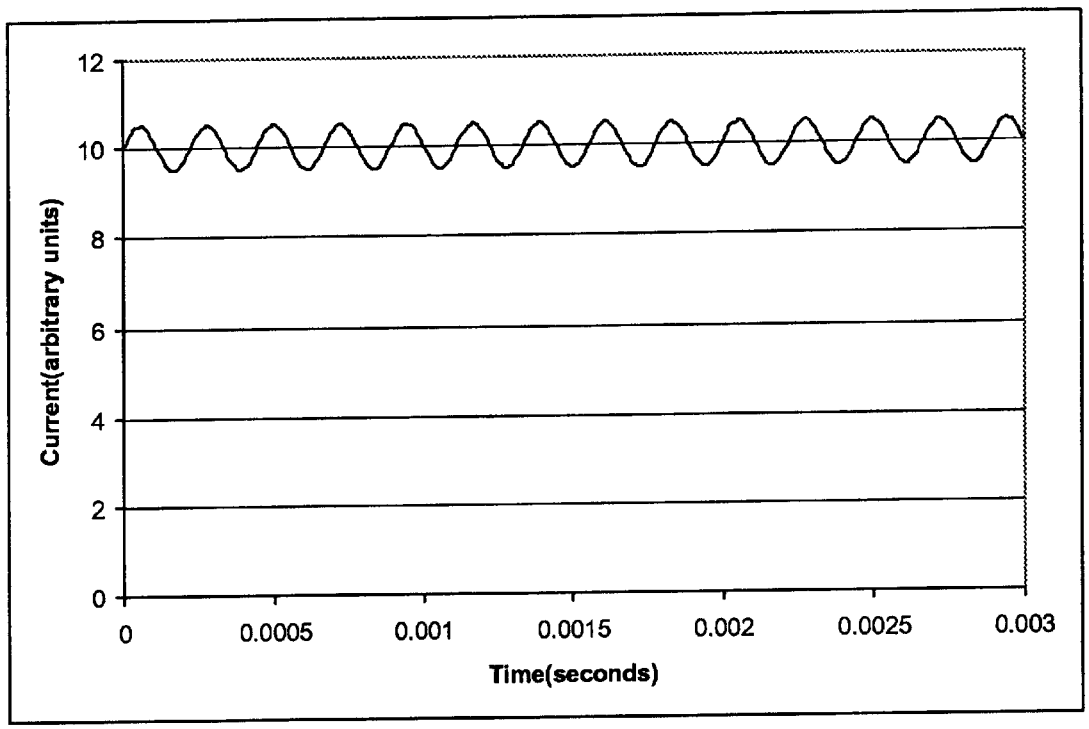
FIGS. 17c and 17d illustrate signal waveforms which can be produced when time varying electrical bias and/or application of thermal energy is used.
Figure 17D:
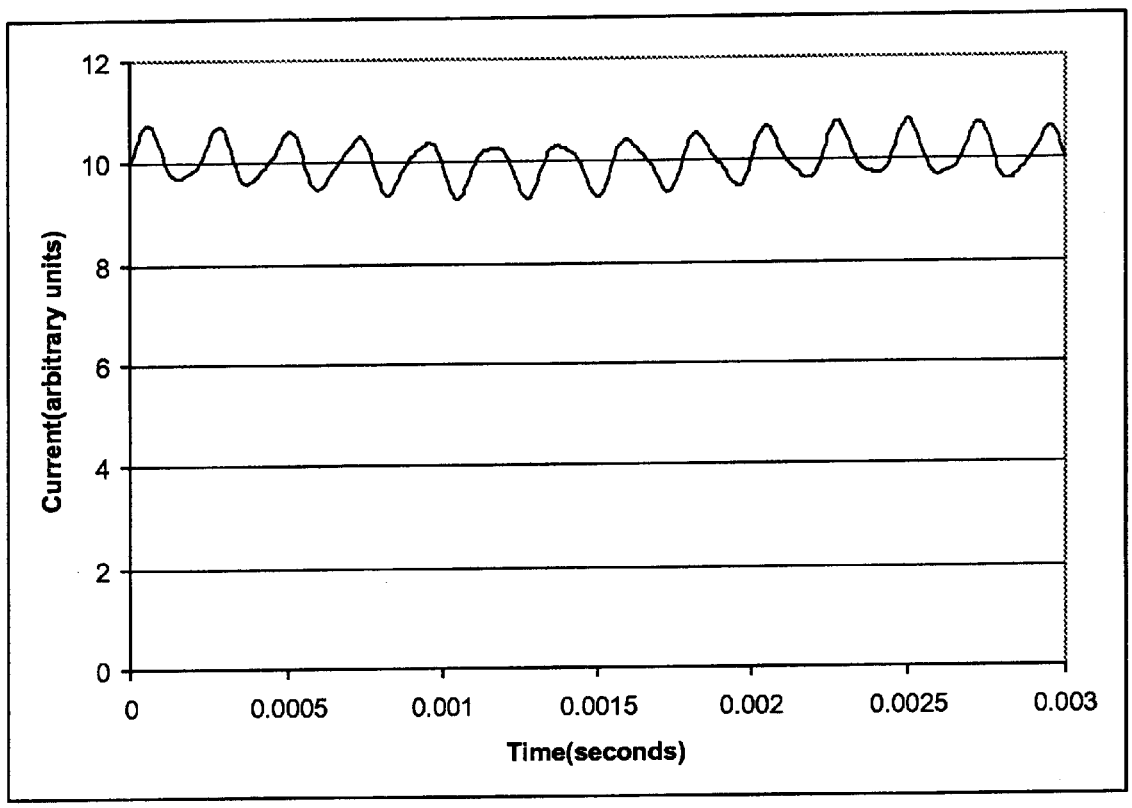

FIG. 17c shows the output of the electrical measuring device 1707 for the case of no short-type defect. It is observed as merely a 4550 Hz sine wave signal. FIG. 17d shows the output in the presence of a short-type defect within the vicinity, about 5 microns in the preferred embodiment, of the optical beam application. In the figure, the modification of the output signal due to the defect has been greatly exaggerated for illustrative purposes. It is observed as essentially but not exactly the product of a 5000 Hz sine wave and a 4550 Hz sine wave. Such a signal can be easily filtered with great selectivity for the difference signal, a signal of about 450 Hz, for detecting the presence of a short. In this embodiment, an exhaustive search is performed within the field of view of the microscope by the processor. Throughput is not a limiting consideration for the present embodiment, and therefore, the extra complexity associated with a more efficient search algorithm is not justified.

Figure 26:
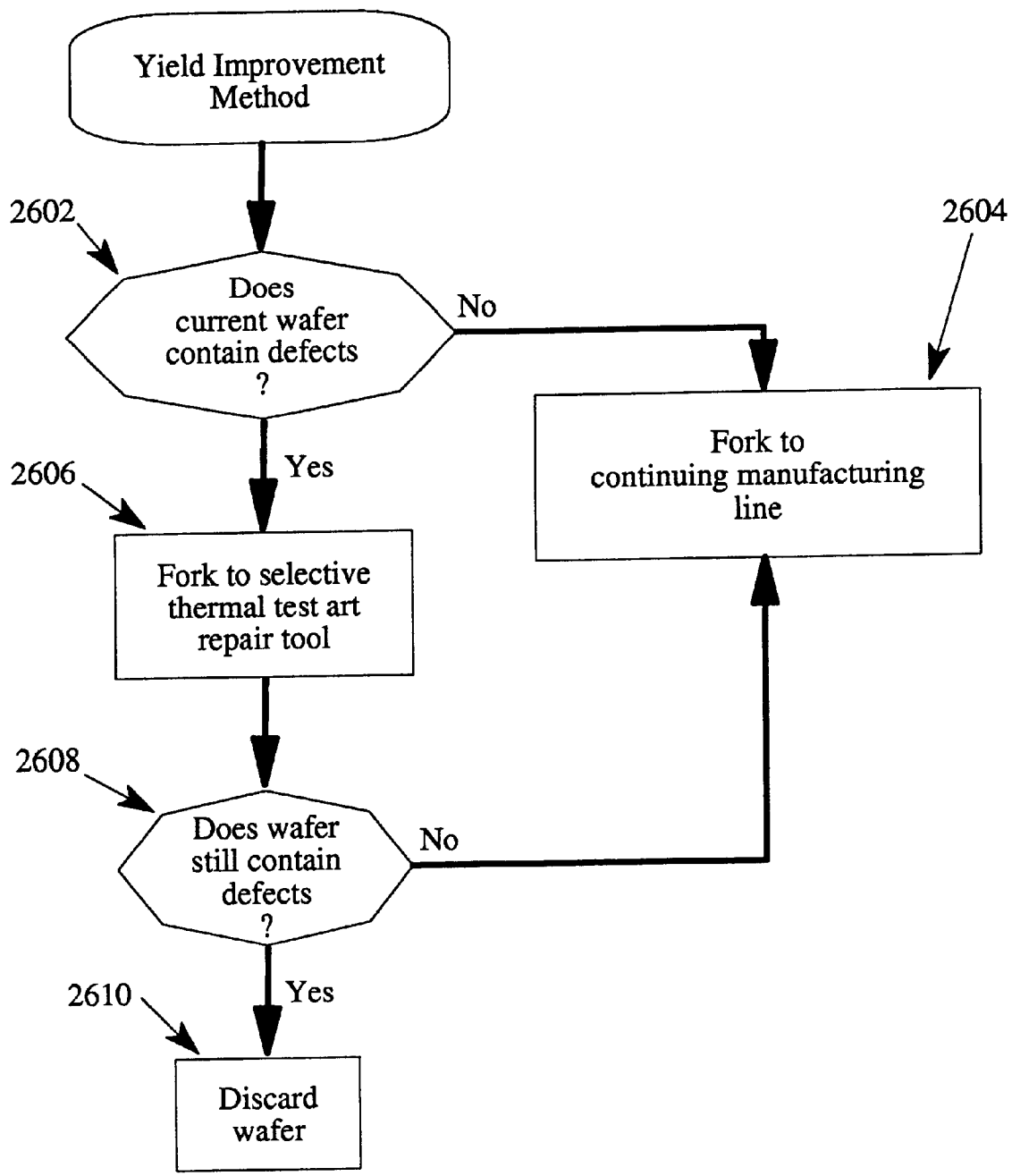
FIG. 26 is a flow chart of a yield improvement method.

FIG. 26 is a flow chart of a yield improvement method for a flat panel display manufacturing line incorporating the present invention. In a step 2602, the wafers being transported along the production line are tested in a conventional tool to determine, overall, whether defects of the types addressed herein can be ruled out. For FED manufacturing, such a tool might simply measure the electrical resistance between two row and column probe points on each display backplate on the wafer. If resistance is very high, then inter-layer short-type defects on that display can be ruled out. In this case the wafer is forwarded in step 2604 to other machines performing further process steps to continue manufacturing displays. If the resistance is lower than some threshold, then an inter-layer short-type defect is likely and in step 2606, the wafer is routed to a tool such as that of FIG. 3a, optionally with an indication of which display or displays on the wafer is (are) suspected to contain one or more defects. The tool in step 2606 performs the selective thermal testing procedures described elsewhere herein and, preferably on the same tool but optionally on a different tool, any defects which have been identified are repaired if possible. In step 2608, it wafer is again tested in a conventional tool (or while still in the tool of FIG. 3a) to determine, overall, whether defects of the types addressed herein still exist. If not, then the wafer is returned to the production line for continued manufacturing (step 2604). If so, then the wafer is either brought to other, more involved inspection and repair stations, or considered unrepairable and simply discarded (step 2610). It will be appreciated that if a process such as that shown in FIG. 26 can improve the yield in a flat panel display manufacturing process from, say 80%, to, say, 99%, then this can make the difference between an unprofitable process and a profitable one.

A further aspect of the invention is that it may be applied in a combined test and repair apparatus which does not require an operator. As discussed above, this is a major advantage of the present invention because of cost, cleanroom space, material handling, yield, and other considerations. In the preferred embodiment, the apparatus performs a resistance test on the device first to determine the presence of any defects. For those devices with defects, the coarse then fine localization sequence is performed. To do this, the device is first aligned to a reference coordinate system. This can be accomplished in many ways, but in the preferred embodiment, a machine vision system is used to align to fiducials in known locations on the device. In this preferred embodiment, a coarse localization laser is used on the perimeter of the device under test as previously discussed. Using information from this test, a fine localization is performed using a thermal application laser in a microscope column. The device is positioned so as to put this laser into the field of view of the microscope. The procedure is performed as discussed above for fine localization. Once the presence and location of a defect has been determined, another laser on the same optical axis as the fine test laser is used to remove the defect. It is not necessary that the repair laser be on the same optical axis, however, it will be appreciated that as soon as a defect is localized, repair can take place without any additional mechanical motion of the device under test. As mentioned before, the use of a laser for defect repair is a well established art, and it is only necessary to provide the appropriate combining optics to allow the two lasers to operate on the same axis. It is also possible to build a single laser whose output energy can be adjusted over a wide enough range that the test and repair can be performed by a single laser and no combining optics are necessary. Thus, for a large number of defects, localization and repair of the defect can take place entirely under automatic control and preferably within a single tool on a cleanroom floor. It will be appreciated also that the defect localization afforded by the apparatus and methods described herein can easily localize defects within a column/row crossing to a region that is smaller than the entire crossing, and unlike prior art methods, can do so even where the defect is optically invisible (i.e., any optical signature is too small to detect in a commercially reasonable manner using present-day optical inspection techniques such as by cameras, CCD arrays, and human observation with or without magnification).

For a variety of reasons, in practice some defects may be unrepairable, or may require human intervention to repair. In this case, it may be desirable to include a machine vision system capable of discerning that such a situation exists and then referring the defect to a human operator on this apparatus or another apparatus within the overall fabrication process. It will still be appreciated in this case, however, that these situations form the minority of repair situations and therefore, even if this is necessary or desirable, the invention still presents an important advance in the art.

It will be well appreciated by those skilled in the art of flat-panel display manufacturing that a wide variety of combinations of the above techniques and methods can be applied within the general spirit of the invention. For example, in one embodiment, thermocouple junctions might be utilized in the driver areas to increase signal levels, while the temperature change in resistance is used for defect localization within the electron emission sites 103. Many changes to the busses 110 and 111 can be considered to enhance the sensitivity of tests for different kinds of defects. Similarly, process constraints frequently require certain bussing connections. In general, these changes follow within the spirit of the invention. It will also be well appreciated that the principles discussed here for a FED display apply quite generally to LCD panels and other flat-panel type displays. Additionally, the present invention can facilitate or complement other test methodologies already used or not yet invented and not contained within the above description. For example, the present invention combined with contact probes on each column or row trace could permit a high degree of localization of defects combined with the rapidity of direct electrical probe testing. It will be well appreciated that this represents an application of the present invention to facilitate the use of probe testing.

It will also be appreciated that whereas the perimeter scan for localizing suspected defects to individual column or row conductors is described above primarily as proceeding sequentially along the different column conductors or row conductors, as the case may be, it will be appreciated that a search algorithm having a progressive narrowing component, similar to that described above with respect to FIGS. 10, 25a and 25b, for example, can be used here as well. In particular, column conductors can be heated in simultaneous subsets of more than one but less than all conductors, and changes in the electrical characteristics of the two-port network monitored to determine presence or absence of a defect within the subset then under test. If the test of a first one of the subsets suggests the presence of a defect within that subset, then the next test can be performed on a second subset which includes at least one but less than all the columns in the first subset, and so on. If the test of the first subset suggests the absence of a defect within that subset, or if the test of the first subset suggests the presence of a defect within that subset but there may be other defects in the device, then the next test can be performed by simultaneously heating a third subset of columns which includes at least one but less than all of the columns in the device outside the first subset. In a strict binary search, the subset tested in each successive iteration has half the number of conductors as the prior iteration, but since a strict binary search is not necessarily required, the third subset in a given embodiment can contain fewer, more, or the same number of conductors as the first subset. The same kind of search can be performed on row conductors. It will be appreciated that column or row searches which include a progressive narrowing component can be used to localize defects of any type to a particular column or columns, and/or a particular row or rows.

It will be appreciated further that, as previously mentioned, the temperature change induced in the device under test can be either positive or negative. In addition, it can be transient or steady-state, and asymptotic or periodic, among other things. The thermal energy source can induce the temperature change in the selected region by any number of technologies. For example, in addition to an electromagnetic beam or a hot or cold gas knife discussed above, the temperature change can also be induced inductively by the coupling of a magnetic field, or capacitively by the coupling of an electric field.

As used herein, the term "controller" is used broadly to include either a single processor, or several processors performing different aspects of an overall task (such as one controlling the stage, one controlling the laser, and one processing the sensor output signal). It will be appreciated that different processors included in a "controller" can be physically incorporated into different components of the overall system. For example, a "processor" causing the laser output to be pulsed, can be part of the laser itself rather than within some central processor that also performs other aspects of the overall task. In addition, it will be appreciated that a "controller" can be or include one or more dedicated components and/or a multi-purpose components, and may or may not include a microprocessor.

Also as used herein, the terms "power source" and "electrical bias" are intended to include constant current sources (with or without a known time varying component), constant voltage sources (with or without a known time varying component), as well as sources where neither the output voltage nor the output current is intended to necessarily be constant.

Also as used herein, a short-circuit type defect refers to greater than desired electrical conduction from one electrical node to another on the device. An inter-layer short circuit type defect refers to greater than desired electrical conduction from one electrical node on one layer of the device (e.g. a column layer) to another electrical node on a different layer of the device (e.g. a row layer). An intra-layer short circuit type defect refers to greater than desired electrical conduction from one electrical node on one layer of the device (e.g. a column or row conductor) to another electrical node on the same layer of the device (e.g. a another column or row conductor, respectively). An open circuit type defect refers to smaller than desired electrical conduction from one electrical node to another on the device.

Also as used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section of this patent application are specifically incorporated by reference into the description herein of embodiments of the invention. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for defect determination in a flat panel display wafer having a plurality of row conductors each crossing a plurality of column conductors in a grid, comprising the steps of:

inducing a respective temperature change within each of said column conductors at different times; and inducing a respective temperature change within each of said row conductors at different times; and observing any effect produced in response to the temperature change within each particular one of said conductors, upon electrical characteristics of a particular two-port network on said wafer, the particular two-port network having a respective first port connected to one of said row conductors and a second port connected to one of said column conductors.

2. A method according to claim 1, wherein said step of observing any effect comprises the step of observing any non-photoelectric effect produced on said electrical signal in response to said first temperature change.

3. A method according to claim 1, wherein said step of observing any effect comprises the step of observing any effect produced on said electrical signal due to resistance changes produced in response to said first temperature change.

4. A method according to claim 1, wherein said step of observing comprises the step of observing any effect produced on electrical characteristics of a first two-port network on said wafer, which two-port network has a first port connected to said first column conductor and a second port connected to a second one of said column conductors.

5. A method according to claim 1, wherein all of said column conductors are connected together electrically to a common column node, said common column node being the first port of all of said two-port networks.

6. A method according to claim 1, wherein all of said row conductors are connected together electrically to a common row node, said common row node being the second port of all of said two-port networks.

7. A method according to claim 1, further comprising the step of localizing a defect to one of said column conductors in response to said step of observing.

8. A method according to claim 1, further comprising the steps of:
localizing a defect to one of said column conductors in response to said step of observing any effect produced in response to the temperature change within each given one of said column conductors; and
localizing said defect to one of said row conductors in response to said step of observing any effect produced in response to the temperature change within each particular one of said row conductors.

9. A method according to claim 1, wherein said step of inducing a temperature change within a first one of said column conductors comprises the step of directing a laser to impinge upon said first column conductor.

10. A method according to claim 1, wherein said first column conductor has front and rear surfaces, and wherein said step of inducing a temperature change within a first one of said column conductors comprises the step of directing a laser to impinge upon both said front and rear surfaces of said first column conductor.

11. A method according to claim 1, wherein said step of inducing a temperature change within a first one of said column conductors comprises the steps of:
directing a laser beam to impinge upon said first column conductor; and
re-reflecting toward said first column conductor, optical energy from said laser beam which is reflected from said first column conductor.

12. A method according to claim 1, wherein said flat panel display wafer comprises a field emission display wafer.

13. A method according to claim 1, further comprising the step of applying to said first column conductor an electrical bias which varies with time during said step of observing.

14. A method according to claim 1, wherein said step of inducing a first temperature change within a first one of said column conductors comprises the step of inducing said first temperature change in a thermocouple in said first column conductor.

15. A method according to claim 1, wherein said step of inducing a first temperature change within a first one of said column conductors comprises the step of inducing said first temperature change in a serpentine segment of said first column conductor.

16. A method according to claim 1, wherein said step of inducing a first temperature change includes the use of a laser beam.

17. A method according to claim 1, further for localizing a short between said first column conductor and a second conductor being one of said row conductors, said first and second conductors crossing each other at a crossing region,
wherein said step of inducing comprises the step of inducing said first temperature change localized to a region which includes a first portion of said crossing region and excludes a second portion of said crossing region,
and further comprising the steps of:
inducing a second temperature change localized to a region which includes a third portion of said crossing region smaller than said first portion, and excludes a fourth portion of said crossing region; and
observing any effect produced on an electrical signal in response to said second temperature change.

18. A method comprising the step of iteratively repeating the steps of claim 17 with progressively smaller portions of said crossing region until said short has been localized to a desirably small portion of said crossing region.

19. A method according to 17, wherein said flat panel display wafer comprises a field emission display wafer.

20. A method according to claim 1, further for localizing a short between said first column conductor and a second conductor being one of said row conductors, said first and second conductors crossing each other at a crossing region,
wherein said step of inducing comprises the step of inducing said first temperature change localized to a first region which includes a first portion of said crossing region and excludes a second portion of said crossing region,
and further comprising the steps of:
selecting as a second region, a region which includes a third portion of said crossing region within said first portion of said crossing region, and excludes a fourth portion of said crossing region within said first portion of said crossing region, in response to observation of a predetermined effect type on said electrical signal in said step of observing;
selecting as said second region, a region which includes a fifth portion of said crossing region outside of said first portion of said crossing region, and excludes a sixth portion of said crossing region outside of said first portion of said crossing region, in response to non-observation of said predetermined effect type on said electrical signal in said step of observing;
inducing a second temperature change localized to said second region; and
observing any effect produced on an electrical signal in response to said second temperature change.

21. A method according to claim 20, wherein said fifth portion of said crossing region is smaller than said first portion of said crossing region.

22. A method according to claim 20, wherein said flat panel display wafer comprises a field emission display wafer.

23. A method according to claim 20, further comprising the steps, performed after said step of selecting as a second region a region which includes a third portion of said crossing region, of:
selecting as a third region, a region which includes a seventh portion of said crossing region within said third portion of said crossing region, and excludes an eighth portion of said crossing region within said third portion of said crossing region, in response to observation of a predetermined effect type on said electrical signal in said step of observing any effect produced on an electrical signal in response to said second temperature change;

selecting as said third region, a region which includes a ninth portion of said crossing region outside of said third portion of said crossing region but within said first portion of said crossing region, and excludes a tenth portion of said crossing region outside of said third portion of said crossing region but within said first portion of said crossing region, in response to non-observation of said predetermined effect type on said electrical signal in said step of observing any effect produced on an electrical signal in response to said second temperature change;

inducing a third temperature change localized to said third region; and observing any effect produced on an electrical signal in response to said third temperature change.

24. A method according to claim 20, further comprising the steps, performed after said step of selecting as a second region a region which includes a fifth portion of said crossing region, of:

selecting as a third region, a region which includes a seventh portion of said crossing region within said fifth portion of said crossing region, and excludes an eighth portion of said crossing region within said fifth portion of said crossing region, in response to observation of a predetermined effect type on said electrical signal in said step of observing any effect produced on an electrical signal in response to said second temperature change;

selecting as said third region, a region which includes a ninth portion of said crossing region outside of said fifth portion of said crossing region but within said sixth portion of said crossing region, and excludes a tenth portion of said crossing region outside of said fifth portion of said crossing region but within said sixth portion of said crossing region, in response to non-observation of said predetermined effect type on said electrical signal in said step of observing any effect produced on an electrical signal in response to said second temperature change;

inducing a third temperature change localized to said third region; and observing any effect produced on an electrical signal in response to said third temperature change.

25. A method according to claim 20, wherein each of said plurality of column conductors crosses said plurality of row conductors at respective crossings, further comprising the step of localizing said short to said crossing region prior to said step of inducing a first temperature change, said step of localizing comprising the steps of:

inducing a plurality of third temperature changes within respective ones of the column conductors in said plurality of column conductors at different times;

observing any effect produced upon an electrical signal in said wafer in response to each of said third temperature changes, to identify said first conductor;

inducing a plurality of fourth temperature changes within respective ones of the row conductors in said plurality of row conductors at different times; and observing any effect produced upon an electrical signal in said wafer in response to each of said fourth temperature changes, to identify said second conductor.

26. A method according to claim 20, further comprising the step of applying a voltage bias across said first and second conductors, said voltage bias producing a known current flow pattern through a two-port network including said first and second conductors, wherein said step of observing any effect produced on an electrical signal in response to said first temperature change comprises the step of observing any deviation from said known current flow pattern in response to said first temperature change, and wherein said step of observing any effect produced on an electrical signal in response to said second temperature change comprises the step of observing any deviation from said known current flow pattern in response to said second temperature change.

27. A method according to claim 26, wherein said voltage bias varies with time, said known current flow pattern including a time varying component.

28. A method according to claim 20, further comprising the step of repairing said defect as localized by said steps of inducing, observing, and selecting.

29. A method according to claim 28, wherein said steps of determining and repairing both occur within a single tool.

30. A method according to claim 28, wherein said step of repairing occurs in response to said step of determining, without operator intervention.

31. A method according to claim 1, further for localizing a short between said first column conductor and a second conductor being one of said row conductors, said first and second conductors crossing at a crossing region, wherein said step of inducing comprises the step of inducing said first temperature change localized to a first region which includes a first portion of said crossing region and excludes a second portion of said crossing region, and further comprising the steps of:

selecting as a second region a region which includes a third portion of said crossing region within said first portion of said crossing region, and excludes a fourth portion of said crossing region within said first portion of said crossing region, in response to non-observation of a predetermined effect type on said electrical signal in said step of observing;

selecting as said second region a region which includes a fifth portion of said crossing region outside of said first portion of said crossing region, and excludes a sixth portion of said crossing region outside of said first portion of said crossing region, in response to observation of said predetermined effect type on said electrical signal in said step of observing;

inducing a second temperature change localized to said second region; and observing any effect produced on an electrical signal in said wafer in response to said second temperature change.

32. A method according to 31, wherein said flat panel display wafer comprises a field emission display wafer.

33. A method according to claim 31, further comprising the steps, performed after said step of selecting as a second region a region which includes a third portion of said crossing region, of:

selecting as a third region a region which includes a seventh portion of said crossing region within said third portion of said crossing region, and excludes an eighth portion of said crossing region within said third portion of said crossing region, in response to non-observation of a predetermined effect type on said electrical signal in said step of observing any effect produced on an electrical signal in response to said second temperature change;

selecting as said third region a region which includes a ninth portion of said crossing region outside of said third portion of said crossing region, and excludes a tenth portion of said crossing region outside of said third portion of said crossing region, in response to observation of said predetermined effect type on said electrical signal in said step of observing any effect produced on an electrical signal in response to said second temperature change;

inducing a third temperature change localized to said third region; and observing any effect produced on an electrical signal in said wafer in response to said third temperature change.

34. A method according to claim 31, further comprising the steps, performed after said step of selecting as a second region a region which includes a fifth portion of said crossing region, of:

selecting as a third region a region which includes a seventh portion of said crossing region within said fifth portion of said crossing region, and excludes an eighth portion of said crossing region within said fifth portion of said crossing region, in response to non-observation of a predetermined effect type on said electrical signal in said step of observing any effect produced on an electrical signal in response to said second temperature change;

selecting as said third region a region which includes a ninth portion of said crossing region outside of said fifth portion of said crossing region but within said sixth portion of said crossing region, and excludes a tenth portion of said crossing region outside of said fifth portion of said crossing region but within said sixth portion of said crossing region, in response to observation of said predetermined effect type on said electrical signal in said step of observing any effect produced on an electrical signal in response to said second temperature change;

inducing a third temperature change localized to said third region; and observing any effect produced on an electrical signal in said wafer in response to said third temperature change.

35. A method according to claim 31, wherein each of said plurality of column conductors crosses said plurality of row conductors at respective crossings on said wafer, further comprising the step of localizing said short to said crossing region prior to said step of inducing a first temperature change, said step of localizing comprising the steps of:

inducing a plurality of third temperature changes within respective ones of the column conductors in said plurality of column conductors at different times;

observing any effect produced upon an electrical signal in said wafer in response to each of said third temperature changes, to identify said first conductor;

inducing a plurality of fourth temperature changes within respective ones of the row conductors in said plurality of row conductors at different times; and observing any effect produced upon an electrical signal in said wafer in response to each of said fourth temperature changes, to identify said second conductor.

36. A method according to claim 31, further comprising the step of applying a current bias through a two-port network including said first and second conductors, said current bias producing a known voltage pattern across said first and second conductors, wherein said step of observing any effect produced on an electrical signal in said wafer in response to said first temperature change comprises the step of observing any deviation from said known voltage pattern in response to said first temperature change, and wherein said step of observing any effect produced on an electrical signal in said wafer in response to said second temperature change comprises the step of observing any deviation from said known voltage pattern in response to said second temperature change.

37. A method according to claim 1, wherein said step of observing comprises the step of observing any effect produced on electrical characteristics of a first two-port network on said wafer, which two-port network has a first port connected to said first column conductor and a second port connected to one of said row conductors.

38. A method according to claim 37, further comprising the steps of:

inducing a second temperature change within a first one of said row conductors; and observing any effect produced in response to said second temperature change, upon electrical characteristics of a two-port network on said wafer, which two-port network has a first port connected to one of said plurality of column conductors and a second port connected to said first row conductor.

39. A method according to claim 37, further comprising the steps of:

inducing a second temperature change within a second one of said column conductors; and observing any effect produced in response to said second temperature change, upon electrical characteristics of a second two-port network on said wafer, which second two-port network has a first port connected to said second column conductor and a second port connected to one of said row conductors.

40. A method according to claim 39, wherein both said first and second column conductors are connected together electrically to a common node, and wherein said first and second two-port networks are the same.

41. A method according to claim 1, wherein all of said column conductors are connected together electrically to a common column node, said common column node being the first port of all of said two-port networks, and wherein all of said row conductors are connected together electrically to a common row node, said common row node being the second port of all of said two-port networks.

42. A method according to claim 41, wherein each of said column conductors includes a respective thermocouple, and wherein said step of inducing a respective temperature change within each of said column conductors comprises the step of inducing the respective temperature change within the thermocouple in the respective column conductor.

43. A method according to claim 42, wherein all of said column conductors are connected together electrically to a common column node, said common column node being the first port of all of said two-port networks, wherein all of said row conductors are connected together electrically to a common row node, said common row node being the second port of all of said two-port networks, and wherein the thermocouple in each of said column conductors is connected in series between said common column node and the respective column.

44. A method according to claim 1, further comprising the steps of:

determining presence of a defect within said first column conductor in response to said step of observing;

inducing a second temperature change within a first one of said row conductors;

observing any effect produced on an electrical signal in said wafer in response to said second temperature change; and determining presence of said defect within said first row conductor in response to said step of observing.

45. A method according to claim 44, further comprising the step of localizing said defect within a crossing defined by said first column conductor and said first row conductor.

46. A method according to claim 1, comprising the steps of:

inducing said first temperature change within each column conductor in a first subset of more than one but less than all of said column conductors, said first subset of column conductors including said first column conductor, all of the column conductors in said first subset of column conductors being connected together electrically to a common first column node, wherein said step of observing comprises the step of observing any effect produced on electrical characteristics of a first two-port network on said wafer, said first two-port network having a first port connected to said common first column node and a second port connected to one of said row conductors.

47. A method according to claim 46, further comprising the steps of:

selecting, in response to said step of observing any effect produced on electrical characteristics of a first two-port network, a second subset of less than all of said column conductors in said plurality of column conductors, all of the column conductors in said second subset of column conductors being connected together electrically to a common second column node;

inducing a second temperature change within each column conductor in said second subset of column conductors; and observing any effect produced on electrical characteristics of a second two-port network on said wafer, said second two-port network having a first port connected to said common second column node and a second port connected to one of said row conductors.

48. A method according to claim 47, wherein said common first column node is the same as said common second column node, the first port of both said first and second two port networks being the same.

49. A method according to claim 47, further comprising the step of localizing a defect to be within said first subset of columns in response to said step of observing any effect produced on electrical characteristics of a first two-port network, and wherein said second subset of column conductors is smaller than and includes at least one but fewer than all of the conductors in said first subset of column conductors.

50. A method according to claim 47, wherein said second subset of column conductors includes at least one but fewer than all of the column conductors in said plurality of column conductors outside said first subset of column conductors.

51. A method according to claim 47, further comprising the steps of:

selecting, in response to said step of observing any effect produced on electrical characteristics of a second two-port network, a third subset of less than all of said column conductors in said plurality of column conductors, all of the column conductors in said third subset of column conductors being connected together electrically to a common third column node;

inducing a second temperature change within each column conductor in said third subset of column conductors; and observing any effect produced on electrical characteristics of a third two-port network on said wafer, said third two-port network having a first port connected to said common third column node and a second port connected to one of said row conductors.

52. A method according to claim 1, wherein said step of inducing a first temperature change within a first one of said column conductors comprises the step of inducing within said first column conductor a temperature change which varies with time during said step of observing.

53. A method according to claim 52, further comprising the step of applying to said first column conductor an electrical bias which varies with time during said step of observing.

54. A method according to claim 1, further comprising the step of repairing a defect in a column identified in response to said steps of inducing and observing.

55. A method according to claim 54, wherein said steps of inducing and repairing both occur within a single tool.

56. A method according to claim 54, wherein said step of repairing occurs in response to said step of observing, without operator intervention.

* * * * *